US006961055B2

(12) United States Patent
Doak et al.

(10) Patent No.: US 6,961,055 B2
(45) Date of Patent: Nov. 1, 2005

(54) METHODS AND APPARATUS FOR CONSTRUCTING VIRTUAL ENVIRONMENTS

(75) Inventors: David George Doak, Beeston (GB); Stephen John Ellis, Ilkeston (GB)

(73) Assignee: Free Radical Design Limited, Nottinghamshire (GB)

( * ) Notice: Subject to any disclaimer, the term of this patent is extended or adjusted under 35 U.S.C. 154(b) by 482 days.

(21) Appl. No.: 09/852,126

(22) Filed: May 9, 2001

(65) Prior Publication Data

US 2003/0058238 A1 Mar. 27, 2003

(51) Int. Cl.$^7$ ............................................. G06T 15/00
(52) U.S. Cl. ..................... 345/419; 345/677; 345/679
(58) Field of Search ............................... 345/677, 679, 345/642, 848, 419

(56) References Cited

U.S. PATENT DOCUMENTS

| | | | | |
|---|---|---|---|---|
| 5,414,801 A | * | 5/1995 | Smith et al. ................ | 345/419 |
| 6,014,145 A | * | 1/2000 | Bardon et al. .............. | 345/427 |
| 6,362,817 B1 | * | 3/2002 | Powers et al. .............. | 345/419 |
| 6,414,679 B1 | * | 7/2002 | Miodonski et al. ......... | 345/420 |
| 6,646,641 B1 | * | 11/2003 | White et al. ................ | 345/428 |

OTHER PUBLICATIONS

Foley et al., Computer Graphics: Principles and Practice, 1997, pp. 222–226 and 279–281.*
Luebke, "Portals and Mirrors: Simple, Fast Evaluation of Potentially Visible Sets", 1995.*
Tomb Raider Level Editor, Nov. 2000, pp. 1–120.*
"Quake2", http://www.idsoftware.com/, 2 p., (2000–2001).
"Quake2 Files", *The Quake Workshop*, http://www.quake2.com/qworkshop/features/files.htm, 2 p., (1993).
"Unreal Technology", http://unreal.epicgames.comToc.htm, 4 p., (2001).
Jacquays, P., "QuakeCon 2001 Map Object Model Contest", *BluesNews*, http://www.qeradiant.com/, 2 p., (2001).

* cited by examiner

*Primary Examiner*—Almis R. Jankus
(74) *Attorney, Agent, or Firm*—Schwegman, Lundberg, Woessner & Kluth, P.A.

(57) ABSTRACT

The invention relates to methods, apparatus, and software for designing and building virtual environments for playing computer games. A map builder is used to construct one or more two-dimensional maps comprised of tiles selected from a set of tiles, the map or maps representing the virtual environment for the computer game. Data describing the map is then combined with tile data providing 3D geometry to create the virtual environment. The tile data preferably also includes non-visible game-related data such as collision and navigation data, which is also combined to provide game data for the game's virtual environment. The tiles include interfaces for connecting one tile to another and, in a preferred embodiment, two versions of the interface geometry are provided for each tile, one with the interface open, the other with the interface closed.

The invention facilitates the rapid construction of 3D virtual environments for playing games.

65 Claims, 29 Drawing Sheets

METHODS AND APPARATUS FOR CONSTRUCTING VIRTUAL ENVIRONMENTS

FIELD OF THE INVENTION

This invention is generally concerned with methods and apparatus for creating 3D virtual environments, in particular for computer games. The invention is particularly applicable to game level editor software for building game levels.

BACKGROUND TO THE INVENTION

The processing power and capabilities of microprocessors historically increased over time to the point where it became practicable to implement real time computer games using three-dimensional graphics on personal computers and game consoles. Since then there has been a rapid growth in the 3D real-time games market despite the substantial amount of effort required to create each new game, much of this effort stemming from the need to create a realistic and convincing environment in which to immerse the player or players. To meet this need game companies typically employ many artists and level designers as well as skilled programmers. Although a computer game may take years to develop the market is nonetheless very fast paced and a new game may have a lifetime of only a few months during which it is earning significant revenue. There therefore arises a general need to speed up the process of creation of a game, and a further need to increase the longevity of a game's appeal to its players.

An important subset of games within the 3D games arena is the subset of so-called "first person shooter" (FPS) games, typified by the early examples of Doom (Registered Trade Mark) and Quake (Registered Trade Mark). In this type of game the player is represented as a character within the game and the computer or television screen shows the world within the game as it appears to the player's character. In effect the player sees on the screen what his or her character would see with their own eyes in the virtual 3D environment of the game. This creates a strong feeling of immersion in the virtual environment for the game player. Technically such FPS games are different to other games where, for example, the screen presents a view from above and behind the player's character and including the player's character (which might be termed a "third person shooter"). This is because in a first person shooter game the player is generally permitted to manipulate the game controls to view any part of the environment around the player's character whereas in a third person shooter game the view "projected" onto the screen is more restricted.

FIG. 1 shows a screenshot 100 of a first person shooter-type game illustrating the main features of such a game (the screenshot is, in fact, taken from a game constructed using a method according to the invention described below). In FIG. 1 the only part of the player's character which is visible is the character's weapon 102. In the illustrated screenshot the character is looking forwards, but the character may also be turned to look backwards, sideways, up and down. Screen displays 104 indicate game-related data such as ammunition level, armour level, character life, and a score or ranking.

The virtual environment within which the player's character moves is defined by visual geometry onto which colours and textures are mapped. The screenshot of FIG. 1 illustrates a junction between two rooms or halls within the virtual environment. The environment is also provided with lighting effects, although these are not generally implemented using ray tracing but instead rely on a combination of painting on lights, such as lights 106, onto the visual geometry and locally modifying texture, colour and/or intensity in the vicinity of the lights. The game environment usually contains objects, such as armour 108, which may be picked-up or manipulated by the player's character. Also present in the virtual game environment, but invisible to the player, are collision geometry surfaces for determining where and how the player's character is permitted to move. The collision geometry may simply coincide with the visual geometry but, for speed, where the visual geometry is relatively complex it may be approximated by simpler collision geometry, for example replacing a wall with 3D features such as wall 10 in FIG. 1, with a flat wall for the collision geometry.

To simplify the calculations required for rendering the part of the 3D virtual environment viewed by the player's character on the screen the environment may be sub-divided by invisible planes or portals, which can be used for determining which regions of the 3D game environment need to be included in a visible surface determination process. These planes or portals, which are described in more detail later, also facilitate the provision of special effects for regions within the game such as, for example, lighting effects or water effects.

In single-player mode the player generally progresses through a number of game levels, each comprising a separate 3D environment. The player's character generally encounters non-player characters (NPCs) in each level, some of which may be friendly, but most of which are usually hostile and must be killed. Once the player's character has progressed through all the game's levels, the game is over. In other modes a plurality of players' characters are present, optionally with additional non-player characters. In these modes a plurality of players may each be provided with a game controller for a common games console or personal computer, or a number of players using separate consoles or computers may be linked over a network such as local area network (LAN), wide area network (WAN), or the Internet. A number of such multi-player modes may be provided, such as "deathmatch" in which one player's character must kill the characters of all other players not on the same side, and "capture the flag" in which two teams of players each defend a base with a flag which must be captured by the other side to win.

Three-dimensional virtual environment games such as the FPS game outlined above may be run on any general-purpose computer system or on a dedicated computer games console, such consoles generally incorporating specialized hardware to speed-up graphics-related operations. Games for games consoles may be developed on a general-purpose computer system such as a personal computer running Windows (Registered Trade Mark) or Linux (Registered Trade Mark) using cross-compilation software. Players of games on personal computers often upgrade their computer hardware by incorporating a 3D graphics card providing dedicated hardware for speeding-up the type of operations generally encountered when processing 3D graphics. Three-dimensional graphics may implemented by means of a 3D graphics engine providing 3D application program interface (API) calls for controlling the computer's hardware to display three-dimensional graphics either on a visual display unit or, more likely for a games console, on a television. Common 3D graphics languages include OpenGL (from Silicon Graphics, Inc.) and Direct3D (from Microsoft Corporation) (trade marks). Alternatively such graphics may be implemented entirely by proprietary code. A computer game such as an FPS computer game generally comprises data defining the game's environment and operation, and a game engine which operates on the game data to provide the specified game functionality such as NPC artificial intelligence, game physics, and the like, and which makes 3D graphics languages API calls for displaying the game's virtual environment on-screen to the player.

A number of game editors/engines are available in the public domain and can be used to create new games. For example, the editor for the computer game Unreal (trade mark), UnrealEd, is packaged and sold together with the game (more details at http://unreal.epicgames.com). Likewise ID software has released the source code for QE4, their game level editor for creating game virtual environments, as well as Quake II compiling utilities (see, for example www.idsoftware.com, www.quake2.com/qworkshop/features/files.htm and many Quake-related sites), and other game editors/engines have been written based upon these (see, for example, QERadiant at www.qeradiant.com).

The virtual environment of a level in a first person shooter game is defined by data comprising a number of different elements. Geometry data defines the physical (geometrical) appearance of the level and this physical geometry is typically formed from surfaces comprising a plurality of triangles, quadrilaterals, or polygons. Texture data provides images of different types of material which are applied to the level geometry to create a more realistic appearance for the virtual environment of the level. To facilitate the smooth running of the game visibility information is provided to allow the 3D processing engine to only process and display part of the level which is visible on the screen. There are a number of known methods for achieving this and these usually involving splitting-up the geometry and other data into groups so that data in a non-visible group need not be processed.

The characters and other objects moving within a level (either player characters or, in some cases, non-player characters) need information for determining where the character is allowed to move and where the character is not allowed to move within the level's 3D virtual environment. This information is provided by collision data which, since movement calculations are usually very time-consuming, generally comprises a less detailed version of the visible geometry—that is, the collision geometry has the same basic shape as the visual environment geometry but, to save computation time, the collision geometry is constructed from fewer triangles or polygons.

The non-player characters within a game move and function according to artificial intelligence algorithms. To facilitate the movement of NPCs it is often quicker to define NPC route calculation information rather than to rely on ray casting in conjunction with the collision geometry. Thus navigation data is generally provided which allows an NPC to determine how to move from a first position to a second position within the level via a reasonably efficient route. This navigation data may be provided by a set of three-dimensional points and links between the points. This navigation data can then be used for moving NPCs which are invisible to the player's character at predetermined speeds. When an NPC becomes visible it is drawn at the appropriate position and an animation is played to show the NPC's movement. Visible NPC movements and fights generally employ ray casting but, if an NPC wants to move to a position to which it cannot ray cast, again the navigation data may be used. The final significant class of information for a game level is position information, defining where the player's characters start, where weapons and ammunition appear, the location of health and armour points, the location of teams' bases and the like.

The conventional way of creating a level in such a game is to manually create all of the above-described information, for example using a game level editor software package or a commercial 3D design package. However, creating a level in this way typically takes between two and six months of which more than half the time is spent creating the geometry for the game. A significant amount of time is also needed for testing that the visibility, collision, and route calculation information is accurate. If the geometry and other data is not perfect, that is self-consistent and defining a complete, closed environment, the game may not work properly or at all. For example visual artefacts may be left whilst defective collision geometry, such as inconsistent or incomplete collision geometry, can allow a player's character to "fall out" of a game level through an invisible hole. The public domain and proprietary tools for game level editing facilitate the level construction process but the task is nevertheless slow and laborious. It is also difficult for inexperienced game designers to know how to optimize the data for a game level in order that the game runs relatively smoothly and does not run too slowly.

There therefore exists a need for improved methods and apparatus for constructing virtual environments, particularly virtual environments for computer games, such as levels in a first person shooter-type game.

SUMMARY OF THE INVENTION

According to the present invention, there is therefore provided a method of generating data for a three-dimensional (3D) virtual environment using a map of 3D components, the method comprising: reading map data from a data store, the map data comprising component identifying data and component position data for at least one of said 3D components; reading component data for the at least one identified component from a data store, the component data including at least 3D geometry data for the component; and transforming the 3D geometry data of the at least one component using said component position data to provide 3D virtual environment data for said 3D virtual environment, said 3D virtual environment data defining a substantially contiguous 3D surface enclosing said 3D virtual environment.

Although the map data will generally describe a map comprising two or more joined components or "tiles" the map may additionally or alternatively include separate components or tiles defining separate, closed virtual game environments, albeit within a single "game level". A player may then be placed in one or other of these separate environments at random and, in embodiments, may be able to "teleport" between the closed environments defined by the separate components or "tiles" (since there will generally be no direct "physical" route between the separate environments). Thus components or tiles which are placed on a map in arbitrary positions, without necessarily being linked, may still define a functioning virtual environment or environments and a workable game level.

Preferably the map data comprises component identifying data and component position data for a plurality of the components, and the method further comprises reading and transforming the 3D geometry data for the plurality of components and combining the transformed data for the plurality of components to provide the 3D virtual environment data.

By generating data for the three-dimensional virtual environment, which may be a game level, using three-dimensional components the virtual environment may be constructed much more quickly than by conventional means, in some cases in a matter of minutes rather than days or months. Furthermore an environment constructed in this way, from 3D components which have been pre-built and pre-tested, can be arranged to reliably work first time, every time. The method can be implemented so that it is not necessary for a user constructing the virtual environment to have any technical knowledge of the underlying data since, so far as the user is concerned, he or she merely has to provide map data specifying how the building blocks are to be assembled, the underlying data for the virtual environment being automatically managed to create the environment.

A number of other advantages also flow from the use of the above-described map data. Since the map data describes the virtual environment in terms of connected components, a map can occupy relatively little storage space, for example a few tens of kilobytes, whereas the complete data for a virtual environment such as a game level typically occupies many megabytes. This facilitates the storage of data specifying a complete virtual environment, and allows such data to be readily exchanged, for example over a computer network. Furthermore, since the virtual environment is constructed using 3D component building blocks whose positions are identified on the map, it is possible in embodiments of the method to generate visually different virtual environments, with different textures and geometries, simply by using a different set of 3D components, providing that the components have the same basic connectivity and, preferably, the same general shape. In a game this allows the theme, appearance, and internal geometry of the virtual environment of a level to be dramatically changed simply by changing one or a few data bits specifying a set of 3D components to use. The overall layout described by the map remains the same but internal details of the virtual environment are changed.

The method can either be used to compile the map data into a 3D virtual environment or map data can be inputted by a user and "interpreted" in a stepwise fashion to build-up the virtual environment a component at a time. For simplicity it is preferable that the map itself is representable to a user as a 2D plan view showing the size and connectivity of the 3D components, preferably on a grid. The 3D components of each visually different component set are preferably represented similarly on the map. The map data may be read from a non-volatile map data store, such as a memory card, or may simply be read from RAM. The component position data may specify a position in two dimensions or, where the virtual environment comprises rooms on different horizontal levels, positions in three dimensions may be specified.

The component geometry data in the above method may comprise visible geometry data for texture mapping and visible rendering, or invisible geometry data such as collision geometry data. The geometry data defines, for example, walls or floors of a room or rooms within the virtual environment or, more generally, part of a surface providing an "external" boundary for the three-dimensional virtual environment of, for example, the game level. The geometry data is transformed into the space of the 3D virtual environment, which may be termed "world space", and the transformed data is combined to join the 3D components to provide data defining a surface enclosing the 3D virtual environment.

The geometry data may comprise lists of points defining polygons, or it may comprise procedural geometry data, or it may include both these types of geometry data. Procedural geometry data typically comprises data defining geometry in terms of parametric lines and surfaces, such as data for start and end points and an equation for a line to define a curve for an arch. Such data may be interpreted by a so-called "level of detail" (LOD) procedure in which geometry detail is calculated from some procedural definition of shape, for example using a high polygon count under some conditions (such as nearby viewing) and a low polygon count under other conditions (such as distant viewing).

The surface enclosing the virtual environment is preferably contiguous, that is substantially without a break at the component interfaces, thus providing a "closed world". Generally speaking a virtual environment, such as an environment for a computer game character, must be closed to provide a defined space, world, or universe within which actions, events, and motion may take place. Although it is commonplace in computer games to visually depict sky within a virtual world this is merely an illusion formed by mapping an appropriate texture onto a surface.

Preferably each of the components has an interface portion for interfacing to other components, the component data including two versions of geometry data for the interface portion. A first version may simply define an open interface whilst a second version may, for example, define a plugged or closed interface for use in constructing the virtual environment when the component is not joined at that interface to another component. Two versions of either just the interface geometry or the complete component geometry may be stored although it is less preferable to store different versions of the complete component data, particularly where the component has more than one interface when it may be necessary to store a number of different versions of geometry data for the component corresponding to a number of different possible interface configurations.

The map data defines, for components on the map, which components are connected to which other components and, whichever storage mechanism is adopted, the appropriate data for the interface portion or portions of the components is selected according to whether or not the component is joined to another component at the interface—if the component is joined to another component at an interface the "interface open" version of the data is used; if the component is not joined at an interface the "interface closed" version of the data is selected.

Preferably the 3D components comprise a set, at least a subset of which have substantially matching interfaces, although not all the components need have the same interface type. Thus, for example, the 3D components may divide into two subsets, one with a first type of interface and another with a second type of interface, although in this case, it is preferable that there is at least one component having both types of interface.

The geometry data preferably comprises both visible geometry data for generating visible parts of the 3D virtual environment and invisible geometry data, that is data which is not directly visible although its effects may be indirectly detectable through their effect on player or non-player characters. The component data preferably includes additional game operation-related data such as collision data for use in determining allowed player character movements, navigation data for non-player characters, and portal data for determining parts of the 3D virtual environment to consider as potentially visible, for rendering. This additional game operation-related data normally has a geometric or 2D or 3D positional aspect which, like the geometry data, must usually be transformed to co-ordinates in the virtual environment or game world space. In a preferred embodiment of the method, when the components are assembled according to the map data to create the three-dimensional virtual environment the game operation-related data is also combined to operationally link parts of the 3D virtual environment derived from different components. This may comprise, for example, linking navigational data by, for example, linking navigational pads derived from different components, or it may comprise rationalizing portal data to remove excess or unwanted portals such as portals which are effectively duplicated by joining two components. Such rationalization of portals may be performed before or after transforming the game operation-related data into game world space. The portal data may either determine parts of the virtual environment which must be rendered for potential screen display or, equivalently, it may determine parts of the virtual environment which need not be rendered for potential screen display. Generally 3D transformations will be necessary to transform game operation-related data into world space.

Breaking the virtual environment down into 3D components facilitates a number of optimizations of the 3D virtual environment data for a game level, in particular, navigation, collision, and rendering optimization. The modular structure of the environment tends, of itself, to lead to collision geometry and navigational pad positioning having a modular, structured arrangement which tends to work better than the less structured arrangements generally produced when manually creating a level from scratch. As described in more detail later, the modular components preferably incorporate viewing portals at their interfaces to other components, effectively imposing a structure of portals on the virtual environment geometry which would in general not be incorporated when manually constructing a level. Furthermore, since processing portal data imposes a load on the game engine, it is important to position portals properly so that they are not too large but still usefully subdivide the virtual environment into graphically meaningful zones. This can be achieved by positioning portals in doorways, at the entrances to passageways, and other similar locations, and by locating portals at the component interfaces the portals are usually automatically placed in good or approaching optimal positions within the virtual environment whatever the internal geometry of the components or the overall structure of the environment. Portals at the interfaces generally subdivide the environment into geometrically and graphically meaningful zones in general without the portal size being unduly large.

Thus generally optimization arises naturally from the modular component-based structure of the virtual environment, although it should be noted that optimized game data does not inevitably flow from the use of components as described. For example, a large space constructed from a number of small components will include a large number of interfaces within the space which will often be inefficient in terms of computational processing power required for the environment and in terms of memory usage.

In a preferred embodiment of the method, the component data comprises data for at least two sets of 3D components, preferably with the same basic connectivity and preferably with the same general shape, but with different visual appearances. The different visual appearances may be provided by different textures, but preferably the sets of components also have different internal geometries. This allows virtual environments with very different visual appearances to be created from a single map by selecting one of the sets of components for use in constructing the virtual environment. Preferably the components in each set have a similar themed visual appearance to provide a themed "look and feel" to an environment constructed using the set of components. Thus, for example, sets of 3D components for an industrial environment, a gothic environment, a space port environment, and an alien environment may be provided.

Thus, according to a further aspect of the invention, there is provided a method of generating data for a three-dimensional (3D) virtual environment using a map of 3D components, the method comprising: reading map data from a data store, the map data comprising component set data identifying a said set of 3D components for use in generating said 3D virtual environment data, component identifying data and component position data for said 3D components; reading from a data store component data for the identified components from the identified set, the component data including at least 3D geometry data for the components; transforming the 3D geometry data of the said components using said component position data; and combining the transformed data to provide 3D virtual environment data for said 3D virtual environment.

By reading map data identifying a set of 3D components for use in constructing the virtual environment, the look and feel of a virtual environment may be changed by changing the set of components used to construct the environment. In this way a game provider can make new tilesets available, for example by sale over the Internet, to increase the enjoyment and use game players can make of their saved maps by effectively providing a means of creating new virtual environments from existing maps. In a similar way game players may be permitted to design their own tilesets and exchange them within a user community.

According to a yet further aspect of the invention, there is provided a method of generating data for a three-dimensional (3D) virtual environment using a map of 3D components, each component having one or more interface portions for interfacing to others of the components, a said interface portion having an associated plug comprising plug data for providing component geometry to close the interface when the interface is not used to connect to another component; the method comprising: reading map data from a data store, the map data comprising component identifying data and component position data for said 3D components; reading component data for the identified components from a data store, the component data including 3D geometry data for the components; reading plug data for a component on the map with one or more interfaces not connected to other components; transforming the 3D geometry data of the said components using said component position data; transforming the plug data of said component using said component position data; and combining the transformed data to provide 3D virtual environment data for said 3D virtual environment.

By transforming the plug data of the components as well as the 3D geometry data unused interfaces of components can be automatically closed off, thus enabling the provision of a fully enclosed and bound virtual environment for the game level no matter how the blocks are connected. In this way it is possible to ensure that each map of components, whatever their relative arrangements, generates a fully working game level without the need for weeks of testing to check, for example, that there are no holes in the level's geometry.

In another aspect the invention provides data processing apparatus for generating data for a 3D virtual environment using a map of 3D components, the apparatus comprising: a data memory storing component data and operable to store map data, the map data comprising component identifying data and component position data for at least one of said 3D components, the component data including at least 3D geometry data for the at least one component; an instruction memory storing processor implementable instructions; and a processor operable to read and process data from the data memory in accordance with instructions stored in the instruction memory; wherein the stored instructions comprise instructions for controlling the processor to: read said map data from the data memory; read said component data from the data memory; and transform the 3D geometry data of the at least one said component using said component position data to provide 3D virtual environment data for said 3D virtual environment, said 3D virtual environment data defining a substantially contiguous 3D surface enclosing said 3D virtual environment.

The invention also provides data processing apparatus for generating data for a three-dimensional (3D) virtual environment using a map of 3D components, the apparatus comprising: a data memory operable to store map data, the map data comprising component set data identifying a said set of 3D components for use in generating said 3D virtual environment data, component identifying data and component position data for said 3D components; and storing component data including at least 3D geometry data for the components; an instruction memory storing processor implementable instructions; and a processor operable to read and process data from the data memory in accordance with instructions stored in the instruction memory; wherein the stored instructions comprise instructions for controlling the processor to: read said map data from said data memory; read component data for the identified components from the identified set from said data memory; transform the 3D geometry data of the said components using said component position data; and combine the transformed data to provide 3D virtual environment data for said 3D virtual environment.

The invention further provides data processing apparatus for generating data for a three-dimensional (3D) virtual environment using a map of 3D components, each component having one or more interface portions for interfacing to others of the components, a said interface portion having an associated plug comprising plug data for providing component geometry to close the interface when the interface is not used to connect to another component; the apparatus comprising: a data memory operable to store map data, the map data comprising component identifying data and component position data for said 3D components; and storing component data including 3D geometry data for the components and said plug data for the components; an instruction memory storing processor implementable instructions; and a processor operable to read and process data from the data memory in accordance with instructions stored in the instruction memory; wherein the stored instructions comprise instructions for controlling the processor to: read said map data from said data memory; read component data for the identified components from said data memory; read from said data memory plug data for a component on the map with one or more interfaces not connected to other components; transform the 3D geometry data of the said components using said component position data; transform the plug data of said component using said component position data; and combine the transformed data to provide 3D virtual environment data for said 3D virtual environment.

In a further aspect, the invention provides a method of generating a 3D virtual environment for a computer game character by assembling a plurality of 3D building blocks, each 3D building block having data defining a portion of a 3D virtual environment and an interface, the method comprising: inputting position data defining a set of relative positions for the blocks; and joining interfaces of the blocks using said position data, to generate a 3D virtual environment defined by a plurality of said blocks.

It is not essential that the 3D building blocks include plug data as described above since the blocks could be positioned such that all their interfaces are always connected to other blocks. In this case it is preferable (but not essential) that at least one of the blocks has only a single interface. Similarly it is not essential to include portal data, since portals are used to speed-up rendering of the virtual environment's graphics and may not be needed if the game is running on a fast processor or if the environment is relatively small. Navigation data may not be necessary since the computer game may not include non-player characters, for example in a "deathmatch" mode. Likewise, the visual geometry of the 3D virtual environment may be used as the collision geometry. However, the building block data will generally include data defining at least a visual portion of the 3D virtual environment.

The position data for the blocks may be inputted from a user or game player, or from a data file generated, for example, by map builder software. Generally the interfaces of the blocks will be joined in a virtual environment compilation process having the position data as an input to the process, but where a user inputs position data in a stepwise fashion building-up an environment one block at a time, the interfaces may be joined one block at a time as the position data is input. The virtual environment or map compilation process code may be integrated into the game engine. Since the virtual environment is a three-dimensional virtual environment the block interfaces for at least the visual geometry are defined and joined in three dimensions, although this is not necessarily the case for other game-related data such as navigation data.

In a preferred embodiment of the method, data for two versions of at least the interface portion of each building block is provided, either as two separate datasets for a block or as one dataset and associated interface plug data. The appropriate version of the interface data for the block is then selected, either when the block is placed on a map for the virtual environment, or when the block is joined to other blocks, or at the map compilation stage. Generally within a set of blocks the internal geometry of a block is variable but the interface geometry is fixed, although the interface geometry may be different in different sets of blocks. Each block generally also has two versions of collision geometry data, one version in which the interface portion is open, and a second version in which the interface portion (or portions) of the block has a wall (or floor) across the interface. In a preferred embodiment of the method only one version of navigation data is provided for each block, for example comprising position pads and linked between the pads defining allowed movements, and where blocks are joined the navigation data is joined by creating links between pads on either side of the interface. Where a block's interface is not joined to another block no link is made which, in effect, prevents motion through the (closed) interface.

The joining process preferably comprises translating at least the visual geometry data for each block to its appropriate position, for example as defined by a block map, and then, if necessary, removing interface plugs and, optionally, linking navigation data for the blocks. The virtual environment may be generated from the data resulting from joining the blocks by, for example, interpreting this data using a game engine or other virtual environment generation/visualization software.

According to a corresponding aspect of the invention, there is provided data processing apparatus for generating a 3D virtual environment for a computer game character by assembling a plurality of 3D building blocks, each 3D building block having data defining a portion of a 3D virtual environment and an interface, the apparatus comprising: a data memory operable to store position data; an instruction memory storing processor implementable instructions; and a processor operable to read and process data from the data memory in accordance with instructions stored in the instruction memory; wherein the stored instructions comprise instructions for controlling the processor to: input position data defining a set of relative positions for the blocks; and join interfaces of the blocks using said position data, to generate a 3D virtual environment defined by a plurality of said blocks.

According to another aspect of the invention, there is provided a method of constructing a three-dimensional world for a computer game using a set of predetermined three-dimensional tiles and a map specifying relative positions for the tiles, each tile comprising tile data including tile visual geometry data for defining visual geometry of the 3D world and invisible game control data; map data comprising tile identification data and tile position data identifying tiles from the set and their positions; world data comprising world visual geometry data and world game control data for the computer game, in a three-dimensional world space; the method comprising: reading the map data; transforming the visual geometry data into said world space, using the map data, to generate said world visual geometry data; and transforming the invisible game control data into the world space, using the map data, to generate said world game control data.

In one embodiment, the method also includes providing a user interface for constructing the map, the user interface representing the three-dimensional world as a series of two-dimensional levels (as distinct from game "levels" or virtual environments) on which the three-dimensional tiles may be placed. Although the map could be represented in three dimensions it is generally easier for a user to comprehend a two-dimensional map, on which the tiles may be represented in three, or preferably substantially two dimensions. Where the map comprises a series of two-dimensional levels the virtual environment may be restricted to a single plane, albeit comprising portions of a virtual environment at different horizontal levels within the environment, but preferably an environment comprising a plurality of stacked planes is constructable. In this case, where the displayed map is effectively in two dimensions it is desirable to be able to provide a simple representation for the connections between levels and, in one embodiment, this is done by providing tiles which span more than one level or plane so that the same tile appears on two or more levels or planes. In other arrangements the tiles may be provided with interface portions in their floors or ceilings.

The method preferably also includes selecting the set of predetermined tiles from a plurality of such sets, each set providing different versions of the tiles but, for any given tile, the interface features of the other versions of the tile substantially corresponding. This allows tilesets to be substituted to simply and quickly generate different virtual environments.

The invention further provides a corresponding data processing apparatus for constructing a three-dimensional world for a computer game using a set of predetermined three-dimensional tiles and a map specifying relative positions for the tiles, each tile comprising tile data including the visual geometry data for defining visual geometry of the 3D world and invisible game control data; map data comprising tile identification data and tile position data identifying tiles from the set and their positions; world data comprising world visual geometry data and world game control data for the computer game, in a three-dimensional world space; the apparatus comprising: a data memory operable to store said map data, and storing said tile data: an instruction memory storing processor implementable instructions; and a processor operable to read and process data from the data memory in accordance with instructions stored in the instruction memory; wherein the stored instructions comprise instructions for controlling the processor to: read the map data; transform the visual geometry data into said world space, using the map data, to generate said world visual geometry data; and transform the invisible game control data into the world space, using the map data, to generate said world game control data.

In other aspect, the invention provides a method of providing data for constructing a virtual 3D environment using predetermined 3D constructional elements, the elements having interfaces for connecting one element to another; the method comprising: representing said 3D constructional elements to a user; inputting instructions from the user for assembling the elements into a structure in which the elements are connected at the interfaces, the structure representing the virtual 3D environment; representing the structure to the user; and storing structure data representing the structure on a storage medium for constructing the virtual 3D environment.

Data for representing the 3D constructional elements to a user may be stored in a data store, together with additional data relating to the constructional elements for use in assembling the elements into the structure. This additional data may comprise, for example, shape data indicating a general shape for a structural element and interface data indicating a location and, optionally, type of interface for each element.

The method allows the rapid creation of levels using the predetermined constructional elements or "tiles". The tiles preferably comprise all the required geometry, texture, visibility, collision, and route calculation data required for constructing a virtual 3D game environment or game "level". The constructional elements or tiles preferably also include a selection of suitable positions for players, weapons, NPC spawn points, and the like which can be chosen by the user. Creating a game level using the method is then simply a matter of selecting and joining the constructional elements or tiles, for example by placing selected elements onto a map or grid.

As explained above, typically a computer game's lifetime is relatively short and, once played, it loses its appeal. The virtual environment lacks novelty and the positions of NPCs such as monsters, weapons, secrets and the like are known. Previous game designers have attempted to get around this problem by providing selectable levels of difficulty for a game according to which more NPC spawn points are employed or the likelihood of a spawn point generating an NPC is increased in order to increase the apparent difficulty of a game level. However, this strategy does not generally add significantly to the enjoyment of a game once played.

By allowing the user to assemble constructional elements into a structure for constructing a virtual 3D environment for a game level, a game user or player can greatly increase the enjoyment derived from a game by constructing their own game layouts against which to try their skill. The structure data representing these layouts may be stored, for example on a computer-readable medium, for later reuse, sale, or exchange or it may be transmitted, for example to the game designer or publisher or to other players. The layout of a game's level is a major factor in the game's playability, and level design can be particularly important for multi-player game modes, such as the "deathmatch" mode, and using the above-described method the playability of different game levels can be readily checked and assessed. This can be useful, for example, for computer game tournaments or competitions.

In the above-described method, the three-dimensional constructional elements may be represented to the user in either two dimensions, or three dimensions, or both. The structure is preferably represented in a simplified form, showing the general shape and connectivity of the constructional elements but preferably without confusing internal geometry details. The structure may be represented on-screen in either two dimensions or three dimensions but preferably structure assembly uses a two-dimensional representation whilst other operations such as the placement of items such as weapons, are carried out in a pseudo-three-dimensional representation. Generally the inputting of instructions from the user and the representing of the structure to the user will take place concurrently so that the user can see the assembly taking place. In a preferred embodiment, interface portions or "plugs" on the constructional elements are illustrated by coloured portions of the elements showing where the elements or tiles may be connected.

The structure data may be stored in RAM or in non-volatile storage, for example on a disk or CD-ROM or in Flash RAM or on a memory card or may be transmitted to a remote location for storage.

Preferably the method includes inputting item placement instructions from the user and storing corresponding item placement data. The items may be visible, "physical" items or invisible (or at least not directly visible) functional items such as NPC spawn points.

Preferably the structure data includes element or tile identification data, element or tile position data, and element or tile connection data, specifying positions of, and connections between, elements (or tiles) comprising the structure. This structure data is used for generating a 3D virtual environment or game level as described above and, effectively, constitutes a map of the elements or tiles and their connections. The connections between the elements or tiles may, in embodiments, be deduced from the relative positions of the elements or tiles and, where their orientation can be changed, from their orientations, but in other embodiments the connection data is stored together with the other structure data.

In a corresponding aspect, the invention also provides data processing apparatus for providing data for constructing a virtual 3D environment using predetermined 3D constructional elements, the elements having interfaces for connecting one element to another, the apparatus comprising: a data memory operable to store structure data representing the structure for constructing the virtual 3D environment, and storing data for representing said 3D constructional elements to a user; an instruction memory storing processor implementable instructions; and a processor operable to read and process data from the data memory in accordance with instructions stored in the instruction memory; wherein the stored instructions comprise instructions for controlling the processor to: represent said 3D constructional elements to a user; input instructions from the user for assembling the elements into a structure in which the elements are connected at the interfaces, the structure representing the virtual 3D environment; represent the structure to the user; and store said structure data on a computer readable carrier.

In another aspect, the invention provides a user interface for constructing a representation of a three-dimensional virtual environment using predetermined constructional elements, each element defining a 3D geometry for use in defining a region within the 3D virtual environment, the user interface comprising: a selection component for the user to select a said predetermined constructional element; a placing component for the user to place the selected element in relation to other placed elements; and a joining component to join the placed elements to provide a representation of the 3D virtual environment.

The placing component preferably allows the user to place the selected element on a two-dimensional map grid and, preferably, a level or plane selection component is also provided to allow the user to select from one of a series of such 2D levels or planes. Preferably some of the elements link or span more than one such level or plane to allow a three-dimensional environment comprising a plurality of levels or planes to be constructed. The representation of the 3D virtual environment may be, for example, a two-dimensional map on which, in a preferred embodiment, interfaces between the elements are represented as a line, a colour of the line changing to illustrate a type, for example size, of interface. The joining component may, therefore, join the placed elements on the 2D map at their interface portions by, for example, eliminating the interface lines of components joined at the interface to give the appearance of a larger single component. The user interface may also provide a representation of the three-dimensional virtual environment constructed by the user to allow a user, for example, to view the virtual environment at points during its construction.

Preferably the placed and joined elements comprise a map of the 3D virtual environment and preferably the user interface includes a map save component for saving data representing the map. This data comprises element identification data and position data and, optionally, orientation data and item position and identification data. The map data may also include other data, for example special effects data but does not need to include data such as visual geometry data, texture data, collision geometry data, and the like.

According to another aspect, the invention also provides corresponding data processing apparatus for providing a user interface for constructing a representation of a three-dimensional virtual environment using predetermined constructional elements, each element defining a 3D geometry for use in defining a region within the 3D virtual environment, the apparatus comprising: a data memory storing data representing said predetermined constructional elements; an instruction memory storing processor implementable instructions; and a processor operable to read and process data from the data memory in accordance with instructions stored in the instruction memory; wherein the stored instructions comprise instructions for controlling the processor to provide for said user interface: a selection component for the user to select a said predetermined constructional element; a placing component for the user to place the selected element in relation to other placed elements; and a joining component to join the placed elements to provide a representation of the 3D virtual environment.

The above-described methods (and user interface) may be implemented on a general-purpose computer, or on a more specialized games machine, as computer-readable instructions or software code (including data, where appropriate) for controlling the computer or games machine. These instructions and/or this code may be embodied on any conventional carrier medium such as a storage medium, for example a floppy disk, CD-ROM, programmable memory device, or magnetic tape device, or by a signal on a signal carrier, such as an electric or optical signal carrying the instructions/code and data, for example over a communications network such as the Internet. Accordingly the invention also comprises computer-readable code on a carrier medium for implementing the above-described methods and user interfaces.

According to a further aspect of the invention, there is provided a data structure on a carrier medium, the data structure comprising data for use in constructing a virtual 3D environment from predetermined constructional elements, each constructional element having geometry defining a three-dimensional space and having at least one interface for connecting the element to another of said predetermined elements, the data structure defining an arrangement of said elements and comprising constructional element identification data and constructional element position data for each of a plurality of said elements.

The data structure, broadly speaking, provides map data for an arrangement of the constructional elements which can be used to generate one or more corresponding virtual environments or game levels by using selected sets of elements or tiles. The data structure may be stored on a computer-readable storage medium such as a floppy or hard disk, CD-ROM or the like, or may be provided as an electrical signal on a carrier, such as a computer network connection. Preferably the data structure includes object placement data, such as object position and object identification data, for use in determining the placement of objects within the virtual 3D environment. The objects may be visible or invisible, and physical or functional.

In another aspect, the invention provides a data structure on a carrier medium, the data structure comprising data for a 3D constructional element for use in constructing a virtual 3D environment, the data comprising 3D geometry data defining a 3D surface for use in defining a portion of a bounding surface of said virtual 3D environment, said 3D virtual environment being located within said bounding surface.

This data structure, broadly speaking, provides data for a 3D constructional element or "tile" for use with the above map data structure for constructing a game level or other virtual 3D environment. The geometry data may comprise visible geometry data, or collision geometry data, or both. The geometry data defines a 3D surface which, together with 3D surfaces from other constructional elements or tiles, can be used to construct a bounding surface for the virtual 3D environment. Correspondingly, the virtual 3D environment is enclosed within a bounding surface, a portion of which is provided by the 3D constructional element defined by the data structure. The geometry data may define a 3D surface with an open interface portion, and then preferably includes geometry data for closing the interface portion of the surface, unless the interface portion is constrained to be interfaced to another element or tile.

Preferably a set of such data structures or a data structure for a set of such 3D constructional elements is provided for flexibility in constructing a range of different environments. A range of such tilesets may be provided each with a different visual theme, such a theme being determined by the texture data and/or internal (as opposed to interface) 3D geometry of the tiles. Preferably with such a collection of tilesets each constructional element or tile has a version or counterpart in each tileset preserving the connectivity of the element or tile so that a given map or arrangement of elements or tiles can be used with any of the tilesets for creating a valid virtual environment. In this context the connectivity of an element or tile relates to the number and type of other elements or tiles with which the element or tile may interface and, hence, relates to the number, type and position of interfaces of the element or tile. Broadly speaking, the condition is that a map of the elements or tiles should be translatable into a valid virtual environment when the map is used in conjunction with any of the tilesets. To achieve this the corresponding tiles in each set preferably have the same general shape and interface portions, although their internal geometry and other data will generally be different.

Data for one or more tiles or tilesets may be provided on a computer-readable carrier such as a disk or memory card or may be provided in downloadable form on a server connected to a computer network such as the Internet. The tile or tileset data is usable by map builder software as described above for defining an arrangement or map of the elements or tiles, and by map compiler and/or game engine software for compiling or interpreting map or structure data to create a virtual 3D environment for playing a computer game. The data for the 3D constructional element or tile may therefore also include one or more of portal data, collision geometry data, and navigation data such as pad position and link data.

In another aspect the invention provides a method of generating data for a three-dimensional (3D) virtual object using a set of 3D components, the method comprising: reading from a data store component identifying data and component position data for at least one of said 3D components; reading component data for the at least one identified component from a data store, the component data including at least 3D geometry data for the component; and transforming the 3D geometry data of the at least one component using said component position data to provide 3D virtual object data for said 3D virtual object, said 3D virtual object data defining a substantially contiguous 3D surface enclosing said 3D virtual object.

In a further aspect the invention provides a method of generating a 3D object for a computer game by assembling a plurality of 3D building blocks, each 3D building block having data defining a portion of the 3D object and an interface, the method comprising: inputting position data defining a set of relative positions for the blocks; and joining interfaces of the blocks using said position data, to generate a 3D object defined by a plurality of said blocks.

Similar principles to those outlined above, for using a map of building blocks to construct a virtual environment may also be employed for constructing other types of virtual object for a computer game such as, for example, robots. Thus the foregoing methods allow a set or sets of building blocks for robots to be defined and then assembled by connection at their interfaces. In a similar manner to that described above a "map" of the building blocks may be constructed to define the relative positions of the components and then this map may be interpreted or compiled to produce three-dimensional (virtual) objects for the game. Again by employing different "tilesets" a plurality of different objects may be constructed or built from the same basic map. The map serves as a constructional plan or template which is used to position components in either two, or preferably three, dimensions. Such a map or plan may define the basic characteristics of a robot, for example, the robot's general shape, the position and type of its weapons, its locomotion (wheels, tracks, or legs) and the like, and this map or plan may then be combined with different building blocks or tilesets to create robots of significantly different visual appearance and, optionally, of different operational capabilities. Components with "plugs" or interface parts may be connected to provide visual geometry for such objects as outlined above and as described in more detail below, and in addition functional or operational aspects of the building blocks may also be combined where there is an operational relationship between parts of the object constructed from different component elements (although this is optional and may only be implemented for more advanced types of objects and games). Since the principles for joining different parts of visual geometry of an object correspond to those described below with reference to constructing a virtual environment from component elements, for simplicity the following description will be restricted to a description of the construction of a 3D virtual environment from 3D building blocks. The skilled person will, however, recognize that the method can readily be adapted for constructing other types of 3D object, such as 3D robots for a 3D computer game.

BRIEF DESCRIPTION OF THE DRAWINGS

These and other aspects of the invention will now be further described, by way of example only, with reference to the accompanying figures in which.

DETAILED DESCRIPTION OF EMBODIMENTS

Figure 2:
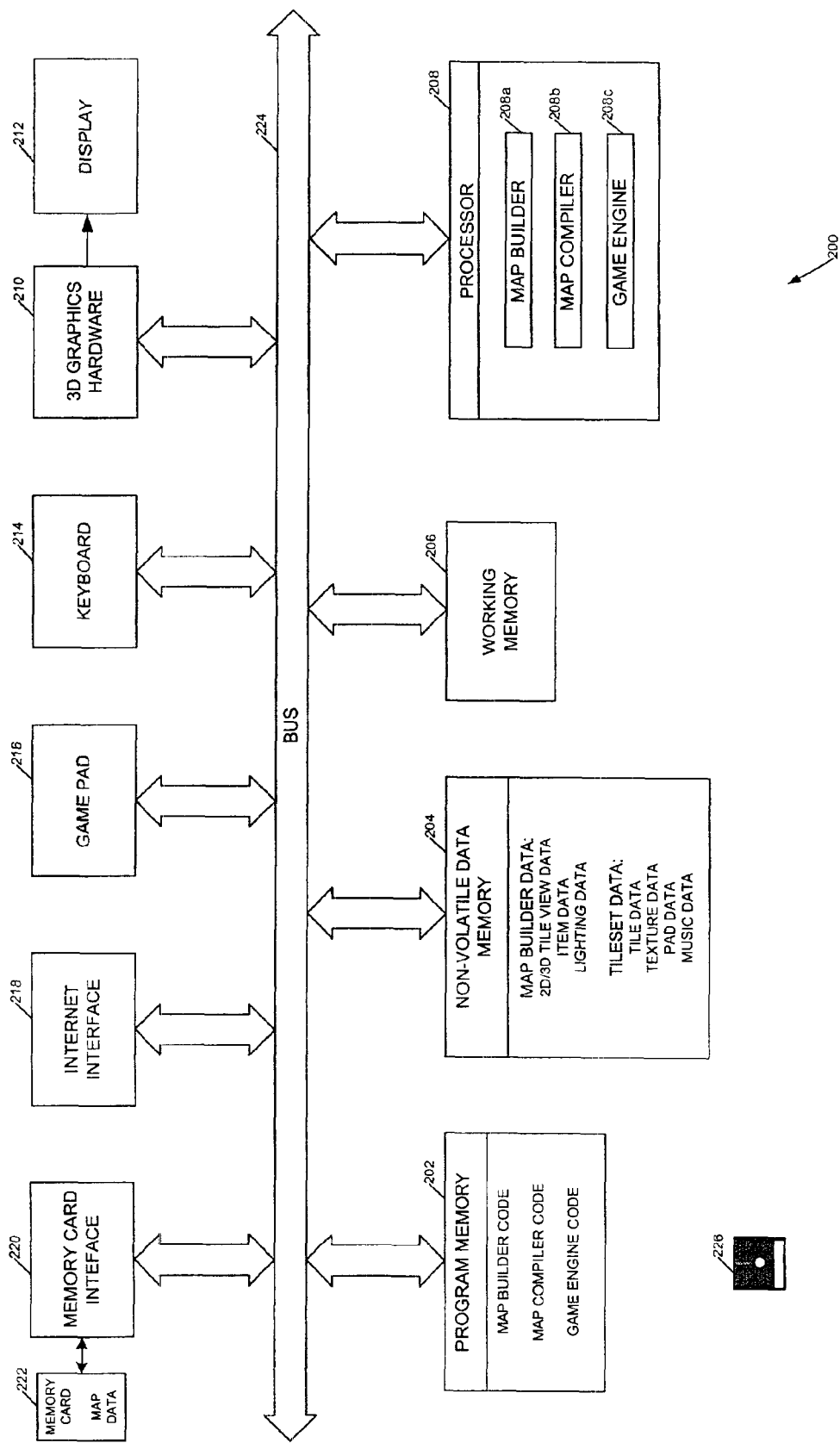
FIG. 2 shows a schematic illustration of components in a computer system suitable for implementing the present invention.

Referring first to FIG. 2, this shows a schematic illustration of the components in a computer system 200 which is suitable for implementing the present invention. The computer system includes program memory 202 comprising map builder code to allow a user to build a map of 3D components for creating a virtual environment, map compiler code for compiling the map into 3D virtual environment data, and game engine code for processing the 3D virtual environment data and rendering the data into a screen viewport for playing a computer game. The game engine code also provides the game functionality. As the skilled person will appreciate the map builder, map computer and game engine may comprise separate applications or may be combined, for example in a single application. Similarly the program code may be run on a single machine or distributed across a plurality of machines.

The program memory 202 is coupled to a processor 208 via a general purpose bus 224, to which is also coupled 3D graphics hardware 210 which provides an output to a display 212 such as a computer monitor or, for example via a SCART connection, a television. The processor 208 loads program code from program memory 202 and implements the code to provide a map builder 208a, a map compiler 208b and a game engine 208c. Also present, but for reasons of clarity not illustrated in FIG. 2, is computer operating software which may include driver software for the 3D graphics hardware 210 providing standard API call interfaces via Open GL or Direct 3D instructions.

The game engine 208c includes a rendering engine for rendering 3D graphics into a screen view port using 3D graphics hardware 210. The map compiler 208b may be part of game engine 208c although, preferably, a map compiler is also incorporated into map builder 208a to allow a user to preview the 3D environment specified by a map created using the map builder code. For simplicity bus 224 is shown as a single bus but, as a skilled person will appreciate, in practical embodiments of a computer system it may comprise a plurality of separate buses.

Also coupled to bus 224 is working memory 206, typically an area of RAM, for the processor to use in performing calculations, and non-volatile data memory 204 storing data for use by the map builder, map compiler and game engine code. The non-volatile data memory 204 stores data, described in more detail below, comprising map builder data and tileset data. The map builder data comprises data for presenting to a user a view of tiles used in constructing the map in two dimensions and preferably also three dimensions, item data to allow a user to place specified items within the map, and lighting data to allow a user to define lighting for regions within the 3D environment defined by a map generated by the map builder code. The tileset data includes data for generating a 3D environment once tiles and their positions have been specified, but need not include the 2D/3D tile view data employed by the map builder code to present representations of tiles to a user during the construction of a map.

The tileset data comprises tile data for a plurality of tiles comprising a set of tiles with a common themed visual appearance, "texture" data providing texture image data for mapping onto polygons defined by geometry within the tile data, pad data for use in route calculations by game engine 208c for determining artificial intelligence navigation of non-player characters through a 3D virtual environment created using the computer system, and music data to provide background music during game play.

In embodiments of the invention the non-volatile data memory 204 may also store map data defining a map of tiles and their positions generated by the map builder code, for use as required in constructing game levels. The non-volatile data memory 204 may comprise any conventional storage device such as a fixed or removable disk drive, a CD ROM, flash RAM, or other non-volatile memory storage.

The tileset data preferably includes tile data for a number of different tilesets, each with a different themed appearance, such as a gothic tileset, an industrial tileset, an alien tileset and a space port tileset, and may also include a further "neutral" tileset which comprises a skeleton form of the internal geometry of the other tilesets. This skeleton tileset may be referred to as tileset zero and, in some embodiments of the invention, the 2D/3D tile view data may be derived from geometry data from tileset zero.

The tile data in non-volatile data memory 204 preferably also includes item placement data comprising data identifying a plurality of pads within each tile of the tileset on which, or associated with which, items may be placed within the 3D virtual environment of the game. It is preferable that each position on which an item may be placed using the map builder code should have a corresponding position within each tileset although the position within a specified tileset need not be the same as a position within another tileset of a different themed appearance. It is, however, generally preferable that a number of points at which items may be placed are defined and that each of these points maps to a point within a tile of each tileset in the general vicinity of the specified point, although the exact placement of an item may vary according to the internal geometry of a tile within a tileset. In embodiments of the invention item placement data may be derived from pad data defining allowed positions for placing items within tileset zero. The item data may comprise an item type, item specifying, and item image, for example to specify a level 2 machine gun and provide an image of the gun. The lighting data preferably comprises data allowing a user to select a number of different types of lighting such as slow flickering lighting, fast flickering lighting, pulsing lighting, lighting colour and the like.

A memory card interface 220, separately couplable to a memory card 222, is usable to store map data on memory card 222, the map data being generated by the map builder code. Memory card 220 is typically a credit card sized removable memory card storing around 8 MB of data, each map occupying between 5 KB and 10 KB. A memory card may therefore also be used to store other data, for example tileset data, if desired. The map data stored on memory card 222 comprises data identifying a tileset to use and tile data including, for a plurality of tiles, a tile identifier, a tile position, a tile orientation, tile item data, tile lighting data, and, optionally, tile connectivity data specifying which of the interfaces of the tile are connected to other tiles.

The tileset data stored in non-volatile data memory 204 comprises data for a plurality of tiles within each tileset. The tile data comprises, for each tile, room or hall data specifying a number of rooms or halls within the tile, visual geometry data, plug geometry data, collision geometry data, portal data, lighting data, and other data such as glass data, special effects data and the like. This is described in more detail later.

Bus 224 also couples processor 208 to a game pad 216 typically comprising one or more joysticks and a number of pushbuttons for use in playing a game provided by game engine 208c, an optional keyboard 214, for example for entering player names and map names or, for general purpose use in a general purpose computer, and an Internet interface 218 to allow multiple players to play a single game within a single virtual environment or game level. The Internet interface 218 may be replaced or supplemented by a local area network or wide area network interface to facilitate more rapid game play, particularly where larger amounts of data must be transferred across the network.

The program code in program memory 202, and the data in non-volatile data memory 204 and in memory card 222 may be stored on a removable computer readable storage medium illustratively depicted by floppy disk 226.

Figure 3:
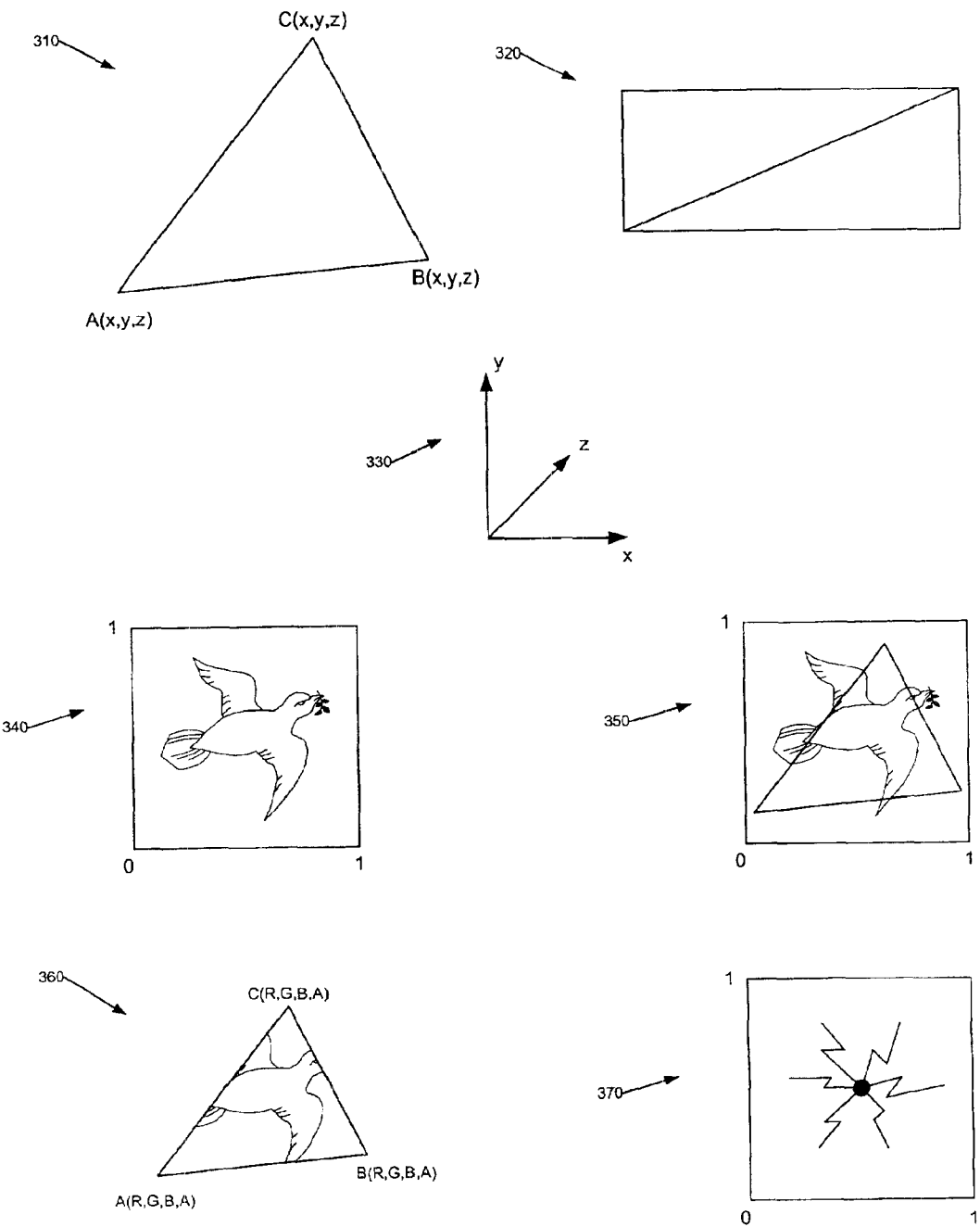
FIG. 3 shows elements typically used in implementing a 3D virtual environment in a prior art first person shooter-game.

Referring next to FIG. 3, this shows elements 300 typically used in implementing a 3D virtual environment in a prior art first person shooter-game. These elements are also used in implementations of the present invention and are, generally speaking, well-known and standard within the computer games industry.

The 3D virtual environment of a game level is created using visual geometry defined by a plurality of polygons such as triangle 310 or quadrilateral ("quad") 320 composed of two triangles. Triangle 310 is defined by three points A, B and C which define a flat two dimensional surface in three dimensional space, each point A, B, C being defined by three co-ordinates x, y, z in the 3D spaces as illustrated by co-ordinate axis 330. Since the visual geometry of the game level virtual environment bounds the virtual environment, it is useful to be able to define the interior and exterior or front and back surface of the triangle or polygon and this is generally done by defining a clock wise sequence of points as indicating the front surface of a polygon.

To increase the realism of a virtual environment so-called textures are mapped onto the polygons, in the illustrated example onto triangle 310. These "textures" comprise image files (rather than geometry data) which are effectively painted onto the polygons to create required appearance of a floor, wall, brick work, metal, or the like. In FIG. 3, an exemplary texture is illustrated at 340 and comprises a picture which, in general, is coloured. The co-ordinates of image 340 run from zero to one in two axes and, as illustrated at 350, the co-ordinates of the polygon or triangle 310 are mapped into the texture image space 340 and the image is "painted" onto the polygon, truncated where appropriate, resulting in a painted or textured polygon as illustrated at 360. Triangles are often used in decomposing the 3D geometry of a virtual environment since hardware is available for manipulating triangle data but the same principles apply to quadrilaterals and higher polygons which may, for convenience and/or speed of handling by dedicated hardware, be sub-divided into triangles as illustrated for quadrilateral 320.

To increase the realism of the 3D virtual environment or game level, it is desirable to include lighting effects within the virtual environment. Generally speaking, it is computationally inefficient to calculate lighting effects using raycasting but in practice it has been found that effective lighting can be created using much simpler algorithms. The lights themselves may simply comprise textures painted onto the visual geometry of the virtual 3D environment. However, to give the effect of illumination, rather than define separate textures for illumination and no illumination, the texture data mapped onto a triangle (or polygon) may be modified to give the effect of lighting. The positions of such lighting effects may be defined by so-called glow polygons defining, for example, regions within which screen space lighting texture effects are drawn.

To create a lighting effect the three vertices A, B, and C of triangle 360 are each provided with a red, green, blue, alpha (transparency)-R, G, B, A,-value. These (R, G, B, A) values modify the texture image data in accordance with the lighting to generate an illuminated or dimmed effect. The red, green and blue values of each of the triangle's vertices are interpolated in screen space to create a plurality of R, G, B values and each of these is then multiplied by the R, G, B value of the texture image pixel it overlays to generate a modified texture image. For example, if the R, G, B values at each of the vertices are 255 the vertex colour values are all white and the texture image is unchanged. Thus if, for example, the texture image comprises a black and white grid, the grid remains black and white. The vertex colour values are the colour values defined by the R, G, B values at each vertex. If, therefore, in another example, the R, G, B vertex colour values are instead 255,0,0 (which corresponds to red) a black and red rather than a black and white grid results from applying the vertex colour-based lighting effect.

The alpha value of each vertex defines a transparency value which, again, is interpolated between points A, B and C. When rendering a triangle (or polygon) into a screen view port, each view port pixel has a colour dependent upon what polygon is visible. Polygon sorting or a so-called "z-buffer" comprising an additional z co-ordinate may be used to determine which graphical elements or polygons are in the foreground on the screen, and which are in the background.

As an initial step all the geometry for a virtual environment or game level is rendered into a viewport and components of the data with a z co-ordinate which is closer to the camera or eye view point overwrite data from more distant parts of the virtual environment. In this arrangement, a distant object within the virtual environment are rendered first and nearer parts are rendered later. Thus, for example, where the virtual environment includes a distant spacecraft and a nearby building, the spacecraft is rendered first and the building is rendered later. Where, in screen space, a pixel of the building overlies a pixel of the space craft, the rendering engine performs a read/write operation.

Initially, the spacecraft pixel at, for example, z=1,000 m, is read and then the corresponding building pixel R, G, B, A, value at, for example, z=500 m from the player's character's view point (or eye or "camera" viewpoint) is determined and a hidden surface removal operation is performed. If the building pixel has an alpha value of zero, the building pixel completely obscures the space craft pixel behind it but if, however, the building pixel has an alpha value of greater than zero, the building has a non-zero transparency and does not therefore completely overwrite the space craft pixel but instead the space craft pixel value is modified by the building pixel value according to the transparency value of the building pixel.

The use of such transparency data simplifies rendering of certain visual effects such as foliage. For example, the frond of a fern may be modelled by a simple polygon with texture data in which the alpha value is close to 1 where the frond is in effect transparent. This is much less computationally intensive than modelling the frond of a fern using a plurality of polygons. Similarly, a grid may simply comprise a quadrilateral onto which a grid-like transparency texture is painted to allow the environment behind the grid to be viewed through the grid. Thus, optionally, a transparency texture such as texture 370 in FIG. 3 may be applied after the conventional texture image 340. The transparency data 370 of FIG. 3 illustrates a bullet hole and splinter marks, which is particularly advantageous for applying to a wooden or glass textured surface within the 3D virtual environment to create the effect of a bullet leaving a mark on a wall or window.

Figure 4A:
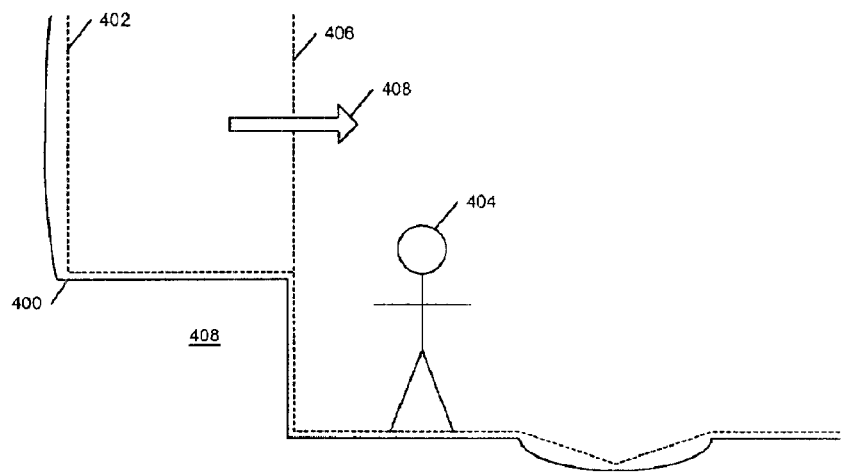
FIG. 4a shows a schematic illustration of visual geometry and collision geometry of a 3D virtual environment for a game.

FIG. 4a shows a schematic illustration of visual geometry 400 (solid line) and collision geometry 402 (dashed lines) of a vertical section through a 3D virtual environment for a game. In FIG. 4, the visual geometry and collision geometry have been separated for ease of illustration although in practice they would coincide in at least some parts of the virtual environment.

A player's character 404 moves within the virtual environment under the control of the player and allowed movements are determined by the collision geometry. The collision geometry 402 approximates, and in places coincides with, visual geometry 400 although, as shown in FIG. 4a, in places the collision geometry is a simplification of the visual geometry for ease of calculation. The effect of such simplification is not generally apparent to a player. Like the visual geometry, the collision geometry surfaces are made up from polygons, but these polygons are untextured. The collision geometry tends to comprise flat walls and floors and can be generated by simplifying the visual geometry.

The collision geometry data may comprise both collision geometry shape data and collision geometry rule data. The rule data may be employed for determining the effect of a collision with a collision geometry surface, to allow movement rules to be implemented. Thus, a collision geometry surface which does not have a visual geometry counterpart, such as surface 406 may also be included to control character movements. Surface 406 in FIG. 4a is a surface allowing one-way motion in the direction indicated by arrow 408 which, in this example, allows player character 404 to descend a step 410 in the virtual environment, but prevents the character from climbing back up again.

Figure 4B:
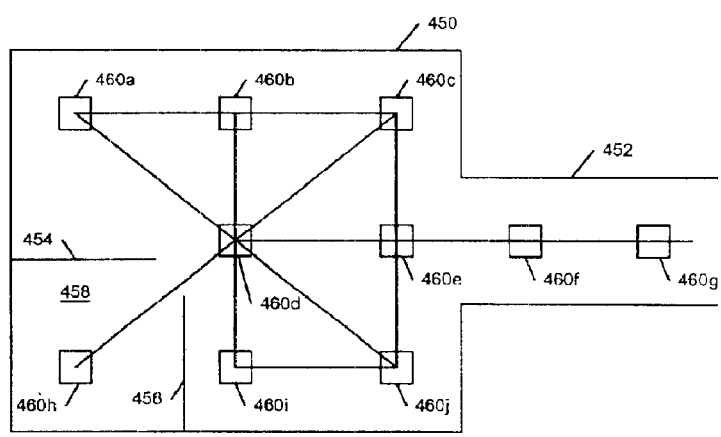
FIG. 4b schematically illustrates navigation pad positioning for use by artificial intelligence navigation routines of non-player characters.

FIG. 4b schematically illustrates navigation pad positioning for use by the artificial intelligence navigation routines of non-player characters. Such non-player characters navigate using navigation nodes or "pads" defining a point in three dimensions, the pads being linked to determine allowed non-player character motion. Navigation pads are used by an NPC when the NPC is invisible, an AI navigation routine determining, for example, a route from an NPC node to a player character node. The distance between nodes can be combined with the speed of movement of an NPC to determine when an NPC is to be moved from one node to the next.

FIG. 4b shows a room 450 out of which leads a corridor 452, the room having internal walls 454 and 456 restricting access to a partitioned off area 458. The room and corridor contain a plurality of navigation node pads 460 connected by links 462 which define allowed NPC movements. It can be seen that a node pad 460*h* within partitioned off area 458 is only linked to central pad 460*d*, to reflect the internal visual geometry of room 450, walls 454 and 456 preventing links to pads 460*a* and 460*i*. Pads 460*e*, f and g allow an NPC to navigate out of the room and down corridor 452. Generally where an NPC is visible, the NPC navigates using raycasting but where a visible NPC cannot raycast to its desired destination, for example from pad 460*a* to 460*h*, the node pads are again used for navigation.

Figure 5:
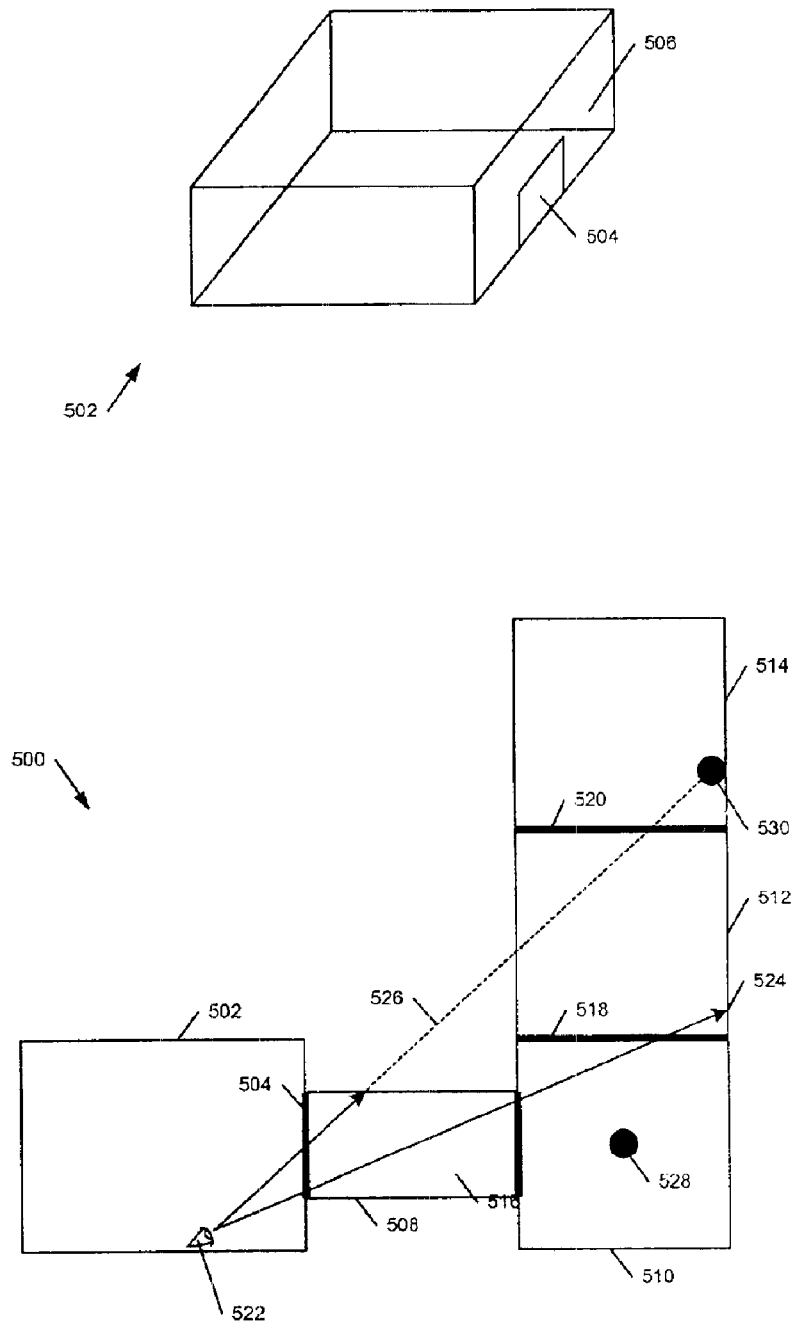
FIG. 5 schematically illustrates the operation of viewing portals.

FIG. 5 schematically illustrates the operation of viewing portals. Viewing portals are used to sub-divide a 3D virtual environment to simplify the calculations needed to render part of the environment into a screen viewport. A portal comprises a polygon which divides one part of the virtual environment from another, and generally for a game engine to work properly a portal must completely separate the zones on either side of it, without leaving any gaps between the portal and the visual geometry. A portal usually comprises a two dimensional polygon, typically a rectangular window. Portals are best situated at natural sub-divisions within the 3D environment, for example in doorways and passageways; selecting locations such as these also tends to keep the portal size down, which helps reduce the processor's calculation load. As the skilled person will be aware, binary separation planes (BSPs) may be used instead of portals to achieve similar benefits.

FIG. 5 shows a 3D representation of a room 502 in a game level virtual environment in which a rectangular portal 504 in a end wall 506 of the room has been defined. A map 500 shows other parts of the game level virtual environment in the vicinity of room 502. Room 502 is linked to a succession of further rooms 510, 512 and 514 by a corridor 508. Portals 516, 518 and 520 divide the corridor and each room into a separate zone. A player character 522 is located in room 502, looking towards portal 504.

The portals assist the game engine in determining which parts of the 3D environment geometry need to be rendered for potential on-screen presentation (the visual geometry is transformed to screen space for determining which parts of the geometry are to be displayed on-screen). Broadly speaking, if a portal is not visible to the player's character then all the visible geometry beyond that portal can be ignored by the game engine and need not be rendered into the viewport.

In the example shown in FIG. 5, the visual geometry in corridor 508 and rooms 510 and 512 must be rendered, that is converted into a graphical image for potential onscreen display, as portals 504, 516 and 518 are all visible to player character 522. Portal 520 is, however, not visible to player character 522 and therefore the visual geometry of room 514 need not be rendered for display. It can be appreciated from FIG. 5 that at least a small portion 524 of a wall of room 512, the visual geometry of which 512 is rendered for potential on-screen display, is in fact visible to player character 522 through corridor 508 and room 510. It can also be appreciated from ray 526, however, that none of room 514 is visible to player character 522. The portal geometry also assists in determining whether or not to render items or NPCs within the rooms for potential display, such as NPCs 528 and 530.

In the example shown portals are located at the corridor entrance and exit and at room boundaries, but portals need not necessarily be located in such positions. It is not necessary for a working game that a game level include any portals but, in practice, a level which is large enough to be interesting to a games player typically comprises many thousands of polygons only some of which are visible at any one time, and for this reason the proper positioning of portals can be important in producing a game which runs acceptably fast, the speed of the game's response being an important factor in a game's playability.

When a virtual environment for a game level is created an artist will generally begin by creating visual geometry for the game level and, if necessary, for the player and non-player characters. Portals or a binary separation plane (BSP) tree may also be defined. Following this invisible game-related data for determining functional aspects of the game is created, comprising collision geometry data (shape data and rule data) and, where the game incorporates NPCs, navigation data. These steps may be performed using a computer aided design software package such as 3D Studio (trade mark) in conjunction with standard development tools such as a C compiler, or a specialized game editor, as described above, may be employed.

Once the basic virtual environment for the game level has been created the game designer then selects positions for objects the player characters may interact with, such as health or weapon pickups, NPC spawn points and the like, and defines movable or destroyable objects, such as doors. The game lighting is then defined, in the main by providing "pre-lit" scenes in which shadows may be "painted on" as textures on the visible geometry polygons or represented using vertex colours or shading; vertex lighting in conjunction with a light map may also be employed.

The virtual environment of a game level generally comprises a number of rooms or halls linked by corridors, passageways or other joining sections. Thus a game designer may, initially, build the rooms or halls separately and then link them using corridor geometry, cutting holes in the room walls as required and in places adding additional geometry and/or texture, for example to define a door lintel or the like. The visual geometry, collision geometry, navigational data, and other game-related data is then modified to ensure complete data has been defined, particularly for the joins between the different parts of the environment, and to ensure that there are no "holes" in the visual geometry or other game data which could cause the game to malfunction. The testing, checking and data modification is extensive and includes, for example, checks that objects such as bullets, which may employ visual geometry for collision tests, can properly propagate through the environment. Likewise extensive testing of the proper portal positioning is performed, checking both game visual geometry tests for polygons draws and/or hits, and also checking the correct functioning of NPCs and other entities.

A large number of 3D engines are available for designing and rendering real time virtual environment data and over six hundred are listed at http://cg.cs.tuberlin.de/~ki/3del_1419_gen_about.html. Much game design information and software is also available on the Internet, for example via the game development search engine at www.gdse.com, and at websites such as www.cfxweb.net.

By contrast with the above totally manual method of constructing a game level, software according to embodiments of the invention, which may be referred to as map builder or map-maker software, allows a user to construct a fully three-dimensional game environment from a range of pre-built constructional elements or "tiles". The tiles are effectively building blocks which interconnect by means of one or more interfaces around their perimeters.

A user builds a tile map within a 3D volume made up of, for example, a 40×40×8 XYZ cubic grid, a unit of this grid corresponding to the smallest 1×1×1 tile. A main user interface display for the main editing modes of the software comprises a top down plan view of one level which represents a 40×40 horizontal (XY) slice through this volume. The user may move the currently displayed level up or down and the main plan view then steps through corresponding slices of the map. The vertical height (Z) of the current level is preferably indicated by an isometric bar in the top left hand corner of this user interface screen. Preferably this plan view may also be scaled in or out by the user.

Tiles are depicted in two ways—2D plan and 3D schematic views. In both views the "plug" connectivities of the tiles are shown. In the plan view only the bounding perimeter of the tile is apparent whereas the 3D view also depicts a schematic of the internal geometry of the tile. Both 2D and 3D representations depict tileset independent features of the tile.

User input is via a game controller peripheral. The controller has two analogue joysticks (left and right), 8 independent digital buttons (in 2 arrays of 4) and a 4 directional digital "D-pad". Selection of menus and objects in screen space is carried out using a cursor which is controlled by the left analogue joystick, and the digital buttons on the game controller are used to make binary selection inputs. In some contexts the right analogue joystick is used to rotate and tumble 3D schematics of tiles.

There are three main modes in which the user interacts with the map under construction, a tile mode, an item mode, and a light mode.

Tile mode is the main construction mode, in which tiles may be selected, placed and manipulated within the building volume.

When building a new map the user is initially presented with an empty grid. New tiles are obtained by placing the cursor over and then selecting a vacant grid location, this taking the user to the tile palette. In the tile palette, the tiles are represented in 2D view on the left hand side of the screen; when the cursor is placed over a tile plan a rotating 3D view also appears. Selecting a tile from the palette returns the user to the main view, with the tile as an active selection which moves with the cursor. The selected tile may then be placed by the user on the current grid level.

Tile mode supports editing functionality similar to simple drawing programs. Tiles may be promoted to an active selection either individually or multiply using marquee drag or toggle marking. Active tile selections may be moved around the screen grid (XY plane) or translated vertically (Z) if the user steps up or down through the level view. Selections may also be rotated by increments of 90 degrees—when the cursor is over a placed tile a 3D view of that tile in its current orientation is displayed in the lower left corner of the screen.

A free memory bar at the top centre of the screen indicates the likely memory requirements of the current map at runtime in the game engine. Map editing operations which would cause this limit to be exceeded are preferably forbidden.

An item mode allows the user to place gameplay items within tiles. Items may be either pickups which are used in the game (weapons, health, armour, or bags) or starting positions for characters.

When a tile is selected in item mode the item placement subscreen is entered. In this view a 3D representation of the relevant tile fills the screen. Positions where items may be placed are indicated by yellow 'X' icons in this view—these 'X's are selected using the cursor, and a scrolling menu in the upper left of the screen indicates the current item. When an item is placed the 'X' is replaced by an 3D iconic representation of the item. Placed items are also represented by coloured dots in the main item mode plan view. Selecting a vacant grid square enters an item summary screen which displays a tabular inventory of the items placed throughout the current map.

A third editing mode, light mode, allows the user to cosmetically alter light settings for the map at an individual tile level. The light setting consists of a colour (RGB value) and a modifier (on/off, flickering/switching/pulsing). In this mode the current light setting for each tile is represented by a coloured square in the centre of the tile, and when the cursor is placed over a tile and additional window in the bottom left of the screen also displays the modifiers. Light settings may preferably be copied and pasted between tiles. The periodic modifiers (flickering/switching/pulsing) preferably also have phases which may be incremented; these phase settings are represented by clock icons. Selecting a vacant grid square accesses the lighting palette screen which allows the user to select lighting colours from a palette (which may be customised via a pop-up colour wheel) and modifiers from a list menu.

Preferably now in more detail to an exemplary user interface for the map builder or map maker, FIGS. 6*a* to 6*e* show screenshots from an embodiment of the invention illustrating use of map build code to construct a two-dimensional map for a three-dimensional first person shooter-type game environment for a game level.

Figure 6A:
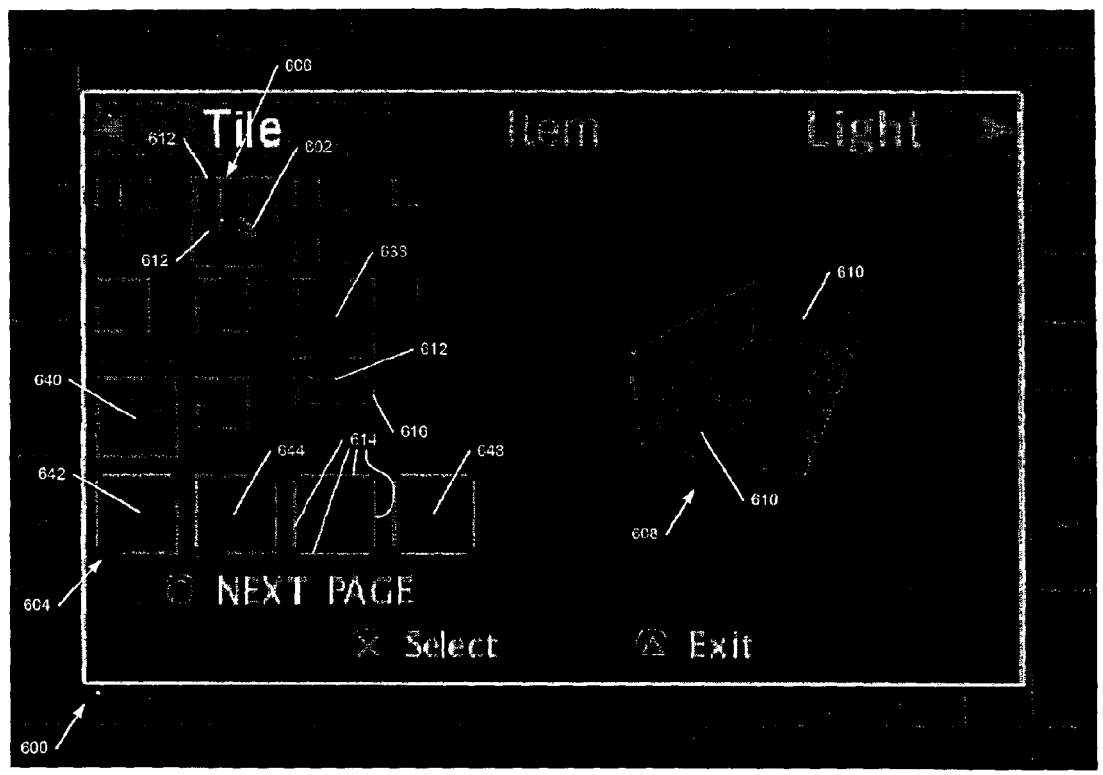
FIGS. 6a to 6e show screenshots from an embodiment of the invention illustrating use of map build code to construct a two-dimensional map for a three-dimensional first person shooter-type game environment for a game level.
Figure 6A:
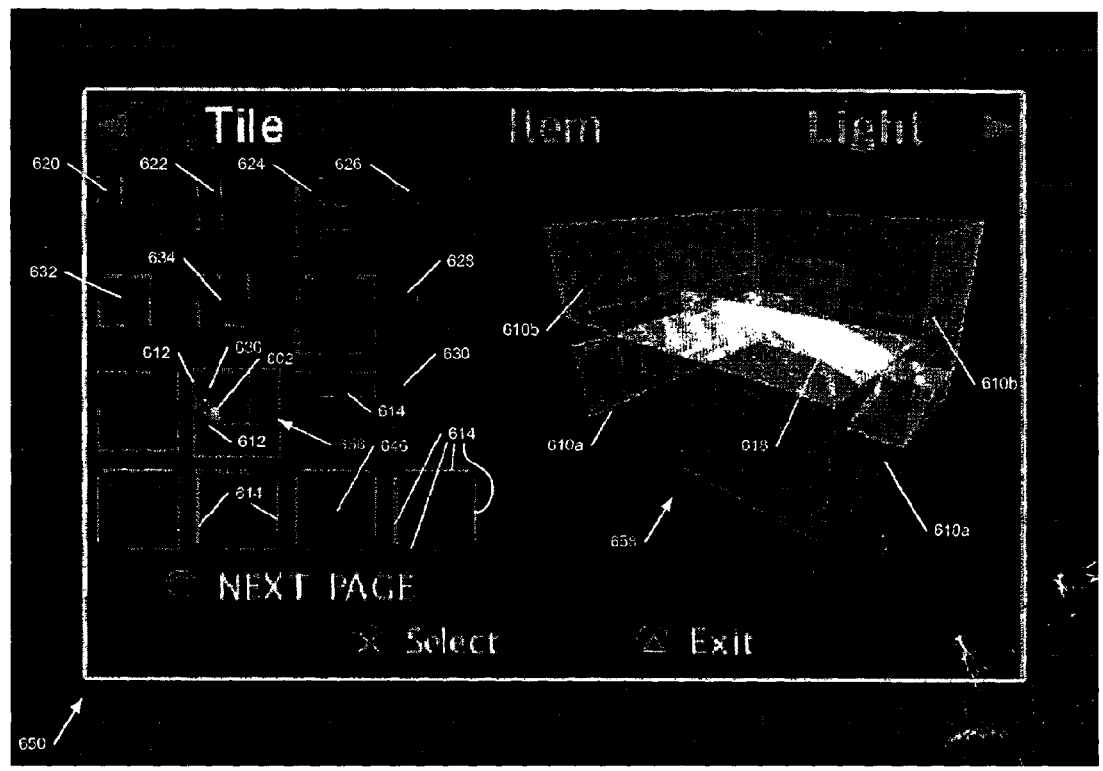

In FIG. 6*a* user screen displays 600 and 650 show selection of a tile by a user controlling a cursor 602 using a game pad or joystick. The tile selection screens 600, 650 show a page 604 of tiles displayed from a plurality of tiles which may be employed to construct a 2D map representing a 3D virtual environment for a game level. A three-dimensional skeleton view 608, 658 of a selected tile 606, 656 is also displayed, arrows 610 indicating interfaces to the tile which may be used to connect the tile to other tiles. The positions of these interfaces are preferably also shown in the 2D tile representation in the page of tiles 604, for example by means of a different colour along part of the tile's border. In the illustrated example interfaces 612 to the tiles are one tile grid unit in length, and interfaces 614 are three tile grid units in length; tile 616 is an adaptor tile which has interfaces of both one unit and three units length. The selected tile, tile 658, in screen display 650 spans two horizontal map levels and has interfaces at both levels, interfaces 610*a* on the lower level and interfaces 610*b* on the upper level. The internal geometry of tile 658 connects the two levels by means of a staircase 618 to allow player and non-player characters to traverse between parts of the environment on different horizontal levels, each horizontal level being represented by a separate 2D map.

Screen displays 600, 650 illustrate examples of tile shapes which may be used in maps for constructing 3D virtual environments. Tile 620 is a simple one unit connector tile or corridor; tile 622 is a two unit long corridor; tile 624 is a T-connector corridor tile; tile 628 is a one unit square connector with three open sides; and tile 630 is a one unit tile with four open sides which may be used, for example, for constructing open space areas within the virtual environment. Tiles 632, 634, and 636 are two unit square tiles with different interface positions (the 3D skeleton geometry of tile 636 is illustrated at 658). Tiles 638, 640, 642, 644, 646, and 648 are three unit square tiles with different interface configurations. Tiles 646 and 648 have interfaces on all four sides and may be used for constructing larger open spaces within the virtual environment; two versions of a three unit square tile with four interfaces are provided since different versions of a tile having the same basic shape may be provided with different versions of 3D internal geometry.

Figure 6B:
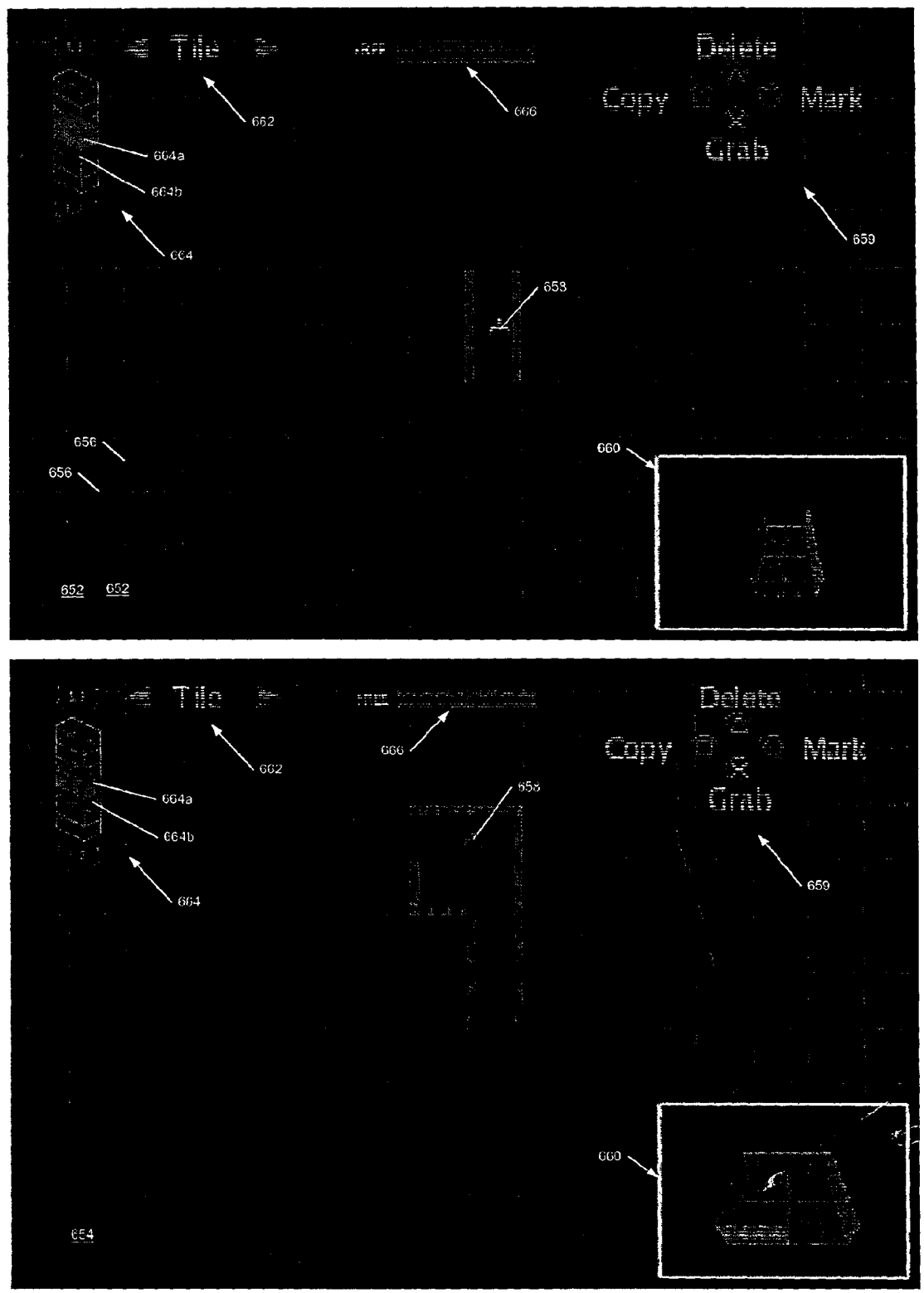

Referring now to FIG. 6b, this shows screen displays 652, 654 for sequential stages in constructing a 2D map for building a 3D game level, the 2D map representing the 3D game level and being constructed using the 2D representations of the tiles illustrated in FIG. 6a. The map comprises a grid 656 upon which the 2D tile representations are placed using a cursor 658 again manipulated using the game pad or a joystick (or, in alternative embodiments, a keyboard and/or mouse). The user interface preferably provides tile pick and place functions as well as conventional editing functions such as tile or region select, copy, paste, delete, and move, tile rotate and map centre, clear, and zoom functions, and the like. A set of user interface controls 659 is therefore also provided. Preferably the map display user interface screens 652, 654 also provide an inset 3D skeleton view of a selected tile. Mode selection icons allow the selection of a tile placement mode, an item placement mode, and a lighting definition mode, as described in more detail later.

User interface screens 652 and 654 preferably also provide an indicator 664 showing a currently selected 2D map level 664a, a map for which is being displayed on the user interface screen 652, 654, and a ghosted indication 664b of a 2D map for the level below the currently displayed level. In the illustrated embodiment a virtual environment comprising up to seven levels may be mapped as a corresponding set of up to seven 2D maps. Although referred to as "levels" there is no requirement for the plane represented by a 2D map to be horizontal or flat; the use of a set of sections or slices through the 3D virtual environment is simply a convenience. For the user and it is merely necessary that the 3D environment is representable as a series of two-dimensional stacked maps. However in practice, for ease of understanding by a user, the virtual environment "level" represented by a 2D map is preferably, broadly speaking, in a single plane.

In a preferred embodiment the user interface screen displays 652, 654 for constructing one or a series of 2D maps for a 3D game virtual environment also include a free memory indicator 666. Memory indicator 666 displays, as a bar graph, an approximate total amount of memory available for a 3D virtual environment for a game level, and an estimated amount of free memory for adding to the 3D virtual environment represented by the 2D map. The memory indicator 666 provides an indication of an estimated memory requirement for the 3D game virtual environment represented by the 2D map or series of maps, preferably by comparison with the total amount of available memory to provide an indication of free memory remaining. Preferably the memory indicator 666 takes account not only of the visual geometry needed to represent a map, but also of other game virtual environment data such as collision geometry, portal definitions, navigation data, and the like. This assists a user in constructing a map or maps for a 3D virtual environment and, in particular, in selecting tiles for constructing the environment. For example, the same general map topology may be realizable using different combinations of tiles and it can be inefficient to construct a large open area from a plurality of one unit square tiles rather than by using three unit square tiles. This is because of non-visual game-related data overheads associated with the tiles, such as portal data and navigation data, which, in the example, can add a proportionally greater overhead to visual geometry data when an area is constructed using one-rather than three-unit square tiles.

Figure 6C:
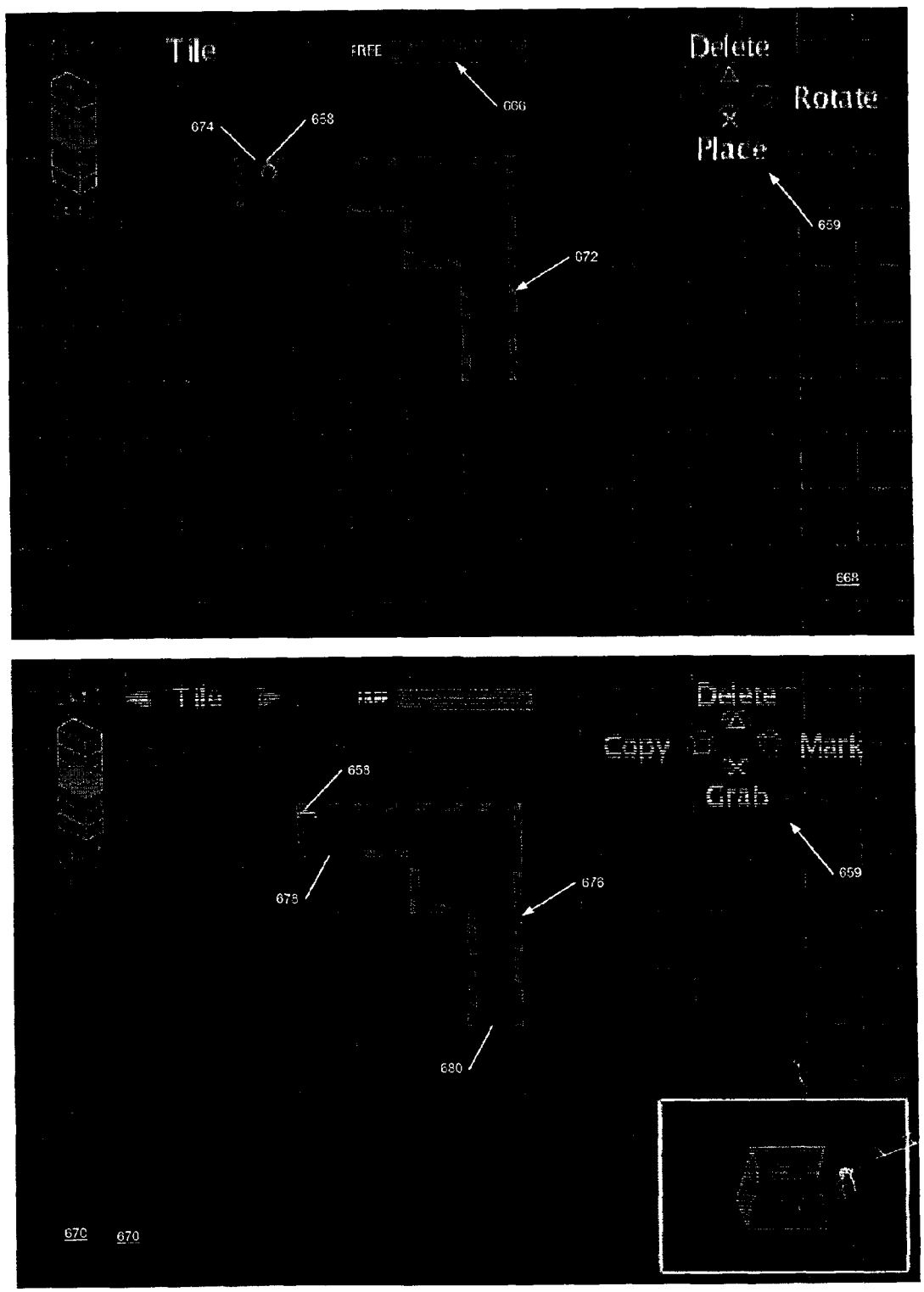

FIG. 6c shows two further user interface screen displays 668, 670, illustrating the addition of a corner tile 674 to a partially constructed map 672 to create a larger map 676. It can be seen that the shape of cursor 658 and the options presented by the user controls 659 change according to the functional context of the user interface. Although map 676 is, so far as the user is concerned, only partially constructed it nevertheless describes a complete, closed and bounded virtual game level environment, and may be previewed or used to play a game at any stage. Two "open" interfaces 678, 680 are present at either end of the map corridor but, were the map to be used to create a 3D virtual environment for a game level or other application, these interfaces would be closed automatically by the map compile code or game engine software using "plug" data associated with the tiles represented by the 2D map.

No matter what stage the map construction has reached, the map can be converted into a fully working game environment in which interfaces between the tiles are joined-up and unconnected interfaces are closed, and in which additional non-visual game-related data is also been joined-up, or if necessary modified at unconnected interfaces, to provide a working game. Since the data associated with each tile has been pre-built and pre-tested it is also possible to guarantee that a game environment constructed using the tiles will work properly. The 3D environments defined by the tiles can be tested to ensure they work properly, and the interface joining/closing algorithms can also be verified to ensure they too operate correctly. The game environment as a whole can therefore be guaranteed to function as the game engine will have been tested and the game data has, in effect, also been validated through validation of the component data from the tiles and of the interface joining and plugging data and procedures.

Figure 1:
FIG. 1 shows a screenshot of a first person shooter-type game.
Figure 6D:
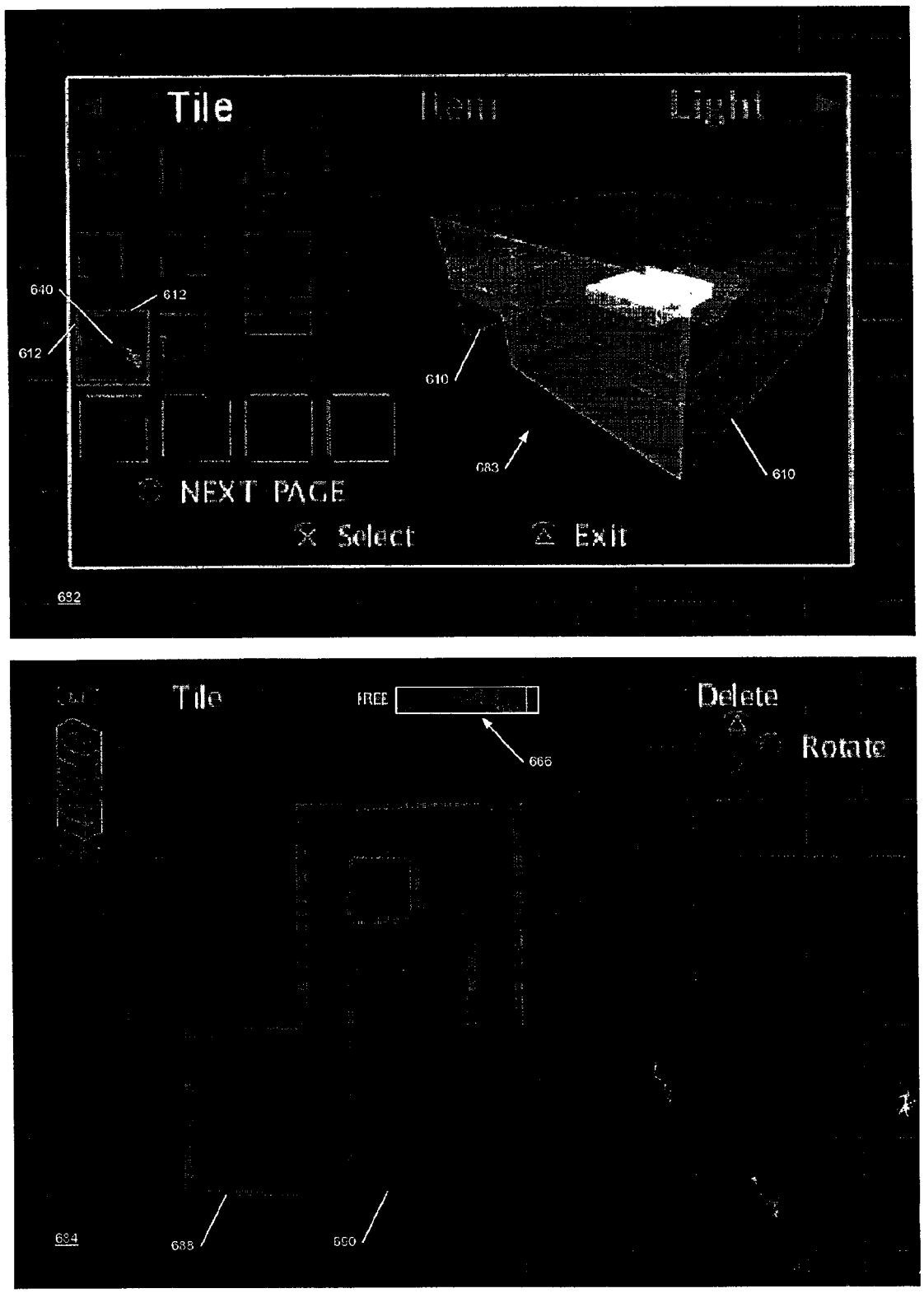

Referring next to FIG. 6d, this shows a further example of a tile selection screen display 682 of the user interface, showing internal 3D geometry 683 for tile 640 of FIG. 1. This tile is again a "double height" tile but has interfaces 610, 612 on only the lower level, the upper level within the tile being accessible via an internal stairway. Screen display 684 shows a further stage 686 in construction of a 2D map on one of the (seven) available 2D levels. One version 688 of tile 640 has just been added to the map, and a second version 690 of tile 640 is being moved into position. Tile 690 has a dashed outline (or is shown in a highlighted colour, for example red) as it does not currently occupy a valid position but instead partially overlays tile 688. It will also be noted that tile version 690 is rotated as compared with tile version 688, to facilitate adding the tile to the map.

The 3D virtual environment represented by the 2D map or series of maps need not correspond to an environment which would be physically realizable. For example the 3D version of tile 640 illustrated by skeleton 684 occupies two 2D levels but since this tile has no interfaces on its upper storey, the part of the 2D level above tile versions 688 and 690 may be occupied by other tiles. Therefore in some embodiments when the 3D virtual environment is constructed the result may therefore be that two separate regions or rooms of the 3D virtual environment have 3D co-ordinates which overlap in 3D environment or "world" space. In this case the connectivity of the tiles and corresponding 3D rooms can be used to ensure that a game object or character only occupies one room at once, and other game data can be used to determine the room within which a set of 3D co-ordinates is located.

Preferably, however, such virtual environment configurations are avoided as they can be confusing to a game player (or other virtual environment user). Hence where a tile comprises two or more levels or storeys it is preferable that the tile's position is indicated in all the 2D map levels in which a part of the file's 3D geometry would be present in the 3D virtual environment represented by the map. This is, however, a matter of choice and in some games the added complexity of, in effect, overlapping levels may be desirable.

Figure 6E:
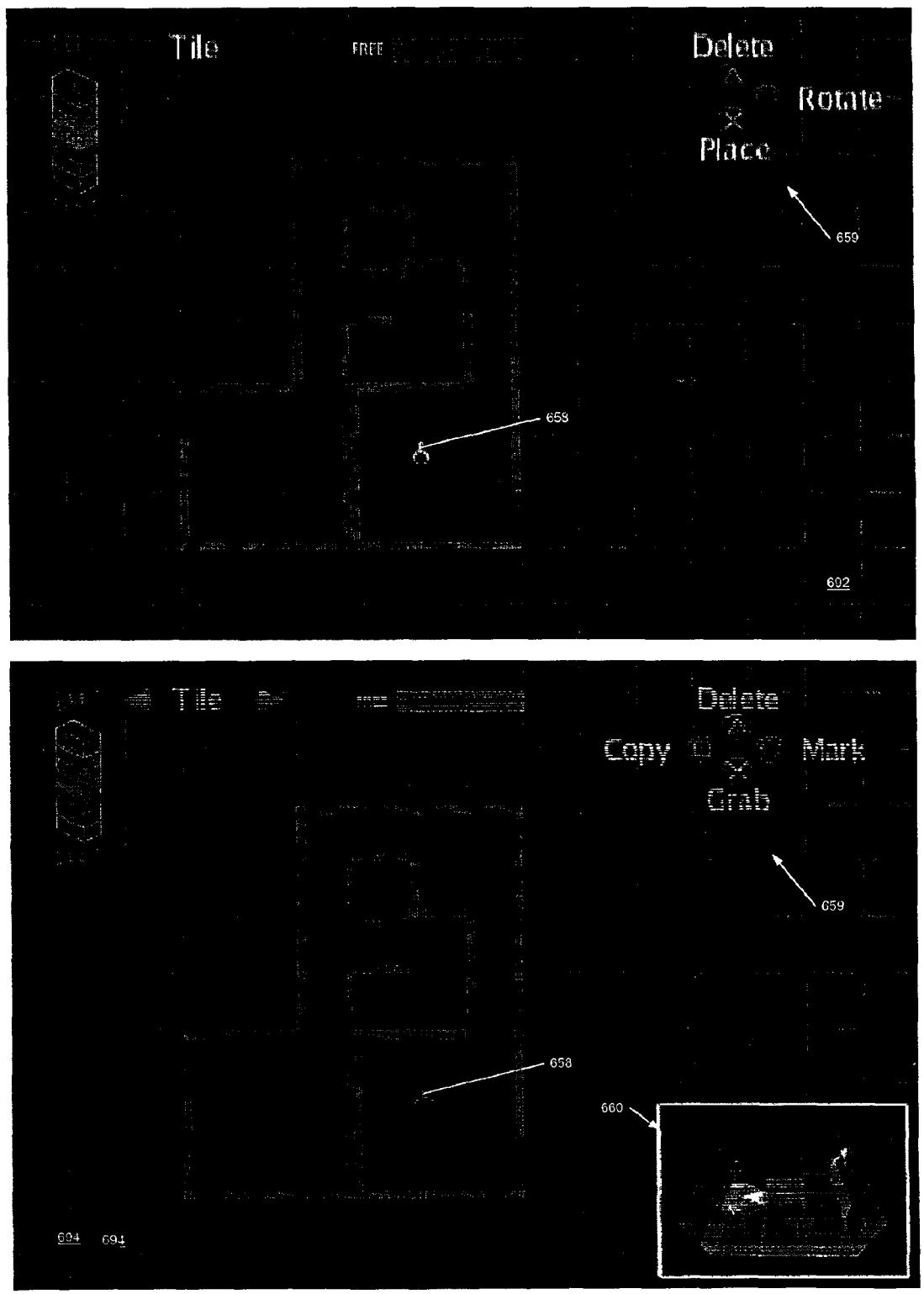

FIG. 6e shows two further screenshots 692 and 694, showing the two final stages in placing tile version 690 and then releasing the tile to add it to the map. Again cursor 658 and user controls 659 change with context.

Figure 7A:
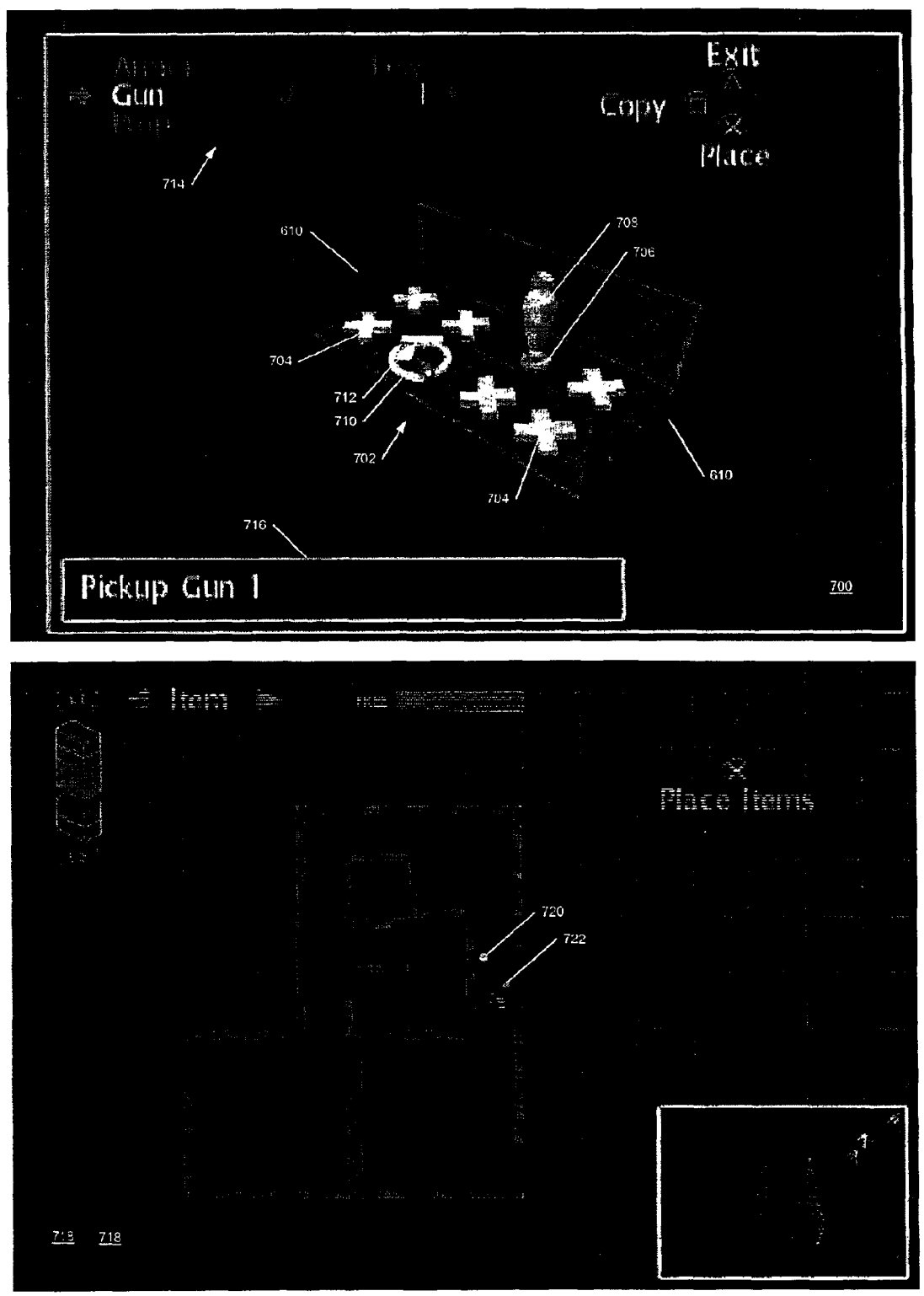
FIGS. 7a to 7c show screenshots from a user interface for placing items within a 2D map representing a 3D virtual environment for a game.
Figure 7B:
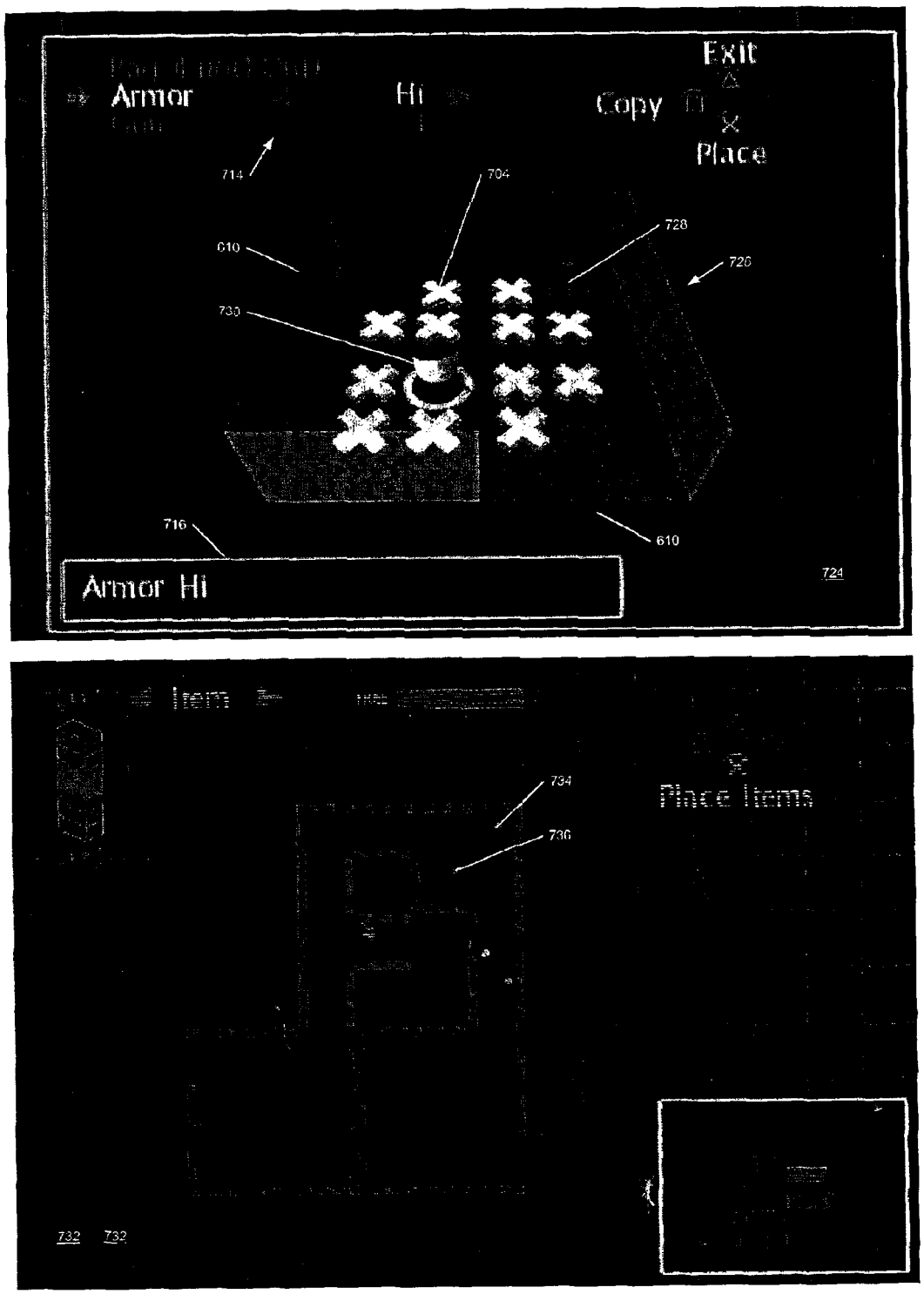
Figure 7C:
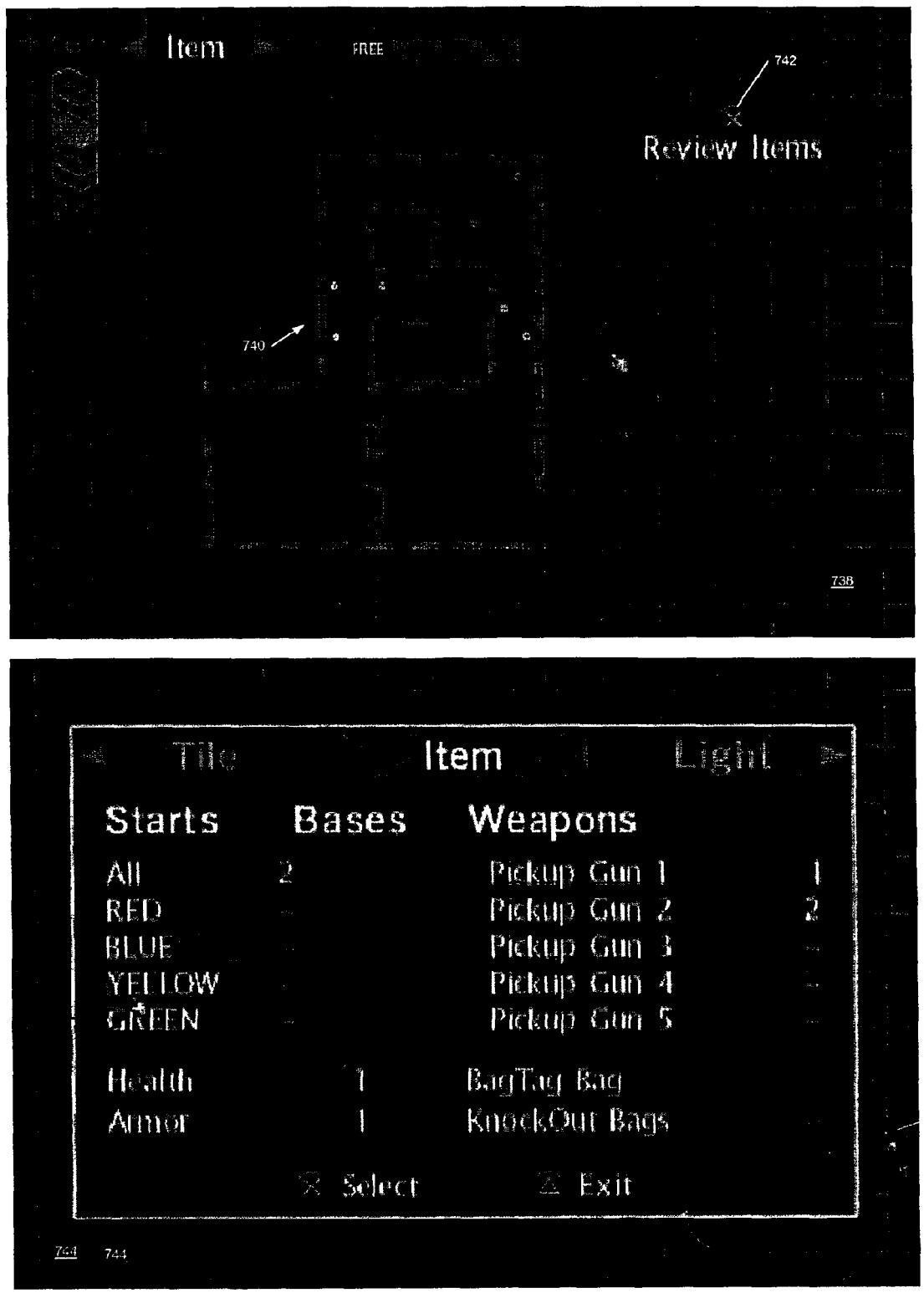

Referring to FIGS. 7a to 7c, these show screenshots from a user interface for placing items within a 2D map representing a 3D virtual environment for a game.

FIG. 7a shows a screenshot 700 of an item placement component of the user interface in which a 3D representation 702 of a two unit corridor tile 606 is displayed, together with a plurality of item placement positions 704 ("pad positions") at which items may be placed. The item placement positions 704 have a corresponding position in the three-dimensional tile geometry which tile 606 represents. The pad positions depicted in 3D representation 702 show the approximate position of each pad, but the exact position of a pad will depend upon the actual internal geometry of the tile used to create the 3D virtual environment the tile is used to map. Where a user may select one of a plurality of tilesets, each pad position will have a corresponding position within the tile geometry for the tile in each tileset, but the precise positions which the depicted positions translate to may differ from one tileset to the next.

In screenshot 700 pad 706 has been selected for use as a player character start position and a corresponding player start icon 708 is displayed. Pad 701 has been selected for placement of a weapon and a weapon icon 712 is therefore displayed on this pad. A weapon-type selection menu is presented in region 714 of the screen and a selected weapon description is shown in window 716.

Items which may be placed on item position pads within a selected tile may include a player start position, a player base, a weapon pick-up, an ammunition pick-up, a health pick-up, an armour pick-up, and knockout and bagtag bags for respective knockout and bagtag game modes. Items for placement may be selected using menu region 714 of the user interface. For some items an item type is also selectable, for example, to allow specification of team base identity, bag base identity, weapon type, ammunition quantity, health quantity, armour level, and the like.

Screenshot 718 shows the user interface displaying a 2D map view in which placed items are indicated by coloured icons 720 and 722 on the map, corresponding to placed items 712 and 708.

FIG. 7b shows a screenshot 724 of the user interface depicting a 3D skeleton 726 of tile 632 showing pad positions 704 within this tile. A health pick-up 728 and an armour pick-up 730 have been placed within the tile and menu 714 has been used to select a "high" level of armour, as described in window 716. Screenshot 732 shows the user interface displaying the appropriate 2D map with coloured icons 734 and 736 indicating the respective positions of health pick-up 728 and armour pick-up 730.

FIG. 7c shows a screenshot 738 of the user interface showing the map with a further group 740 of icons after the placement of further items within the 3D virtual environment. A "review items" user control 742 displays a review items screen 744 listing the types and numbers of items which have been placed.

Figure 8A:
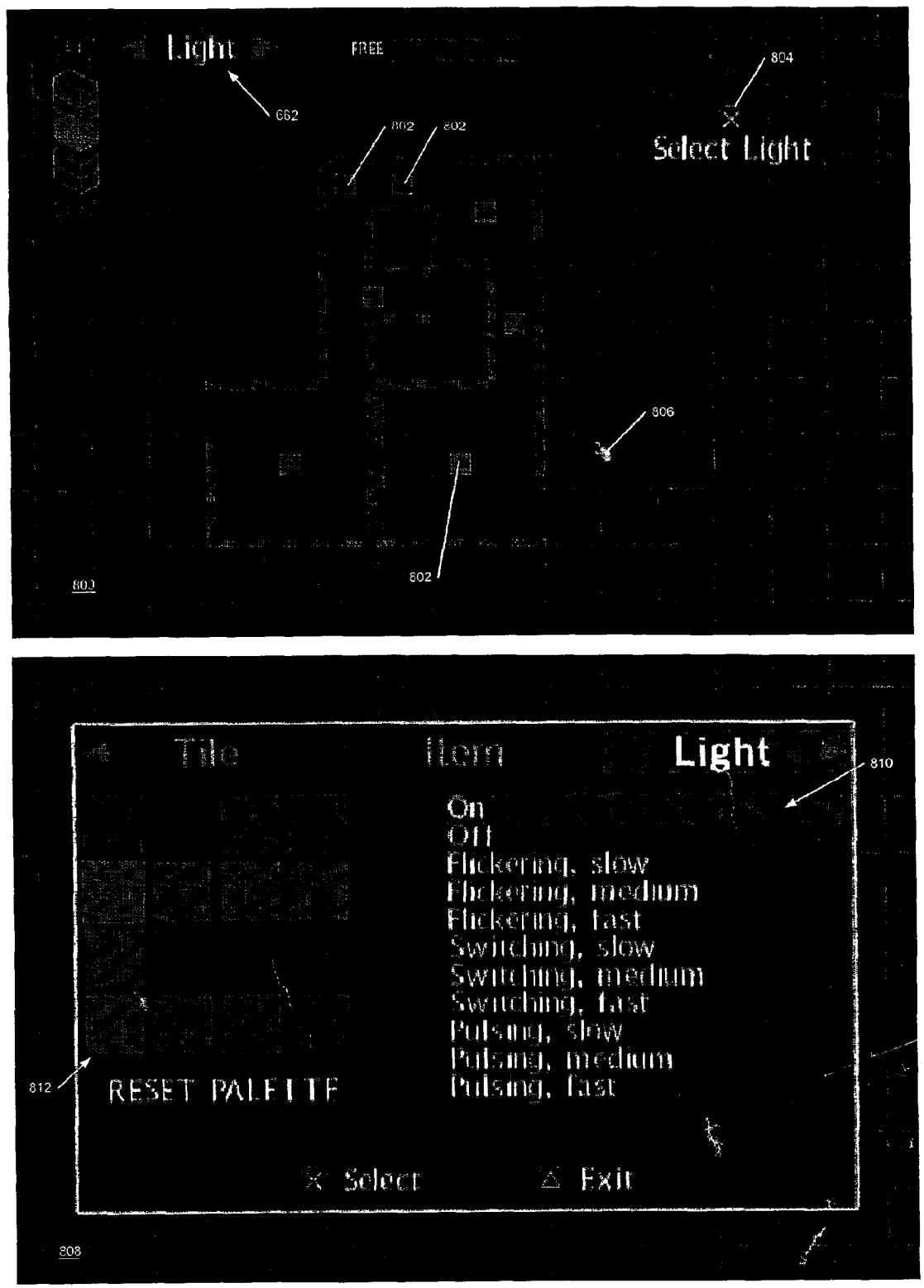
FIGS. 8a and 8b show screenshots of a lighting definition component of the user interface.
Figure 8B:
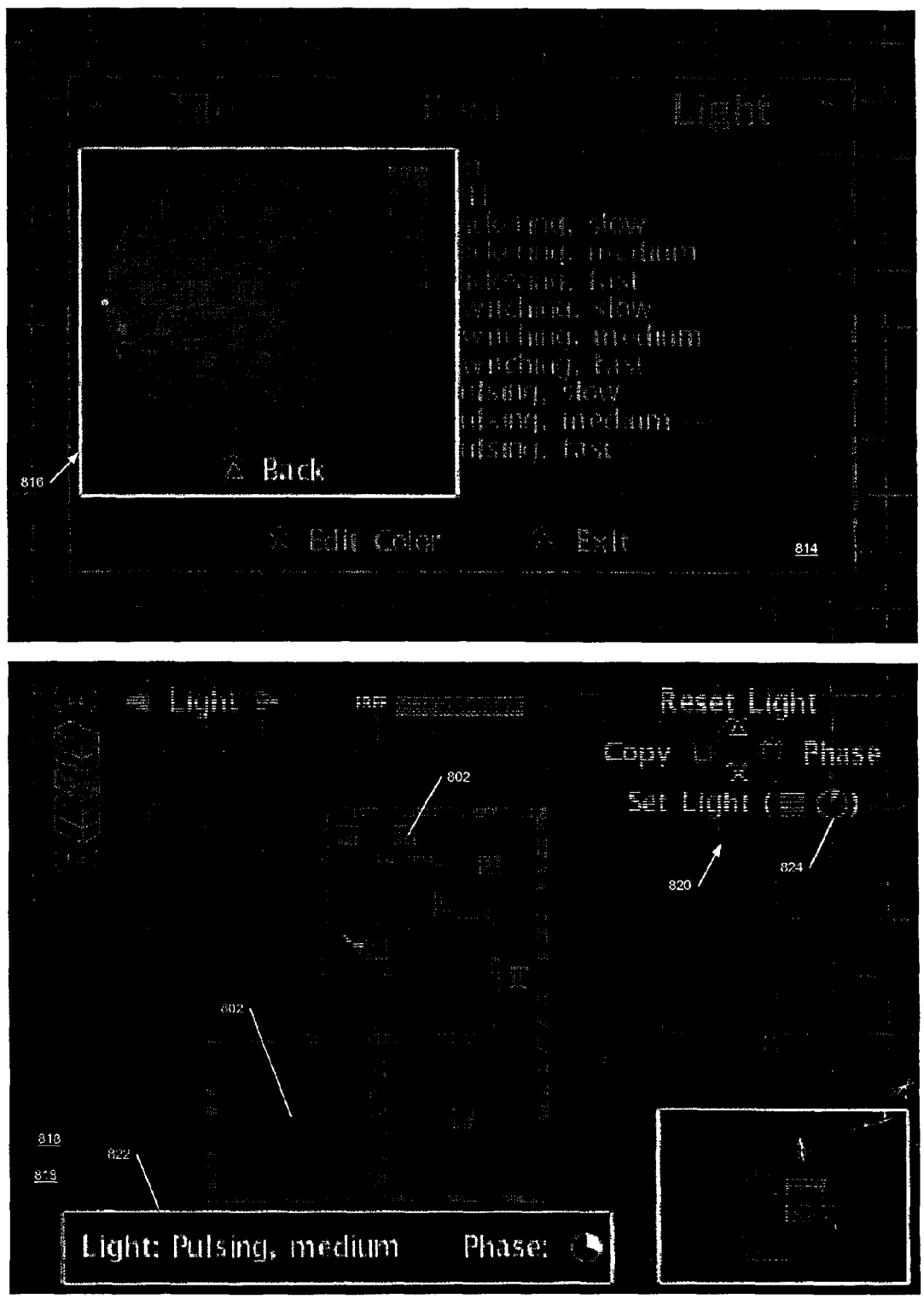

Referring now to FIGS. 8a and 8b, these show screenshots of a lighting definition component of the user interface, selected by means of menu 662.

FIG. 8a shows a screenshot 800 of the user interface showing the 2D map of a 2D level with lighting icons 802 representing the lighting state of lights within the 3D tiles represented by the 2D tiles on the map. Selecting a light by means of user control 804 and cursor 806 brings up a lighting definition user interface screen 808 which allows the selection of one of a plurality of lighting types 810 for the selected tile light. Lighting type definitions include light on, light off, light flickering (slow, medium, fast), light switching (slow, medium, fast), light pulsing (slow, medium, fast). A colour palette 812 allows the selection of a colour for the selected light. As shown in FIG. 8b a user interface screen 814 is provided with a user interface 816 for custom definition of a colour.

User interface screen 818 illustrates user controls 820, including a clock icon 824, which may be used to select a phase for a light which is flickering, switching, or pulsing. The game pad, joystick or keyboard may be used to adjust the phase of a light in a tile in order to create visual effects such as that of a pulse of light moving down a corridor.

The selected phase is indicated by a phase angle "clock" icon in a lighting phase window 822. The 2D map display in user interface screen 818 preferably displays the lighting icons 802 in the colour selected for the tile lighting and, where applicable, displays the phase of a selected light in window 822.

FIGS. 6 to 8 illustrate steps in the construction of a map of a 3D virtual environment for a game level. Two-dimensional tiles are linked together to form a two-dimensional map or a series of two-dimensional maps at different two-dimensional levels and items are then placed within the map and lighting is defined. The data representing the map may then be used to construct a fully operational three-dimensional virtual environment for a game level.

Broadly speaking the two-dimensional map representation is used to connect three-dimensional tiles corresponding to the two-dimensional tiles on the map, to form the 3D environment. It will be appreciated that the two-dimensional map or maps define the general shape and connectivity of the 3D virtual environment but that the actual 3D virtual environment created from the map is dependent upon the three-dimensional geometry of the three-dimensional tiles corresponding to the 2D tiles on the map, used to construct the 3D virtual environment. Thus by providing a plurality of separate tilesets the 3D virtual environment created by the map may be changed simply by changing the tileset used to create the environment from the map. In a preferred embodiment, therefore, each two-dimensional tile has two or more corresponding three-dimensional tiles, with different internal textures and geometry to create a visually different appearance. Preferably, however, all the tiles within a tileset have a common themed visual appearance so that a 3D virtual environment constructed from any one tileset will have a cohesive look and feel for the game player or players.

Figure 9A:
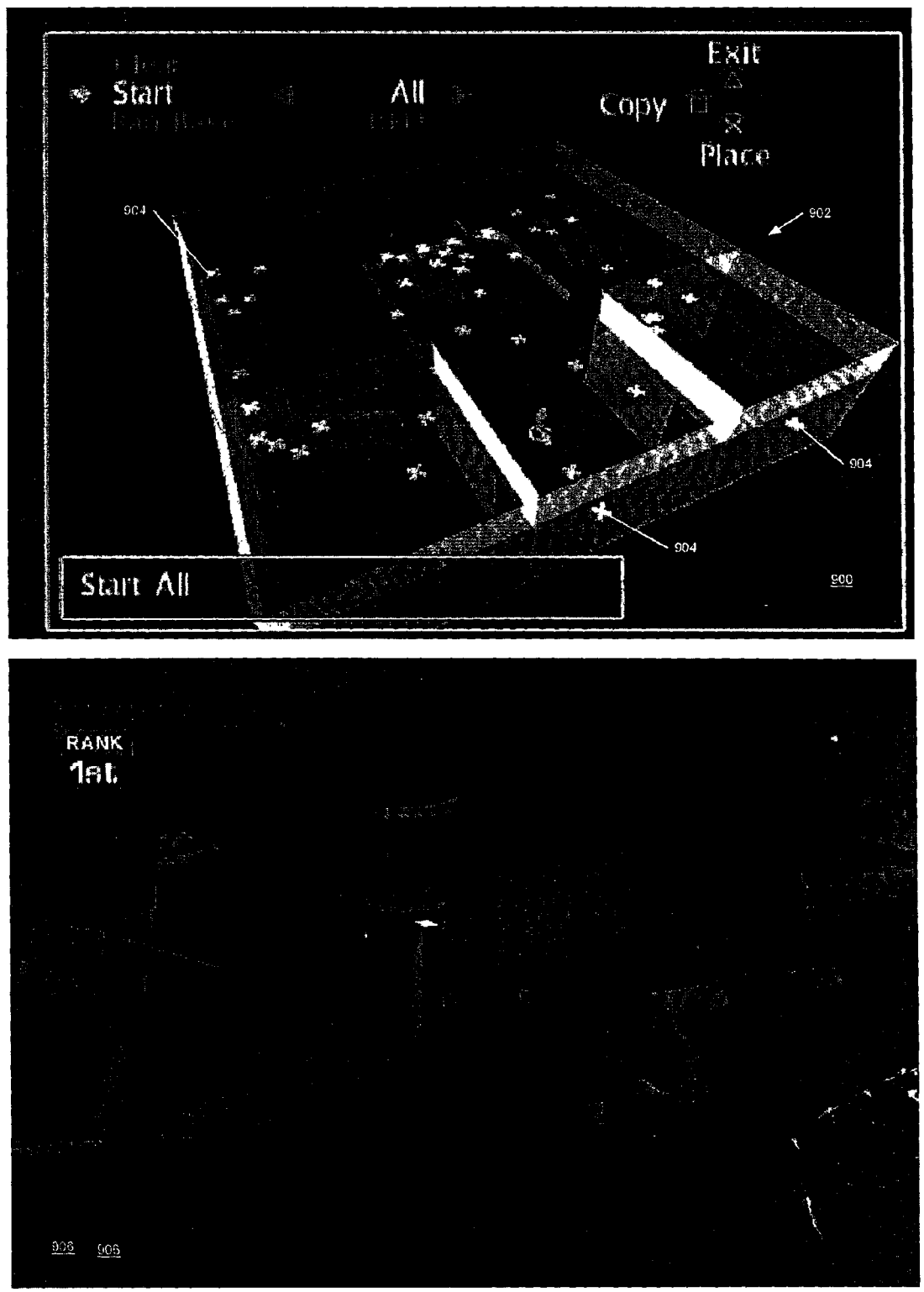
FIGS. 9a to 9c show examples of three-dimensional tiles in different tilesets which correspond to the same two-dimensional tile.
Figure 9B:
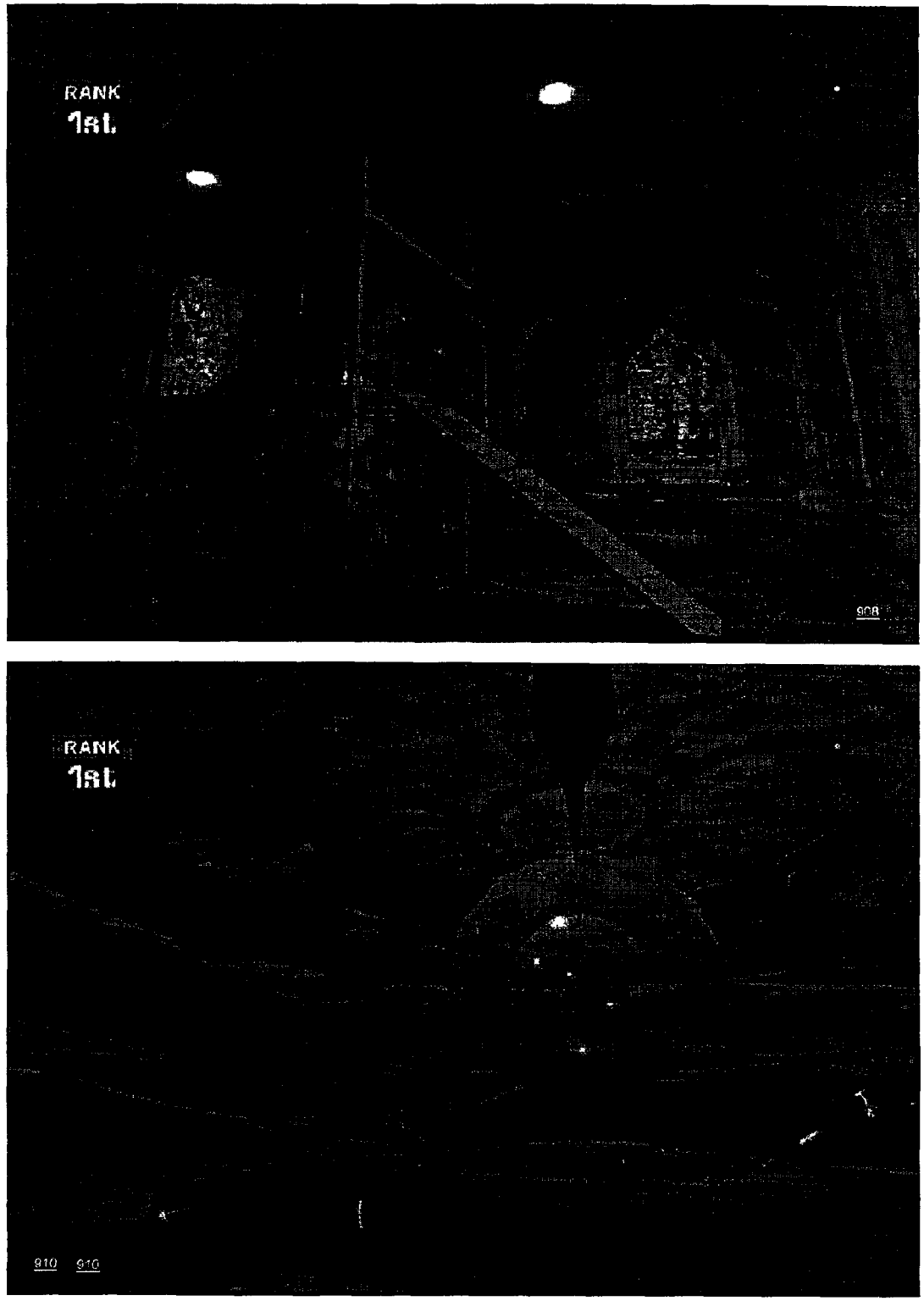
Figure 9C:
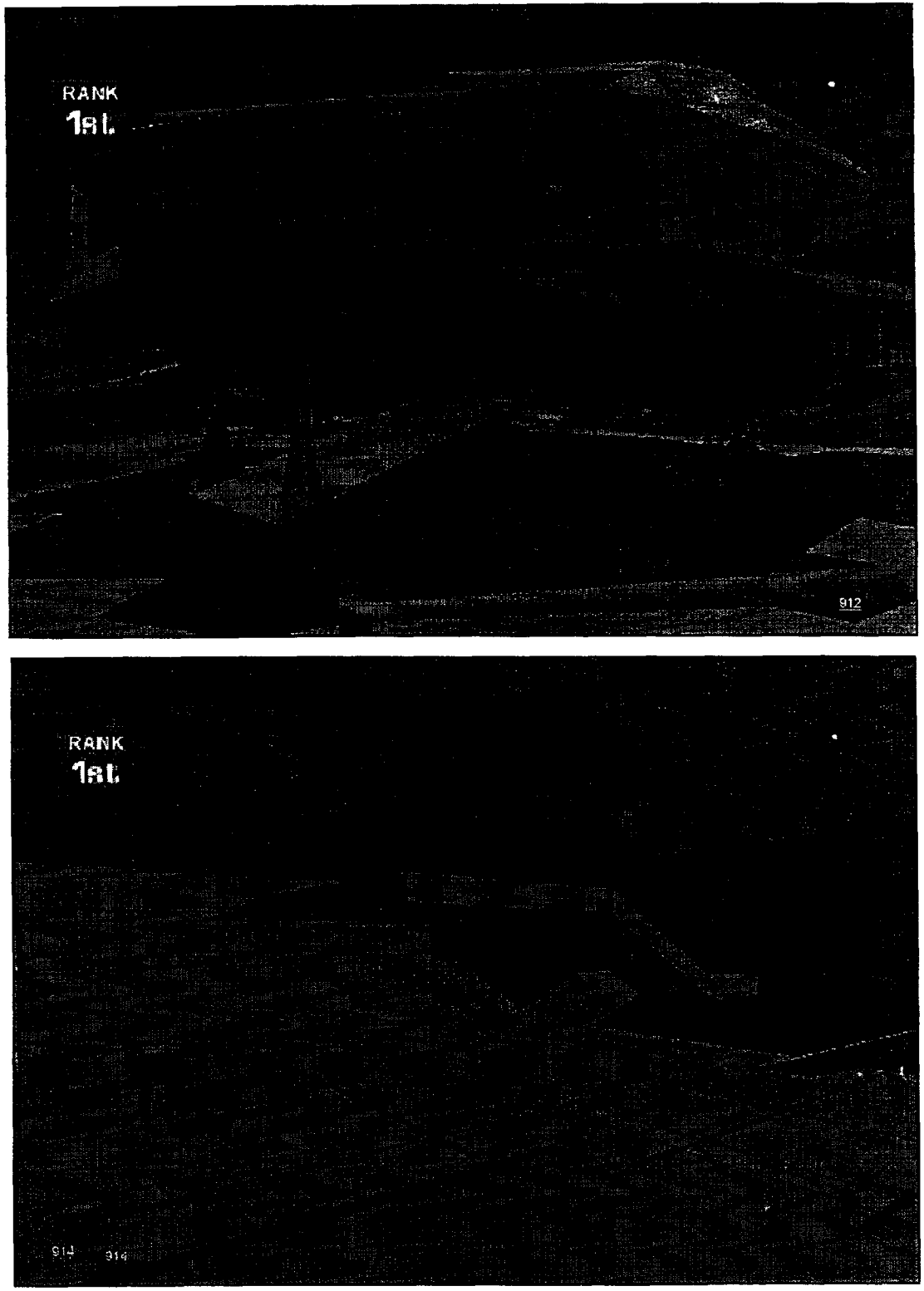

Referring now to FIGS. 9a to 9c, these show examples of three-dimensional tiles in different tilesets which correspond to the same two-dimensional tile represented on the two-dimensional map.

Referring to FIG. 9a, this shows a user interface screen 900 showing a three-dimensional skeleton view 902 of a large (9×9) tile. Skeleton geometry 902 includes an indication of the internal geometry of the tile and an indication of item position pads 904. In most cases the internal geometry indicated by the 3D skeleton view of a tile will correspond at least approximately to the internal geometry of the 3D tile in one or more of the tilesets. The 3D skeleton view is helpful for a user since it allows a user building a map of a 3D virtual environment to more easily appreciate approximately how the 3D virtual environment will appear when built. However there is no need for the internal geometry of the tile depicted in the skeleton view to correspond to the actual internal tile geometry of the tile used in constructing the 3D virtual environment.

In FIG. 9 five different versions of 3D tile geometry are shown for the tile illustrated in user interface screen 900, depicting broadly similar regions of the 3D visual geometry of the same tile in five different tilesets. Screen display 906 of FIG. 9a shows a portion of the internal tile geometry in an "industrial" themed tileset, as the tile would appear from within the 3D virtual environment during gameplay. In FIG. 9b screen display 908 shows a version of the same tile from a "gothic" tileset and a screen display 910 shows approximately the same portion of the same tile in an "alien" tileset. In FIG. 9c screen display 912 shows the internal geometry of the tile of user interface screen 900 in a "spaceport" tileset, from approximately the same position within the tile as for the versions illustrated in screen displays 906, 908 and 910.

It can be seen that although the basic tile is the same the internal geometry and textures applied to this geometry are very different, creating dramatically different internal appearances for the tile depending upon the tileset selected. It can therefore be appreciated that by selecting a tileset the same map can be used to generate a plurality of different 3D virtual environments, each giving a significantly different "look and feel" to a game level, as well as providing different playing opportunities and challenges by virtue of the differing internal geometry.

Screen display 914 of FIG. 9c illustrates a basic internal geometry of the tile displayed in user interface screen 900 which may, in embodiments of the system, be used to generate skeleton view 902. However visual or other features within the tile, such as the levels and ramps depicted in screenshot 914, need not be present in other 3D versions of the tile. A set of internal geometries such as that illustrated in screen display 914 of FIG. 9c may comprise a "tileset 0". Tileset 0 may be usable by a player or map builder in order to more easily assess the main features of a constructed 3D level, or it may be an intermediate step in tileset design and not made available to game players for map/3D virtual environment constructing or viewing.

Figure 10:
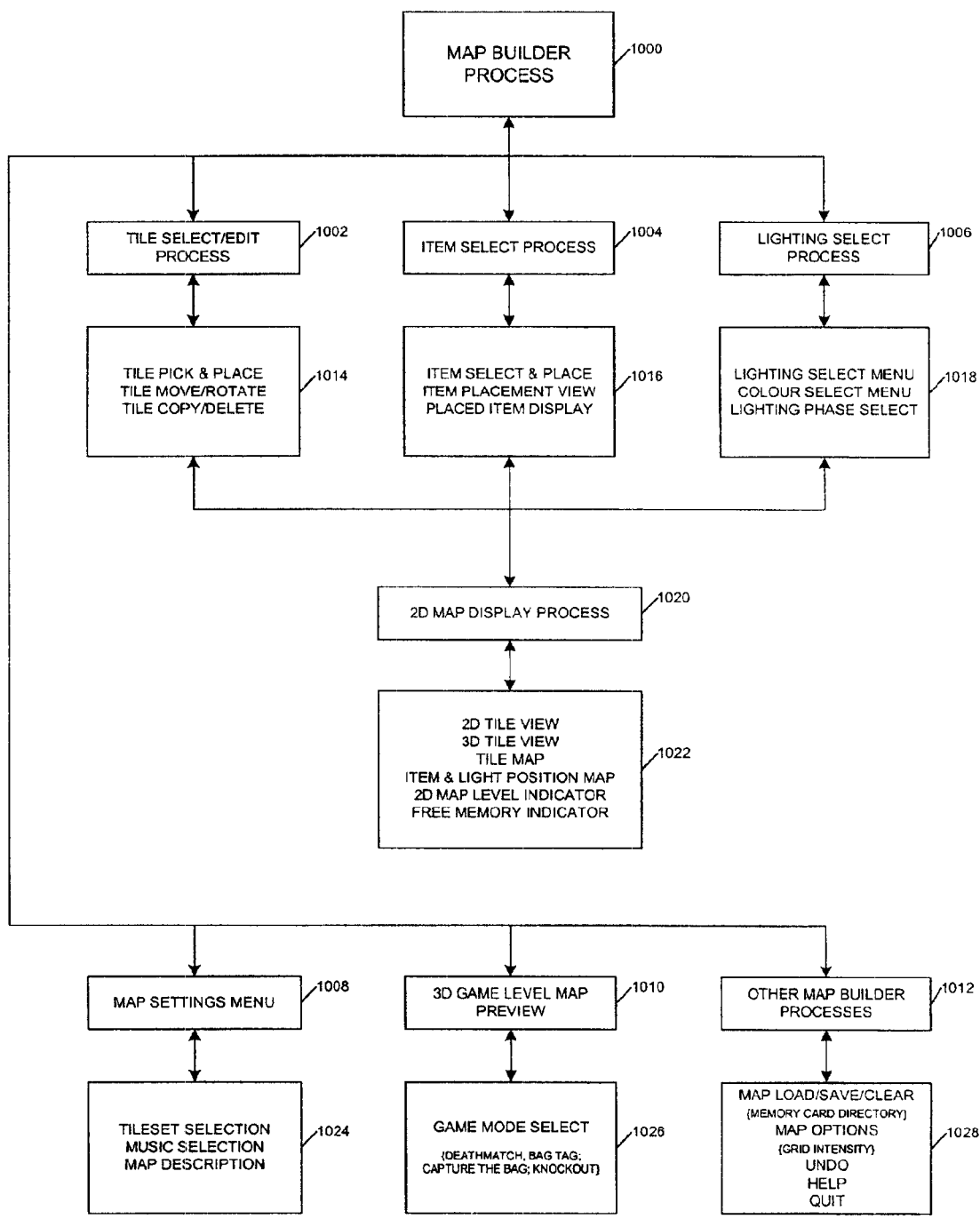
FIG. 10 illustrates the main processes of user interface software for the map builder user interface.

Referring now to FIG. 10, this illustrates the main processes of user interface software for the above-described map builder user interface. The processes are referred to in terms of graphical user interface (GUI) processes, but the skilled person will appreciate that the user interface software code may be logically divided in other ways. FIG. 10 begins with a main map builder process 1000, which links to a number of other processes for tile selection and the like. In the main these other processes need not be performed in any particular order although clearly, for example, at least one tile must be placed before the corresponding 3D game level can be viewed. Processes which are accessible by a user through a menu of the user interface are shown as linked to map builder process 1000; other processes are either processes invoked by a user via the GUI or processes invoked by a machine on which the map builder code runs, in order to implement a user interface function.

Referring in more detail to FIG. 10, from the main map builder process a user may invoke a tile select/edit process 1002, an item select process 1004, a lighting select process 1006, a map settings menu process 1008, a 3D game level map preview process 1010, and other map builder processes 1012.

The tile select/edit process 1002 invokes tile manipulation processes 1014, such as tile pick and place, tile move/rotate, and tile copy/delete, as appropriate. Item select process 1004 invokes item-related processes 1016, such as item select and place, item placement view, and placed item display processes. Lighting select process 1006 invokes lighting processes 1018 such as a lighting select menu process, a colour select menu process, and a lighting phase select process, as necessary. The tile 1014, item 1016, and lighting 1018 processes all interact with 2D map display process 1020, which in turn invokes display processes 1022 including a 2D tile page view process, a 3D tile skeleton view process, a tile map display process, an item position display process, a light display process, a 2D isometric bar map level indicator process, and a free memory indicator process.

The map settings menu process 1008 invokes, according to menu selections, menu selection processes including a tileset selection process, a music selection process, and a map description process. The 3D game level map preview process 1010 invokes a game mode select process 1026 which allows a user to input a game mode selection such as deathmatch, bagtag, capture the bag, or knockout mode selection, for generating an appropriate 3D game level virtual environment. The map preview process 1010 is, broadly speaking, a similar process to a game level map compile process, forming part of the game engine, as described later. Other map builder processes, which for the sake of illustration are grouped together as processes 1012, include processes 1028 such as map data manipulation processes (map clear, map load, map save, and map save directory), map option processes (such as a map grid intensity adjust process), a map edit undo process, a help process, and a map builder quit process.

Figure 11:
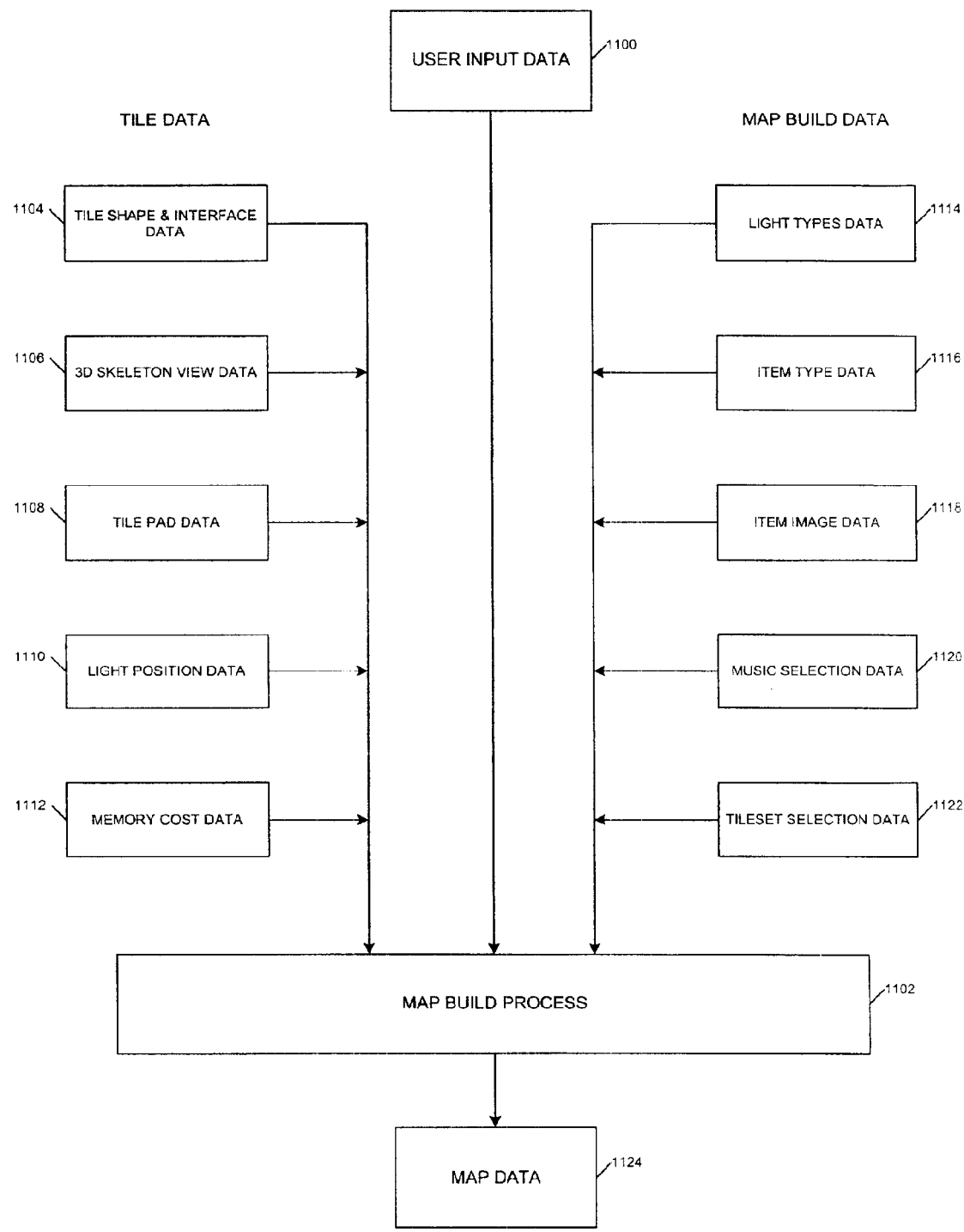
FIG. 11 shows a data flow diagram illustrating the main data components used in building a map of a 3D virtual environment.

FIG. 11 shows a data flow diagram illustrating the main data components used in building a map of a 3D virtual environment, "map" here referring to the data structure comprising tile position data, tile identification data, optionally tile orientation data, and other data for constructing a 3D virtual environment using, among other things, data describing 3D configurations of the tiles.

In FIG. 11 user input data as input by means of the above-described user interface is collectively indicated as user input data 1100 for map build process 1102. Also input to map build process 1102 is tile data comprising, for each tile, tile shape and interface data 1104 specifying a tile shape for 2D representation on a 2D tile map and interface data specifying the tile's interface type (size) and location; three-dimensional tile skeleton view data 1106, which in some embodiments may be derived from 3D geometry data of tileset 0, either by directly reading 3D data from tileset 0 and converting this to 3D skeleton view data as part of a 3D skeleton view display process for the map builder, or in alternative embodiments by creating a 3D skeleton view data file from tileset 0. The tile data also includes, in embodiments, for each tile, tile pad data 1108, for identifying and displaying item position placement pads, optional light position data 1110 for displaying a 2D representation of light positions within the tiles, and memory cost data 1112 for estimating a memory cost or memory usage for each tile, for estimating the memory usage of a 3D environment defined by the map (here "map" including, where appropriate, a series of 2D maps on a corresponding series of 2D levels).

Also input to map build process 1102 is map build data comprising light types data 1114 for providing tile lighting options, item type data 1116 for providing item selection options, item image data 1118 for item image icons for display when placing items on the map, music selection data for allowing a user to select a background soundtrack (note this is not the actual soundtrack data) and, where tileset selection data is stored with map data from the map build process, tileset section data 1122 for allowing a user to input data identifying a tileset for use in constructing a 3D virtual environment or game level from the map. The result of map build process 1102 is map data 1124. Since the map data output from map build process 1102 defines a fully workable 3D game environment, a map preview process may be implemented simply by, in effect, loading and running the game engine with the map data as input data.

The tile shape and interface data used by the map build process includes tile archetype data comprising a tile name or number, a tile dimension (x, y, z in grid units) and tile connectivity data specifying interface positions. A more detailed tile source code file includes a list of tile names, a set of 90° rotation matrices for the tiles, more detailed interface data specifying the location and type (size or length) of the interfaces for each tile in grid units tile "plug" pad definitions and tile memory cost data. The tile "plug" pad definitions comprise, for each tile, a list of navigation pads, akin to pads for 60 of FIG. 4b, adjacent to tile interfaces. These interface or "plug" pads are used in a pairwise search to link pads of joined tiles as described below.

The estimated memory requirements of a map are determined, in one embodiment, by adding the estimated memory requirements for the 3D environment defined by each tile. The memory cost of a tile forms part of the tile data and may be estimated based upon the tile visual geometry data storage requirements, the tile navigation (pad) data requirements, the data requirements for links between the pads, and the number of halls or rooms within a tile, for example as determined from empirical measurements of data storage requirements for the 3D representation of a tile. In one embodiment tile source code includes empirical formulas for the tile visual geometry cost, tile pad cost, tile link cost, and room cost into which a tile visual geometry data parameter (such as a visual geometry storage requirement in kilobytes), a tile number of pads, a tile number of links, and a tile number of rooms may be inserted in order to calculate an estimated memory cost for a tile. In one embodiment the memory cost for each tile is calculated in the tile source code by taking the maximum of the visual geometry cost, pad cost, link cost, and room cost.

Figure 12:
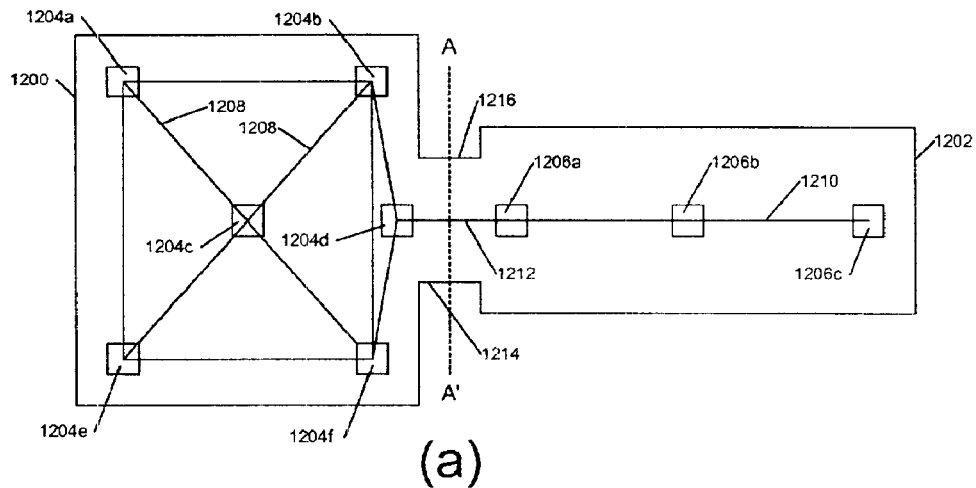
FIG. 12 conceptually illustrates the joining of two tiles in three dimensions.
Figure 12:
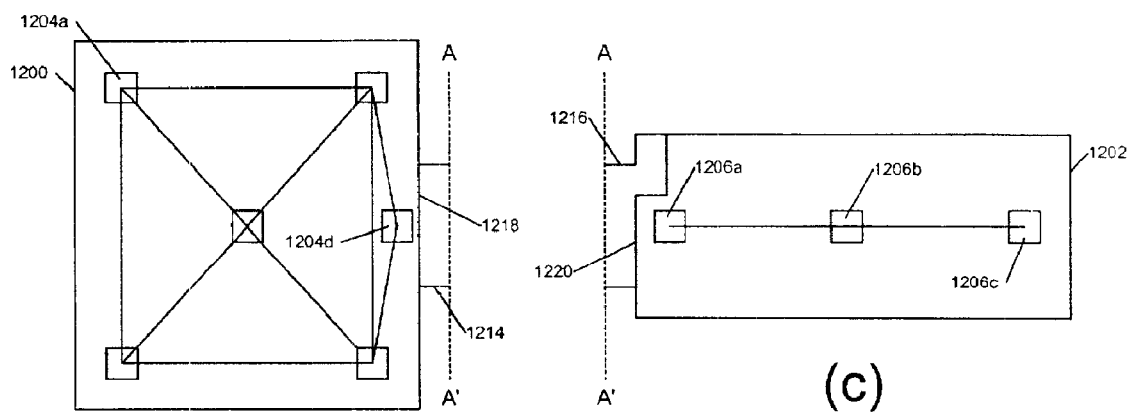
Figure 12:
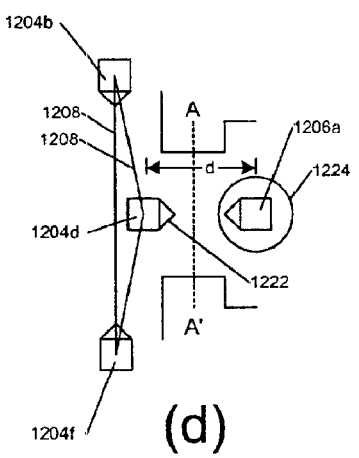
Figure 12:
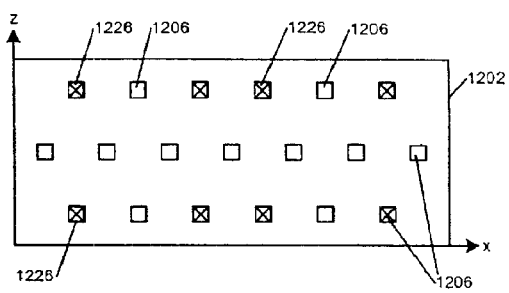

Referring now to FIG. 12, this conceptually illustrates the joining of two tiles in three dimensions. FIG. 12a shows a square room tile 1200 joined at interface AA' to a double corridor tile 1202 closed at one end. FIGS. 12b and 12c show the same tiles separated, that is, not joined to one another at their respective interfaces. As described with reference to FIG. 4b, both tiles include navigation pads 1204, 1206 for NPC navigation within the space defined by the tile (the number of pads has been reduced for ease of illustration). These navigation pads are connected by links 1208, 1210 which define allowed movements between the pads—a movement may be made from one pad to another only where the two pads are connected by a link. In FIG. 12a navigation pad 1204d of tile 1200 and navigation pad 1206 of tile 1202 are linked by link 1212, added when the tiles were joined.

FIGS. 12a to 12c illustrate a conceptual representation of the 3D tile geometry. Conceptually the visual geometry and collision geometry of a tile includes an interface portion 1214, 1216 depicted as a collar which, in three dimensions, is a three-dimensional collar attached to the "internal" visual and collision geometry of the tile. The interface portions or collars of each tile are arranged to exactly match one another so that the visual and collision geometries define contiguous visual and collision geometry services across the interface portions of joined tiles. Thus in FIG. 12 the visual and collision geometry of collar 1214 and the visual and collision geometry of collar 1216 match so that when the two tiles are joined, as shown in FIG. 12a, a closed and bounded virtual environment is defined.

The two separate tiles illustrated in FIGS. 12b and 12c each also include plug geometry 1218 and 1220 respectively. This "plug" geometry closes the interface portion of the tile (in three dimensions) so that when the interface is not used, i.e. when it is not joined to another tile, the part of the 3D environment defined by the tile is closed and bounded. As illustrated in FIG. 12c the plug geometry, which comprises both visual geometry and collision geometry, may be any shape provided that its corresponding interface is closed. With tile geometry as defined in FIGS. 12b and 12c where an interface is not used the collar geometry 1214, 1216 may be discarded. Where an interface is used for connecting to another tile the plug geometry is discarded. It will be appreciated that instead of discarding either the collar or the plug two entirely separate versions of the tile geometry may be provided for an interfaced and a non-interfaced tile, providing that the interfaced version of the tile geometry has a collar portion to match interface collar portions of other tiles within a tileset. The use of a collar-type interface is helpful in conceptually illustrating the linking of the visual and collision geometry of two tiles but it will be appreciated that such a collar portion is not necessary, and that in principle any interface geometry may be employed so long as the 3D visual and collision geometry of two tiles within a tileset can be exactly matched. For simplicity the 3D geometry of a tile will generally approximate to the simplified tile representations as shown, for example, in FIG. 6a. In this case it is convenient to locate the walls of the 3D tile geometry just inside the grid cube or cubes which the tile occupies in order to avoid coincident walls when tiles are placed adjacent to one another.

FIG. 12d illustrates in more detail how pads 1204d and 1206a of tiles 1200 and 1202 are joined to create link 1212. Broadly speaking, starting from pad 1204d a search is made for any tiles within a predetermined distance, d (in map or world units) of pad 1204d. This search may be geometrically based but, preferably, is carried out by checking each of the pads in tile 1202 to determine whether any or within the predetermined distance. As illustrated in FIG. 12d the pads 1204, 1206 have an associated y-rotation (the y axis coming out of the plane of the drawing) as illustrated by the pointed tips 1222 of the pads. To reduce the possibility of incorrectly creating links between pads the pad y-rotation may be used as a subsidiary check for the link process. As can be seen from FIG. 12d pads 1204d and 1206a face in substantially opposite directions and the pad linking algorithm may therefore place a further restriction (in addition to a maximum predetermined distance between pads) on pads which are to be linked. This restriction may comprise a maximum predetermined deviation of the difference is y-rotations of the two pads from 180°. The effect of these restrictions is to define a region 1224 within which a pad must be located in order to be joined to a pad of a neighbouring tile. This pad may define a region comprising a segment of a circle, the circle centred on the first pad position, that of pad 1204d in the illustrated example, or where a minimum predetermined separation from the first pad position is also defined the region within which the position of the pad to be linked to, pad 1206a, must be located is approximately circular and spaced away from the first pad position.

FIG. 12e depicts a simplified version of floor geometry for tile 1202 showing a more realistic number of navigation pads 1206. Some of these pads, pads 1226, are marked with an "X" to illustrate their designation as item position pads as well as navigation pads. These item position pads are provided with a pad draw flag which is set in tileset 0, for displaying the item pads in the map builder user interface. A double corridor tile as illustrated must have item pad positions corresponding to pads 1226 in each tileset, although the precise position of these pads may vary between tilesets.

The positions and rotations of pads within a tile are determined by a pad data file. Each different version of a tile in each different tileset has a separate pad data file as generally the internal geometry of a tile is different between different tilesets. Thus where there are, for example fifteen tiles and four separate tilesets (including tileset 0) sixty separate pad data files will generally be necessary.

An extract from a pad data file for a simple, 2×2×1 grid unit double corridor tile is shown below to illustrate the main elements of such a file. The pad data file is referenced by a tile name and a tileset name and includes header information defining a total number of pads (navigation and item placement pads) and a total number of links for the tile. A set of data fields then provides pad identification data, flag data indicating, among other things, whether or not a pad is an item placement pad, X, Y, Z position data, and y-rotation data. In the example Y is approximately zero for all the pads as the pads are located on the tile floor. It will be noted that, in conformity with screenshot 700 of FIG. 7a, the double corridor tile has eight item position pads, four in each floor grid square. The link data comprises, broadly speaking, a list of pairs of pad identifiers for corresponding linked pairs of pads. A cost value may also be included, for example providing relative separation data or other information for use by an NPC navigation routine.

```
>>
PAD DATA FILE FOR A SIMPLE 2 x 1 x 1 GRID UNIT DOUBLE
CORRIDOR TILE
>>
>> HEADER
>> number of pads; number of links
>>
.int 13, 20
>>
>> PADS
>>
>> data fields:
>> pad descriptor, pad ID number, flags, hall number, x, y, z, y-rotation
>>
>> flags are set bitwise, relevant flags are:
>> 1 = active
>> 16 = item placement pad
>>
>> This tile has only one hall (number 0); more complex tiles may have
more than one hall
>>
>> (For illustrative purposes only exemplary portions of the data are
>> shown and gaps in the data are denoted by an ellipsis . . . )
>>
pad1 1001, 1, 0, 2.400297, 0.000000, 9.125186, 0.000000
pad1 1002, 1, 0, 2.589598, 0.000000, 0.829437, 180.000000
pad1 1003, 1, 0, 2.538147, 0.000000, 4.938356, 0.000000
pad1 1006, 17, 0, 3.517253, 0.000000, 1.406614, 0.000000
```

-continued

```
pad1 1008, 17, 0, 3.522894, 0.000000, 6.229865, 0.000000
pad1 1010, 17, 0, 1.523007, 0.000000, 3.631620, 0.000000
pad1 1013, 17, 0, 1.481798, 0.000000, 1.419960, 0.000000
pad1 1014, 1, 0, 2.460843, 0.000095, 7.287042, -7.125016
pad1 1015, 1, 0, 2.674026, -0.001012, 2.485541, -172.874954
pad1 1016, 17, 0, 3.497514, 0.000000, 3.641082, 0.000000
pad1 1017, 17, 0, 1.381881, 0.000000, 6.256751, 0.000000
. . .
>>
>> LINKS
>>
>> data fields:
>> link descriptor, flags, pad1, pad2, cost
>>
>> link is between pad1 and pad2
>> cost is used in route finding calculation
>>
>>
link1 0, 1017, 1003, 0.000000
link1 0, 1017, 1014, 0.000000
link1 0, 1013, 1002, 0.000000
link1 0, 1002, 1006, 0.000000
. . .
```

In a preferred embodiment of the invention, plug pad identification data is also provided for each tile to identify pads, such as pad 1204d of FIG. 12b and pad 1206a of FIG. 12c, to simplify a pairwise search between tags of joined tiles for inserting links such as link 1212 in FIG. 12a. Thus, preferably, plug pad data for each tile comprises a list of pad identifiers identifying, for each interface of the tile, at least one pad position associated with that interface which could be linked to another tile connected at the interface. The plug pad data may, optionally, also include interface identifier data to associate pad identifiers with specific interfaces. Generally a one-unit long interface needs just a single "plug" pad whereas a longer three-unit interface will have four or five such "plug" pads. The "plug" pad data may be included in the separate pad data files but it is generally more efficient to include this data in another tile-related data file, as described above, to avoid unnecessary repetition. This is because the tile geometry and pad positions will generally be arranged such that a pad identifier identifying a pad in one tileset which is adjacent an interface will also identify pads in broadly corresponding positions in the other tilesets which are also adjacent the same interface.

Each tileset comprises three-dimensional and, optionally, collision geometry for each tile. The collision geometry is optional since the visual geometry may be employed for this purpose. The tile data preferably also includes portal definition data defining portals which are preferably located at the tile interfaces. This data is used together with the pad data, and texture data for applying to polygons of the visual geometry of the tileset, to create a 3D game level virtual environment.

The tiles are assembled according to data within a map data file comprising map data such as the map data 1124 resulting from the map build process 1102 shown in FIG. 11. The map data comprises, in one embodiment, header data specifying a tileset (optional if a default tileset is specified) and a quantity of tiles in the map. The map file also comprises tile data comprising a tile name and a tile position specified, for example, by X, Y, Z map grid co-ordinates; optionally tile orientation data may also be included. The tile data in the map data file may also include connection data specifying connections between interfaced tiles, although in other embodiments this is calculated from the tile position data. The map data file preferably also includes item data comprising, for each item on the map, item pad identification data (such as the pad ID number in the above-described pad data file) and item identification data. The map data file also includes optional lighting data and a comment field.

Figure 13:
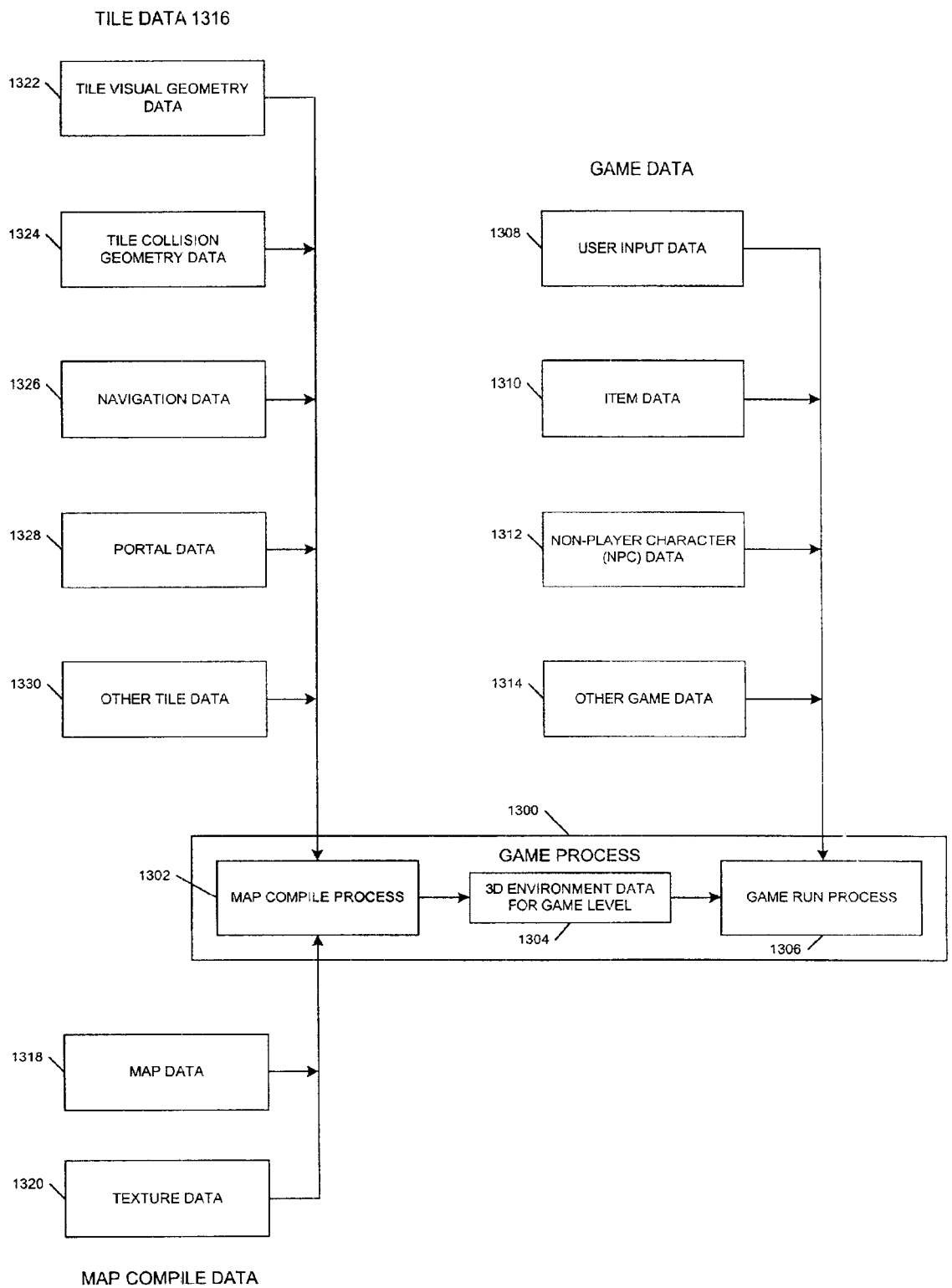
FIG. 13 shows an overview of a map compilation and game run process.

FIG. 13 shows an overview of a map compilation and game run process. A game process 1300 comprises a map compile process 1302 which results in 3D virtual environment data 1304 for a game level. This environment data then provides a data input to a game run process 1306 which runs the game level with the 3D virtual environment and other game data to provide a playable game, as illustrated in the screenshot of FIG. 1. Other input to the game run process 1306 include user input data 1308, for example specifying game mode, item data 1310, for example comprising 3D item image data, non-player character data 1312, for example comprising NPC image data and NPC artificial intelligence data, and other game data 1314, such as music data.

The map compile process has two main data inputs, tile data 1316 for each tile of a specified tileset, and map data 1318 (which preferably corresponds to map data 1124 of FIG. 11). To generate a realistic virtual environment other data, particularly texture data 1320 as outlined with reference to FIG. 3, is also required.

The tile data preferably comprises, for each tile, tile visual geometry data 1322, tile collision geometry data 1324, tile navigation data 1326, tile portal data 1328, and other tile data 1330 such as glass data (which may be a sub-category of special effects data), lighting data, special effects data, where applicable data for interactive tile features for interaction with player characters, and the like. Two versions of the tile visual geometry and tile collision geometry are provided for each tile, one version with plugged tile interfaces, and another version with open tile interfaces. In practice these two versions may comprise a single version of the basic tile geometry plus additional plug geometry.

It will be appreciated that the separation of the map compile process 1302 and game run process 1306 of game process 1300 is to some extent arbitrary and in practice the game code may exhibit no such simple subdivision. Similarly although some data, such as item image data and NPC image animation data, is effectively inserted within the 3D virtual environment when the game is run, in embodiments there may be no such logical separation of the data components of the game process. For example some elements of the map data 1318, such as data defining the positions of items and/or NPC spawn points, are in effect inherited by the 3D environment data 1304 and could be considered as a direct input into the "game run" process 1306.

The tile visual geometry data, tile collision geometry data, and portal data for each tile within a tileset is, in one embodiment, defined in a tile data file. An extract from such a tile data file for a simple 2×1×1 grid unit double corridor tile follows.

```
>>
>> TILE DATA FILE FOR A 2 × 1 × 1 GRID UNIT DOUBLE CORRIDOR
>>
>> The tile has two plugs, one at either end of the corridor, denoted "B_1" and "B_2"
>>
>>
>> (For illustrative purposes only exemplary portions of the data are shown
>> and gaps in the data are denoted by an ellipsis . . . )
>>
    filestart:
>>
>> POINTERS
>>
>> Pointers into data structures:
>> (int 0 is an END marker)
>>
    pointerarray:
        .int (textures-filestart)
        .int (levelrooms-filestart)
        .int (levelportals-filestart)
        .int 0
>>
>> TEXTURES
>>
>> References to the texture image files which
>> are mapped onto the polygonal geometry
>>
    textures:
        .int 2787, 0, 0, 0x00000000; 128*64 (0,7) ./conc_old_floord.rgb (file texture 1)
        .int 2788, 0, 0, 0x00000000; 128*64 (0,4) ./conc_old_floorf.rgb (file texture 2)
        .int 2789, 0, 0, 0x00000000; 128*64 (0,8) ./conc_tile_floor.rgb (file texture 3)
        .int 2790, 0, 0, 0x00000000; 128*32 (0,2) ./conc_tile_floor_half.rgb (file texture 4)
        . . .
        .int −1, 0,0,0
>>
>> ROOMS
>>
>>
>> All the geometry is divided into rooms (or halls)
>> This tile has only one internal room or hall
>> named "RO_corridor_sgl"
>>
```

```
    levelrooms:
        .int 0, 0, 0, 0, 0, 0
        .float 0.0, 0.0, 0.0, 0.0, 0.0, 0.0
        .int (ob_RO_corridor_sgl-filestart), (portals_RO_corridor_sgl-filestart),
(floors_RO_corridor_sgl-filestart), (walls_RO_corridor_sgl-filestart),
(glass_RO_corridor_sgl-filestart), (specialfx_RO_corridor_sgl-filestart)
        .float 0.500000, 0.000000, 0.000000, 4.500000, 3.000000, 5.000000
        .int 0, 0, 0, 0, 0, 0
        .float 0.0, 0.0, 0.0, 0.0, 0.0, 0.0
>>
>> PORTALS
>>
>> This tile has two portals, "PO_1" and "PO_2"
>> They are located at the plugs at either end
>> of the room "RO_corridor_sgl"
>>
    levelportals:
        .int 0
        .int (portal_PO_1-filestart)
        .int (portal_PO_2-filestart)
        .int 0
>>
>> GRAPHICS DATA
>>
>> A flag indicates that this is the start of data for the opaque ('opa') graphics in
RO_corridor_sgl
>> This is followed by the components of this data:
>> vertex coordinates, texture mappings, and vertex colours
>>
    data_RO_corridor_sgl_opa:
        ;iwzyx 0x00000000, 0x00000412, 0x302e4000, 0x00008004 ; 2 tris
        . . .
>>
>> Polygon vertex coordinates for the opaque (opa) graphics in RO_corridor_sgl
>>
    xyz_RO_corridor_sgl_opa:
        .float 4.000000, 2.500000, 2.000000, 1.0039062 ; p1171A0_f1_t0 v1
        .float 4.000000, 0.000000, 2.000000, 1.0039062 ; p1171A0_f1_t0 v2
        .float 4.000000, 2.500000, 3.000000, 1.0 ; p1171A0_f1_t0 v0
        .float 4.000000, 0.000000, 3.000000, 1.0 ; p1171A0_f1_t1 v2
        . . .
>>
>> Texture mapping data for the opaque (opa) graphics in RO_corridor_sgl
>>
    st_RO_corridor_sgl_opa:
        .float 1.665085, −0.000000, 1.0, 1.0 ; st (p1171A0_f1_t0)
        .float −0.000000, −0.000000, 1.0, 1.0 ; st (p1171A0_f1_t0)
        .float 1.665085, 1.001280, 1.0, 1.0 ; st (p1171A0_f1_t0)
        .float 0.000000, 1.001280, 1.0, 1.0 ; st (p1171A0_f1_t1)
        . . .
>>
>> Vertex colour data for the opaque (opa) graphics in RO_corridor_sgl
>> (In the game engine vertex colours are modified by the tile's light settings)
>>
    rgba_RO_corridor_sgl_opa:
        .byte 0x2a,0x2a,0x2a,0x7f
        .byte 0x7f,0x7f,0x7f,0x7f
        . . .
>>
>> A flag indicates that this is the data for the translucent (xlu) graphics in
RO_corridor_sgl
>> This is followed by the components of this data:
>> vertex coordinates, texture mappings, and vertex colours
>>
    data_RO_corridor_sgl_xlu:
        ;iwzyx 0x00000000, 0x00000412, 0x302e4000, 0x00008004 ; 2 tris
        ;iwzyx 0x00000000, 0x00000412, 0x302e4000, 0x00008004 ; 2 tris
        . . .
    xyz_RO_corridor_sgl_xlu:
        .float 4.000000, 2.500000, 2.000000, 1.0039062 ; p1297B1_f1_t0 v1
        .float 4.000000, 0.000000, 2.000000, 1.0039062 ; p1297B1_f1_t0 v2
        . . .
    st_RO_corridor_sgl_xlu:
        .float −2.852521, 5.446494, 1.0, 1.0 ; st (p1297B1_f1_t0)
        .float 0.876458, 0.174657, 1.0, 1.0 ; st (p1297B1_f1_t0)
        . . .
```

-continued

```
    rgba_RO_corridor_sgl_xlu:
        .byte 0x2a,0x2a,0x2a,0x1f
        .byte 0x7f,0x7f,0x7f,0x1f
        . . .
>>
>> LIGHT DATA
>>
>> This is data for light special effects in room
>> There is one light source "L_1"
>> (this light 'source' is simply rendered as a screenspace glow effect in the engine -
>> it is not used for any lighting calculations)
>>
    light_L_1_a:
        .int LIGHTTYPE_GLOW
        .short 0, 0 ; subtype, directional
        .float 2.500000, 2.448242, 2.500000 ; light pt 0
        .float 2.400391, 2.448242, 2.965820 ; light pt 1
        .float 2.400391, 2.448242, 2.034180 ; light pt 2
        .float 2.599609, 2.448242, 2.034180 ; light pt 3
        .float 2.599609, 2.448242, 2.965820 ; light pt 4
        .float 2.500000, 2.448242, 2.500000 ; glow pt 0
        .float 2.400391, 2.448242, 2.604492 ; glow pt 1
        .float 2.400391, 2.448242, 2.395508 ; glow pt 2
        .float 2.599609, 2.448242, 2.395508 ; glow pt 3
        .float 2.599609, 2.448242, 2.604492 ; glow pt 4
        .float 0.000000, -1.000000, 0.000000 ; normal
        .int 0x7f7f7f00 ; col
                .int 0, 0 ; internal: prevAlpha and intensity variables
>>
>> PLUG DATA
>>
>> This is the start of data for the opaque (opa) graphics in the plug B_2
>> This is followed by the components of this data:
>> vertex coordinates, texture mappings, and vertex colours
>>
>> (This graphics data is only used when the associated interface has not been
connected to another tile;
>> where a connection has been made, this data is discarded at runtime)
>>
    data_B_2_opa:
        ;iwzyx 0x00000000, 0x00000412, 0x302e4000, 0x00008005 ; 3 tris
        . . .
        xyz_B_2_opa:
        .float 4.500000, 1.500000, 4.500000, 1.0039062 ; p2711W6_f1_t0 v2
        .float 4.500000, 0.000000, 4.500000, 1.0039062 ; p2711W6_f1_t0 v0
        .float 2.500000, 1.500000, 4.500000, 1.0 ; p2711W6_f1_t0 v1
        . . .
        st_B_2_opa:
        .float 0.000000, 0.000000, 1.0, 1.0 ; st (p2711W6_f1_t0)
        .float 1.000000, 0.000000, 1.0, 1.0 ; st (p2711W6_f1_t0)
        .float 0.000000, 1.497376, 1.0, 1.0 ; st (p2711W6_f1_t0)
        . . .
        rgba_B_2_opa:
        .byte 0x18,0x18,0x18,0x7f
        .byte 0x3a,0x3a,0x3a,0x7f
        . . .
>>
>> This is the start of data for the opaque (opa) graphics in the plug B_1
>>
>> This is followed by the components of this data:
>> vertex coordinates, texture mappings, and vertex colours
>>
>> (This graphics data is only used when the associated interface has not been
connected to another tile;
>> where a connection has been made, this data is discarded at runtime)
>>
    data_B_1_opa:
        ;iwzyx 0x00000000, 0x00000412, 0x302e4000, 0x00008005 ; 3 tris
        . . .
        xyz_B_1_opa:
        .float 0.500000, 1.500000, 0.500000, 1.0039062 ; p2722C2_f1_t0 v2 (nodrawkick)
        .float 0.500000, 0.000000, 0.500000, 1.0039062 ; p2722C2_f1_t0 v0 (nodrawkick)
        . . .
        st_B_1_opa:
        .float 1.000000, -1.000000, 1.0, 1.0 ; st (p2722C2_f1_t0)
        .float -0.000000, -1.000000, 1.0, 1.0 ; st (p2722C2_f1_t0)
        .float 1.000000, 0.502074, 1.0, 1.0 ; st (p2722C2_f1_t0)
        . . .
```

-continued

```
    rgba_B_1_opa:
        .byte 0x18,0x18,0x18,0x7f
        .byte 0x3a,0x3a,0x3a,0x7f
        ...
>>
>> COMPONENT DESCRIPTION DATA
>> A description of the component parts of the tile;
>> starts with the room component
>>
    PARTNUM_RO_corridor_sgl=0
    PARTNUM_B_2=1
    PARTNUM_B_1=2
    part_RO_corridor_sgl:
        .bytePARTTYPE_BEAD, 0, -1, PARTNUM_B_2, -1 -1, 1, 0
        .int (list_RO_corridor_sgl_opa-filestart), NULL, (list_RO_corridor_sgl_xlu-filestart),
(light_L_1_a-filestart)
        .int (data_RO_corridor_sgl_opa-filestart), (xyz_RO_corridor_sgl_opa-filestart),
(st_RO_corridor_sgl_opa-filestart), (rgba_RO_corridor_sgl_opa-filestart), NULL
        .int NULL, NULL, NULL, NULL, NULL
        .int (data_RO_corridor_sgl_xlu-filestart), (xyz_RO_corridor_sgl_xlu-filestart),
(st_RO_corridor_sgl_xlu-filestart), (rgba_RO_corridor_sgl_xlu-filestart), NULL
        .short 0x0000, 351, 191, 0 ; switch, numvtxs, numtris, pad
        .int NULL, 0
        .float 1.0, 0.0, 0.0 ; weight, pad2, pad3
>>
>> Plug B_2 component
>>
    part_B_2:
        .byte PARTTYPE_BEAD, 0, PARTNUM_RO_corridor_sgl, -1, PARTNUM_B_1,
-1, 0, 0
        .int (list_B_2_opa-filestart), NULL, NULL, NULL
        .int (data_B_2_opa-filestart), (xyz_B_2_opa-filestart), (st_B_2_opa-filestart),
(rgba_B_2_opa-filestart), NULL
        .int NULL, NULL, NULL, NULL, NULL
        .int NULL, NULL, NULL, NULL, NULL
        .short 0x0002, 10, 6, 0 ; switch, numvtxs, numtris, pad
        .int NULL, 0
        .float 1.0, 0.0, 0.0 ; weight, pad2, pad3
>>
>> Plug B_1 component
>>
    part B_1:
        .byte PARTTYPE_BEAD, 0, PARTNUM_RO_corridor_sgl, -1, -1,
    PARTNUM_B_2, 0, 0
        .int (list_B_1_opa-filestart), NULL, NULL, NULL
        .int (data_B_1_opa-filestart), (xyz_B_1_opa-filestart), (st_B_1_opa-filestart),
(rgba_B_1_opa-filestart), NULL
        .int NULL, NULL, NULL, NULL, NULL
        .int NULL, NULL, NULL, NULL, NULL
        .short 0x0001, 10, 6, 0 ; switch, numvtxs, numtris, pad
        .int NULL, 0
        .float 1.0, 0.0, 0.0 ; weight, pad2, pad3
    ob_RO_corridor_sgl:
        .int 3, 0, 0 ; numparts, nummatrices, lit
        .int 0, 0, 0, 0, 0, 0, 0, 0 ; texlist, newtexlist, vpointers[3], dpointers[3]
        .int 0, 0 ; spare
        .float 1.000000 ; chr.scale
>>
>> PORTAL DATA
>>
>> Geometry data for the portals "PO_1" and "PO_2"
>>
    portal_PO_1:
        .int ROOMNUM_NONE, ROOMNUM_corridor_sgl
        .float 0.000000, -0.000000, 1.000000
        .int 4
        .float 4.500000, 0.000000, 0.000000
        .float 4.500000, 3.000000, 0.000000
        .float 0.500000, 3.000000, 0.000000
        .float 0.500000, 0.000000, 0.000000
    portal_PO_2:
        .int ROOMNUM_NONE, ROOMNUM_corridor_sgl
        .float 0.000000,0.000000,-1.000000
        .int 4
        .float 0.500000, 0.000000, 5.000000
        .float 0.500000, 3.000000, 5.000000
        .float 4.500000, 3.000000, 5.000000
        .float 4.500000, 0.000000, 5.000000
```

-continued

```
        portals_RO_corridor_sgl:
            .int 2, 1,2
>>
>> COLLISION GEOMETRY DATA
>>
>>
>> Floor list data
>>
>> A list of the polygons describing floor "hits"
>> (used for player character movement and collisions)
>>
        floors_RO_corridor_sgl:
            .int (floor_p1354L5_f1-filestart)
            . . .
.int 0
>>
>> Wall list data
>>
>> A list of the polygons describing wall "hits"
>> (used for player character movement and collisions)
>>
        walls_RO_corridor_sgl:
            .int (wall_p1355M6_f1-filestart)
            .int (wall_p1356N7_f1-filestart)
            .int (wall_p1357O8_f1-filestart)
            . . .
.int 0
>>
>> Glass data
>>
>> A list of glass elements in the tile
>> (in this case there are none)
>>
        glass_RO_corridor_sgl:
            .int 0
>>
>> SpecialFX data
>>
>> A list of special effect elements in the tile
>> (in this case there are none)
>>
        specialfx_RO_corridor_sgl:
            .int 0
>>
>> Floor geometry data
>>
>> Geometry data for the floor hit polygons
>>
        floor_p1354L5_f1:
            .int 4
            .short 0x0000, FLOORFLAG_NONE
            .int 0
            .float 0.0
            .float 0.500000, 0.000000, 5.000000
            .float 4.500000, 0.000000, 5.000000
            .float 4.500000, 0.000000, 0.000000
            .float 0.500000, 0.000000, 0.000000
            . . .
>>
>> Wall geometry data
>>
>> Geometry data for the wall hit polygons
>>
        wall_p1355M6_f1:
            .short 0x0000, WALLFLAG_NONE
            .float 0.500000, 0.000000, 3.000000, 3.000000
            .float 0.500000, 0.000000, 5.000000, 3.000000
        wall_p1356N7_f1:
            .short 0x0000, WALLFLAG_NONE
            .float 0.500000, 0.000000, 0.000000, 3.000000
            .float 0.500000, 0.000000, 2.000000, 3.000000
        wall_p1357O8_f1:
            .short 0x0000, WALLFLAG_NONE
            .float 1.000000, 0.000000, 2.000000, 3.000000
            .float 1.000000, 0.000000, 3.000000, 3.000000
            . . .
```

```
>>
>> Glass geometry data
>>
>> Geometry data for the glass polygons
>> (in this case there are none)
>>
>>
>> Specialfx geometry data
>>
>> Geometry data for the special effect polygons
>> (in this case there are none)
>>
```

The double corridor tile comprises a single room or hall with a 1×1 grid unit interface at either end. The visual geometry of the tile is painted with textures defined in texture image files separate from the tile data file, which are referenced from within the tile data file. Each room within a tile (in this case the single room) comprises room visual geometry, portal definitions, collision geometry (floor and wall geometry), glass geometry (if applicable) and special effects geometry (if applicable). Generally portals are located at each interface of a tile, in the case of the above-described corridor tile, at either end of the corridor, but for larger tiles portals may also be placed within the tile. The portal geometry, collision geometry, glass geometry, and special effects geometry is defined in the tile data file as a set of pointers pointing to portal, collision, glass, and special effects data.

A large component of the tile data file comprises graphics data for both opaque and translucent (or transparent) graphics, the graphics data including lighting effects data and plug data defining plugs such as plugs 1218 and 1220 of FIGS. 12*b* and 12*c* for closing tile interfaces. Since the plug geometry is relatively simple there may be no separate collision geometry for these plugs, in which case the plug visual geometry may also be used as collision geometry in the event that the corresponding interface is not joined to another tile.

The opaque graphics data comprises a set of X, Y, Z co-ordinates defining vertices for each polygon from which the visual geometry is constructed. In the above four polygon vertex co-ordinates are given for polygon p 1171A0. Associated with this polygon data is texture mapping data and vertex colour data as illustrated in the above example. The corresponding data is also provided for any translucent tile graphics. Glow polygons are also defined for lighting special effects.

Figure 14A:
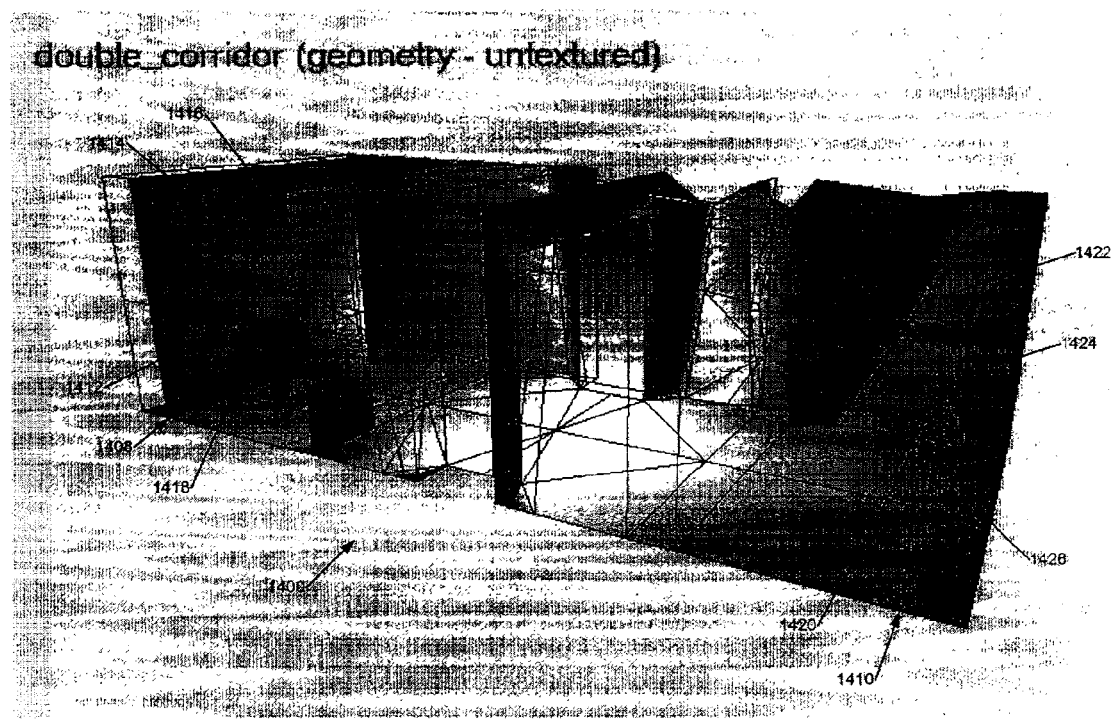
FIGS. 14a and 14b show visual geometry for a double corridor tile.
Figure 14B:
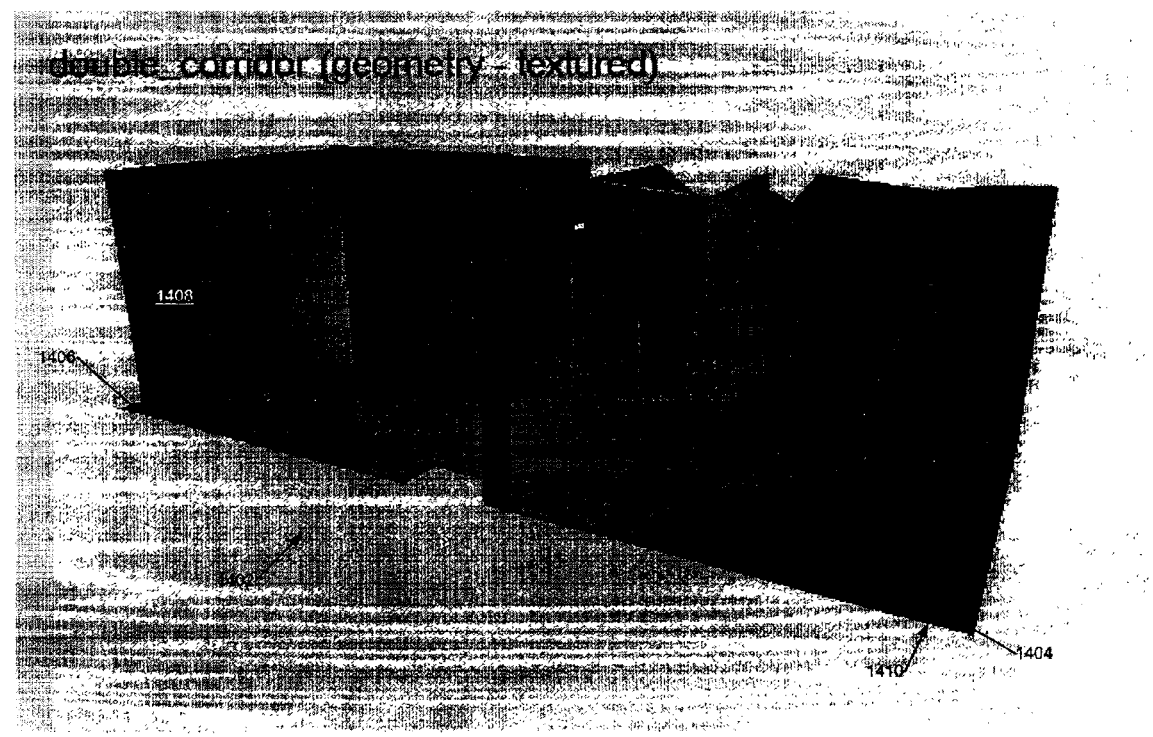

FIGS. 14*a* and 14*b* show visual geometry for the double corridor tile defined by the data file from which the above tile data is extracted. FIG. 14*a* shows the untextured geometry 1400, and FIG. 14*b* shows the effect of adding texture mapping to the visual geometry to provide textured geometry 1402. The double corridor tile has a basically tubular shape of rectangular cross section. The interface portions of the tile 1404, 1406 are formed by the square end edge of the tile's visual geometry, defining an interface geometry comprising a two-dimensional square of approximately unit grid length on each side. This interface is represented, in the 2D map builder map as a one-unit long line across each end of the corridor tile, as illustrated in FIG. 6*a*. It will be appreciated that all the other one-unit long interfaces of the tileset to which the corridor tile with this particular geometry belongs (i.e. interfaces 612 in FIG. 6*a*) are defined to have the same geometry at their interface portions as does this double corridor tile. For example, a 2×2×1 unit square room tile with one unit interfaces will have interface geometry portions which, by appropriately translating the tile in 3D world space, can be arranged to exactly match up with the interface portions 1404 and 1406 of the double corridor tile of FIG. 14. When two such tiles are placed adjacent one another in 3D space so that their interface portions align, the 3D geometry of the two joined tiles forms a contiguous surface, without gaps, providing a continuous boundary to the 3D virtual environment of the game level.

The tile data file also includes plug data defining graphics, for example opaque graphics, for two simple plugs 1408, 1410, one at either end of the corridor tile (plug 1410 is not shown in FIG. 14*b*). For convenience these plugs are inset slightly from the ends of the tile where it can be interfaced to an adjoining tile. The plug graphics, like the basic tile graphics, comprise polygon data, texture data, and vertex colour data for each plug.

Referring to the above tile data file extract it can be seen that the graphics data for plug B_2 has (X, Z) co-ordinates of (4.5, 4.5), whilst that of plug B_1 has (X, Z) co-ordinates of (0.5, 0.5). The tile itself is five units long and it can be seen that plug B_1 is at 0.5 units from one end and plug B_2 is at 0.5 units from the other end of the tile. FIGS. 14*a* and 14*b* show that each plug is defined by four triangles, 1412, 1414, 1416, 1418 and 1420, 1422, 1424, 1426 making up a flat, two-dimensional plug geometry surface.

FIG. 14*c* shows a simplified version of the tile geometry in which only the plug geometry and portal geometry is drawn. This more clearly illustrates the composition of the flat plug geometry used for this simple corridor tile. Referring again to the extract from the tile data file, it can be seen that the two portals, PO_1 and PO_2 are each defined by four (X, Y, Z) vertex co-ordinates each describing a 2D rectangular portal. In FIG. 14*c* portal PO_1 1428 is positioned at Z=0, across one interface to the tile and portal PO_2 1430 is positioned at Z=5, across the other interface to the tile. The portals are positioned outside the plugs so that they only come into play when the tile is joined to another tile, since they are not needed at an interface when that interface is plugged.

Figure 15A:
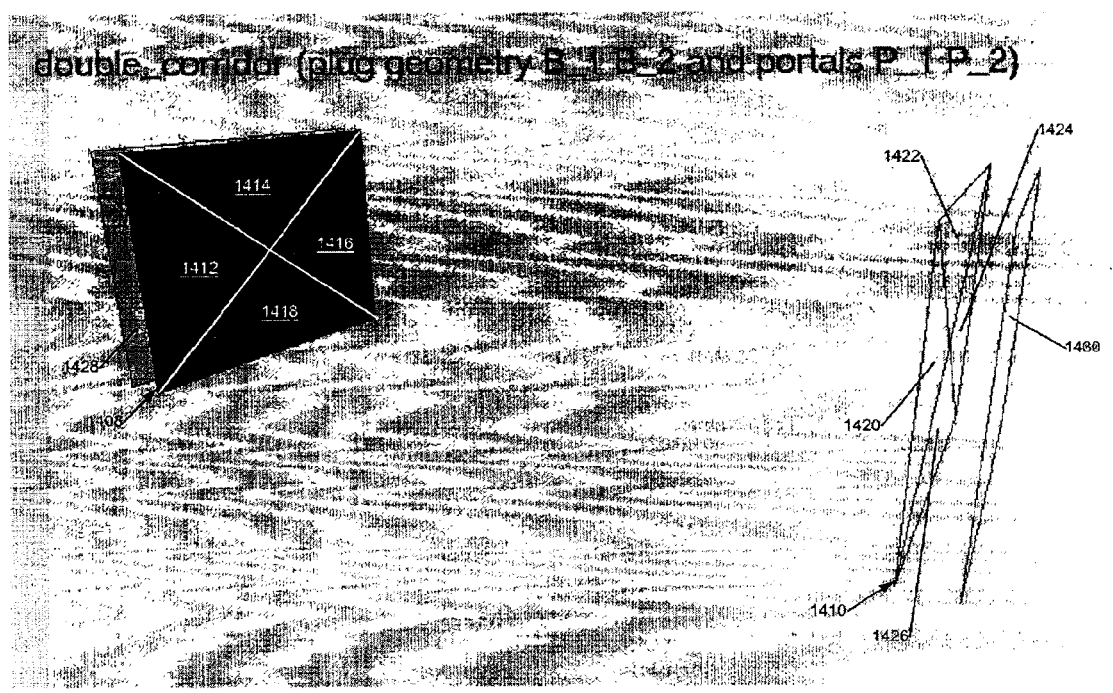
FIGS. 15a and 15b show collision geometry and portal geometry for the double corridor tile of FIG. 14.
Figure 15B:

FIG. 15*b* shows collision geometry and portal geometry for the double corridor tile of FIG. 14. The collision geometry illustrated in FIG. 15*b* comprises floor geometry 1432 and wall geometry 1434, defined by floors lists and walls lists in the above tile data file extract. It can be seen from FIG. 15 that the collision geometry represents a simplified version of the visual geometry of FIG. 14*a*. FIG. 15*b* shows the collision geometry for the open-ended tile, that is for the version of the tile data for use when the tile is connected at both of its end interfaces. The visual plug geometry 1408 and 1410 also forms the plug collision geometry as, because the plug geometry is simple, there is little to be achieved in defining separate plug collision geometry.

In the above tile data file extract the component description data, which includes data for the room component and the two plug components of the tile, includes means for specifying component parts of the file to be drawn. In the above example this comprises a bit field in which bits are set or cleared to provide a mask for determining whether or not a component is to be drawn. Thus, in the tile data file extract, the room component has a bit field, "short 0x0000", the all-0s bit field specifying that this component is always to be drawn; the plug B_2 component has a bit field "short 0x0002" specifying that bit 1 should be set if this component is to be drawn, and plug B_1 component has a bit field "short 0x0001" specifying that bit 0 should be set if this component is to be drawn.

In a similar way the geometry data also includes bit fields for defining when the geometry data is to be used. Thus, in the above extract, the floor geometry data and wall geometry data extracts both include a bit field "short 0x0000" indicating that this floor and wall geometry is always to be used. However other wall and/or floor geometry may only be used when corresponding visual geometry is employed so that, for example, an end wall may only apply when the corresponding visual plug is drawn. For example, collision geometry for plug B_2 component may have a bit field "short 0x0002" so that this collision geometry is only used when the plug B_2 component is drawn.

In some embodiments visual geometry which is to be used as collision geometry is identified by a data tag or flag, and if visual geometry is so-tagged it is interpreted as wall or floor collision geometry. Thus the plug polygon data may be tagged or flagged in this way. In other embodiments an artist using a 3D design program sets a flag when visual geometry is to be used as collision geometry, and this flag is used by converter software, which converts the 3D data to game format data, to duplicate the visual geometry as collision geometry. In this embodiment part of the visual geometry may be used as collision geometry but the visual geometry is duplicated and written into the game data as collision geometry, which has the advantage that the collision geometry may be held in a self-contained data structure, that is, without the need to references out of the collision geometry data structure to parts of the visual geometry data structure.

Figure 16A:
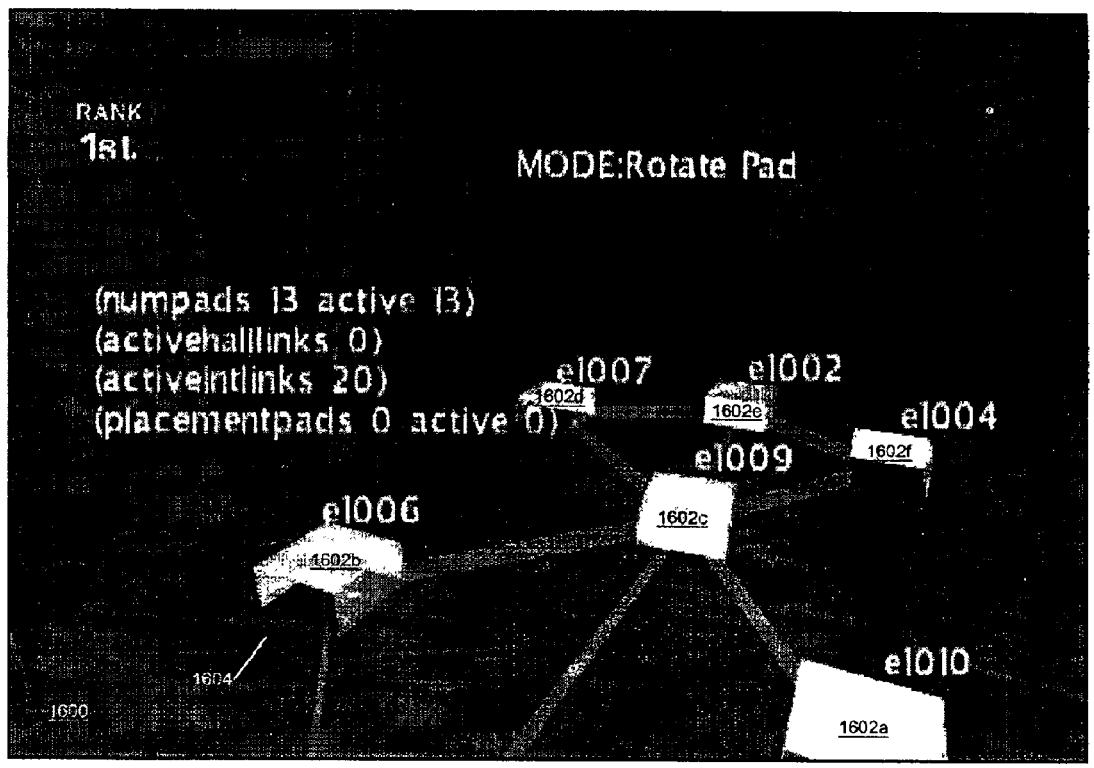
FIGS. 16a and 16b show navigation pad positions and links for the double corridor tile of FIG. 14.
Figure 16B:
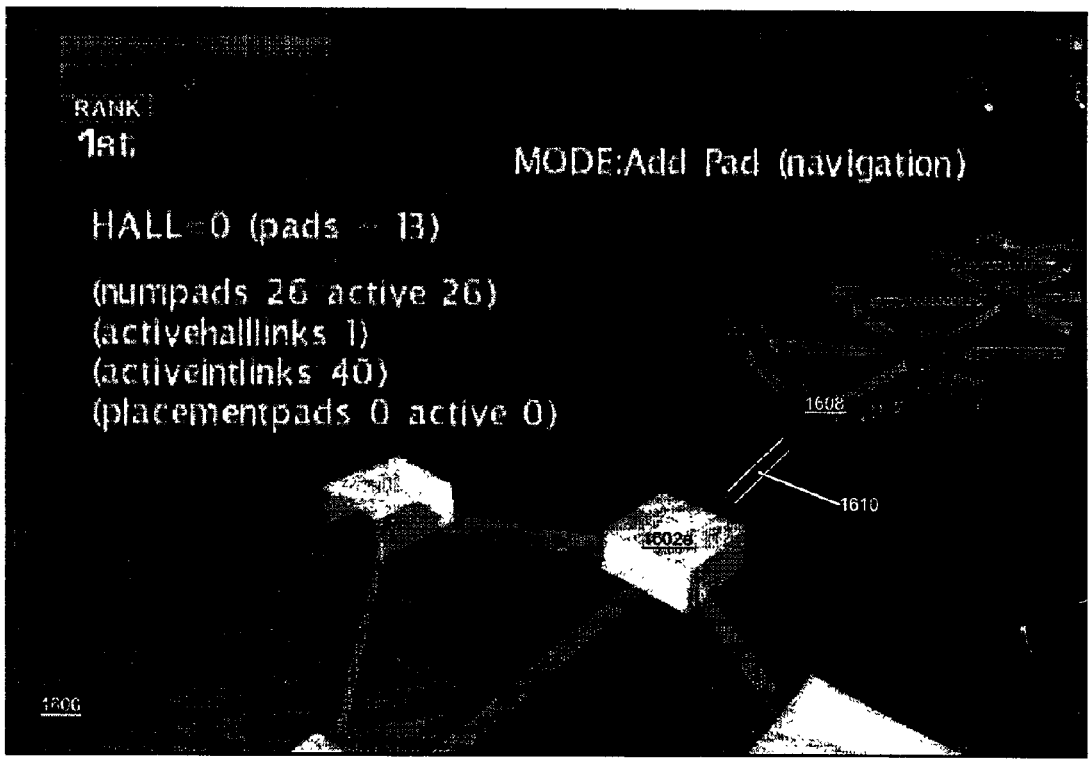

Referring now to FIGS. 16a and 16b, these show navigation pad positions and links for the double corridor tile of FIG. 14 for, respectively, the tile when not interfaced and the tile when interfaced to another similar double corridor tile.

FIG. 16a shows one end 1600 of the double corridor tile of FIG. 14, showing navigation pads 1602 which broadly corresponding to those shown in FIG. 12e (although the number of pads and links differs from FIG. 12e), and to those defined in the pad data file of which an extract is provided above. The pads have a pointer 1604 indicating a y-rotation, again as described with reference to FIG. 12. One of the pads, pad 1602e, is positioned at one end of the double corridor tile adjacent the interface portion of the tile, and facing towards the interface (CF FIG. 12d); this pad (pad identifier e1002) is also listed as an interface or "plug" pad in a tile plug pad data file.

FIG. 16b shows a pad arrangement 1606 at the junction between two double corridor tiles in which a link has been made from pad 1602e to an interface or "plug" pad, pad 1608, in a second double corridor tile to which the first double corridor tile is joined or interfaced. A navigation link 1610 has been added between the two tiles in a similar manner to that described with reference to FIGS. 12a and 12d. This facilitates NPC navigation between the two tiles.

Referring now to FIGS. 17a to 17d these show, respectively, a 2D map and corresponding 3D game level geometry for a single double corridor tile and a pair of joined double corridor tiles.

Figure 17A:
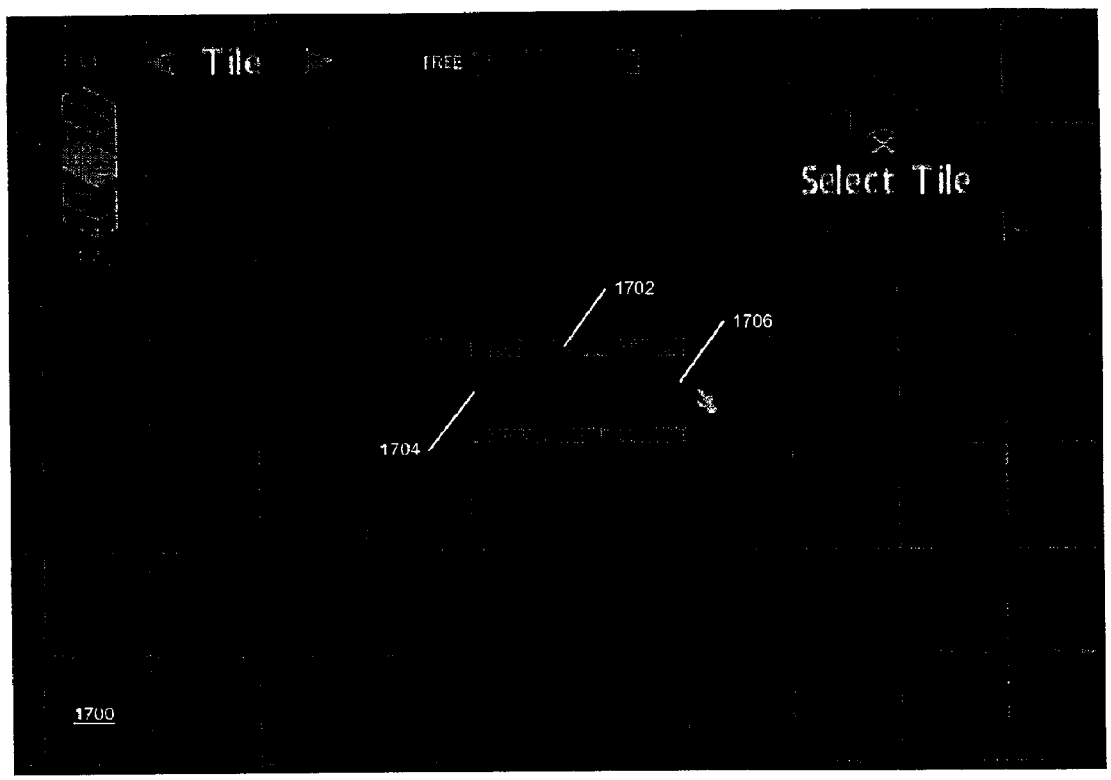
FIGS. 17a to 17d show, respectively, a 2D map and corresponding 3D game level geometry for a single double corridor tile and a pair of joined double corridor tiles.
Figure 17B:
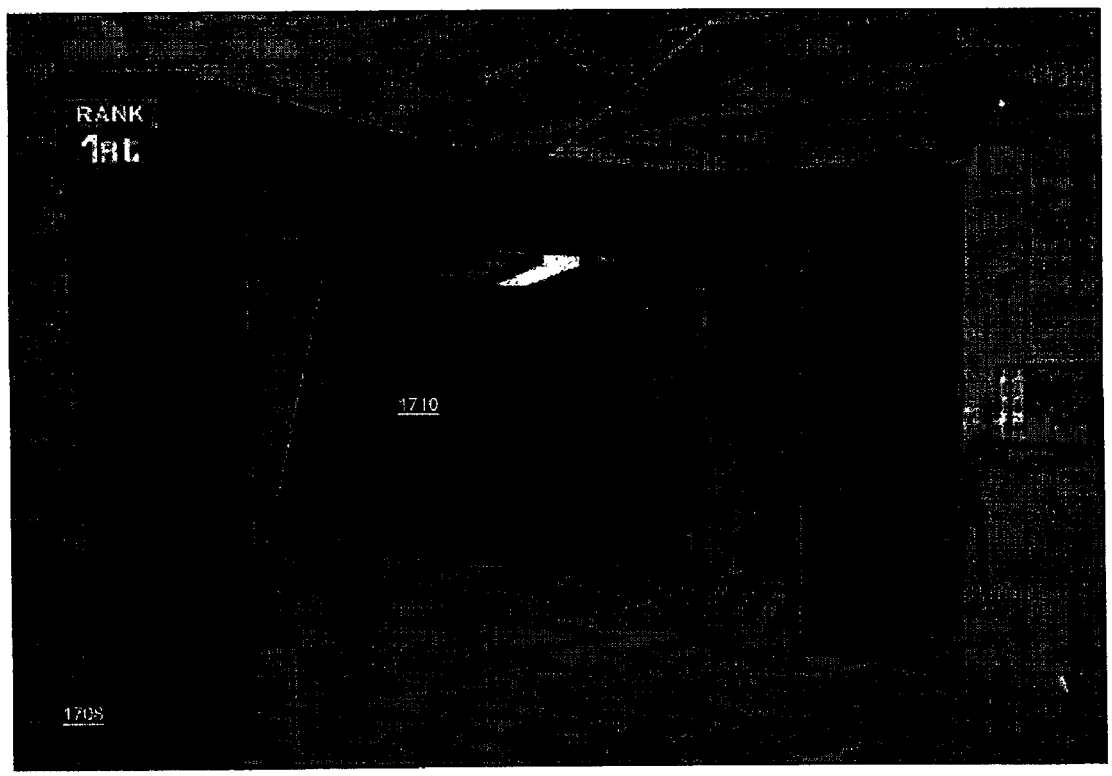

FIG. 17a shows a map builder user interface screen 1700 displaying a 2D map comprising a single double tile 1702 (similar to screen 652 of FIG. 6b). FIG. 17b shows the 3D game level virtual environment 1708 resulting from this single tile. This environment comprises a complete, theoretically playable game level, albeit of very limited extent. It can be seen in FIG. 17a that neither of interface portions 1704 and 1706 of tile 1702 are used to connected to other tiles. For this reason a 3D virtual environment representing map 1700 has been created in which these two interfaces are both plugged. A visual geometry plug 1710 can be seen at the end of the corridor in virtual environment 1708, derived from plug geometry as described above.

Figure 17C:
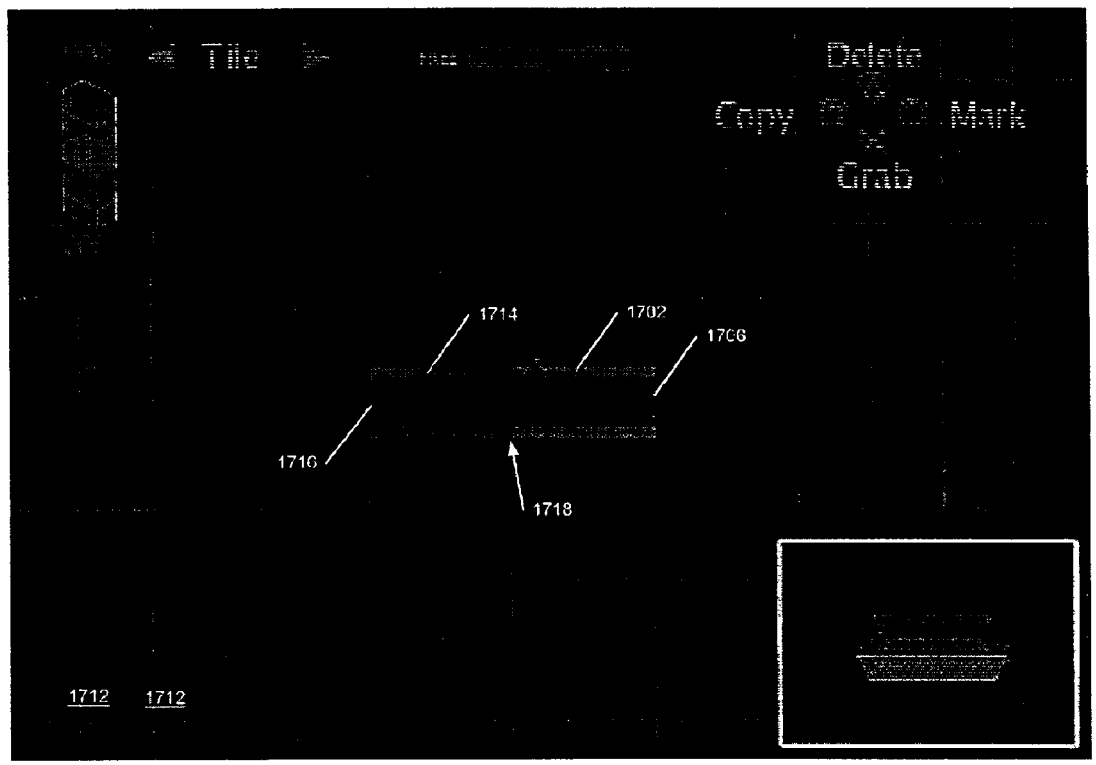
Figure 17D:
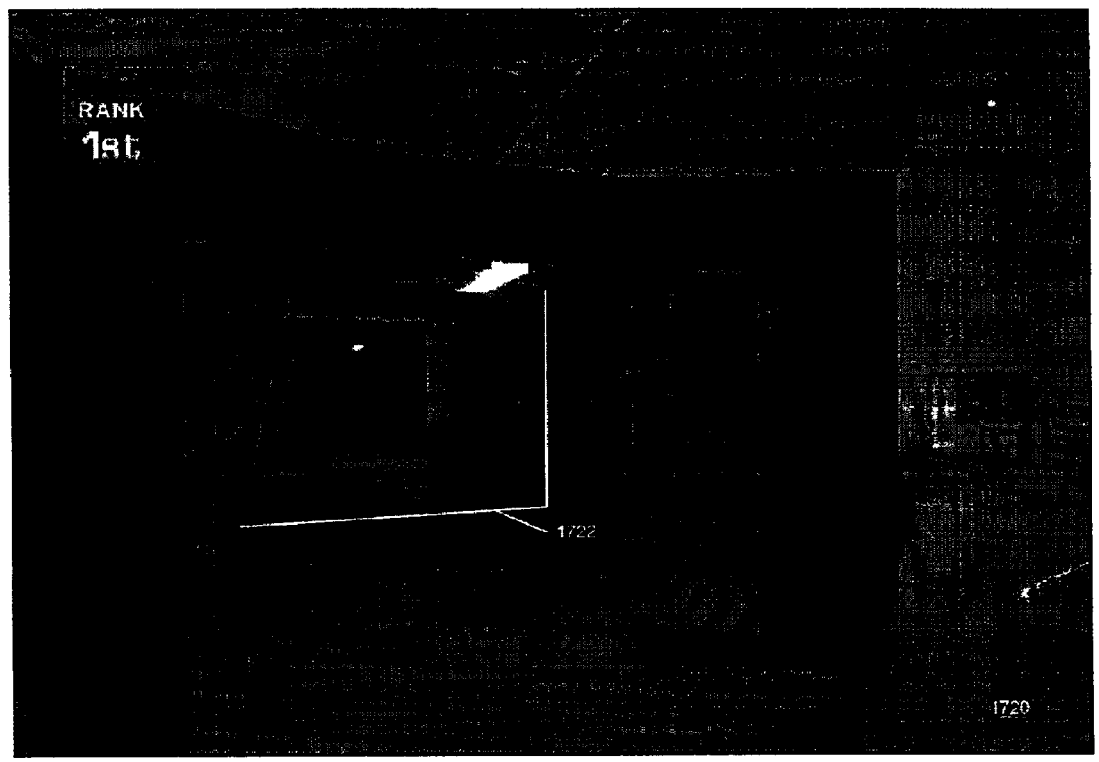

Referring now to FIGS. 17c and 17d, FIG. 17c shows a user interface screen 1712 in which a second double corridor tile 1714 has been joined to the first double corridor tile 1702. FIG. 17d shows a screenshot 1720 of a portion of a virtual environment constructed using the map shown in user interface screen 1712, screenshot 1720 showing the interface portion 1718 of the geometry linking tiles 1702 and 1714. For clarity the interface between the two tiles in the 3D environment is marked by a highlighted line 1722 although, in practice, this interface is virtually invisible to the game player. It can be seen, however, that the 3D visual geometry of the two joined tiles 1702 and 1714 exactly matches at the interface to create a contiguous surface without any holes or gaps across the interface between the two tiles.

Figure 18A:
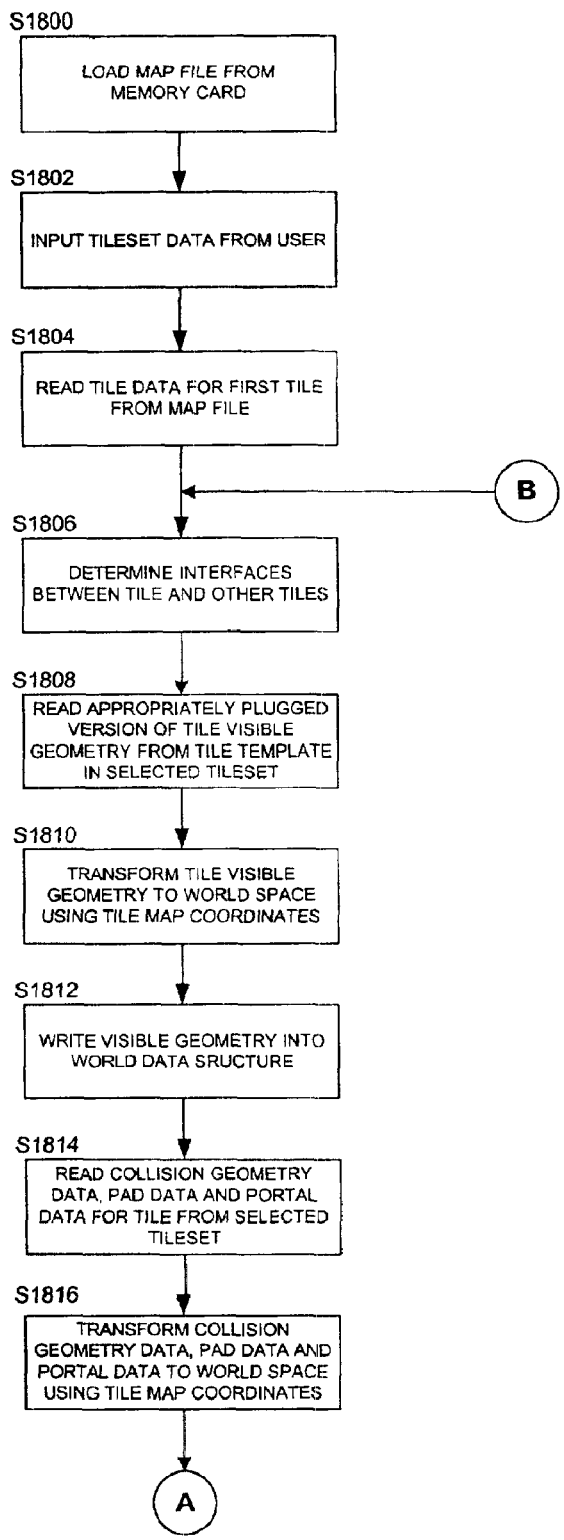
FIGS. 18a and 18b show a flow diagram of a method for processing tile data of two tiles of a tileset to join interfaces of the tiles to create a three-dimensional virtual environment for a game.
Figure 18B:
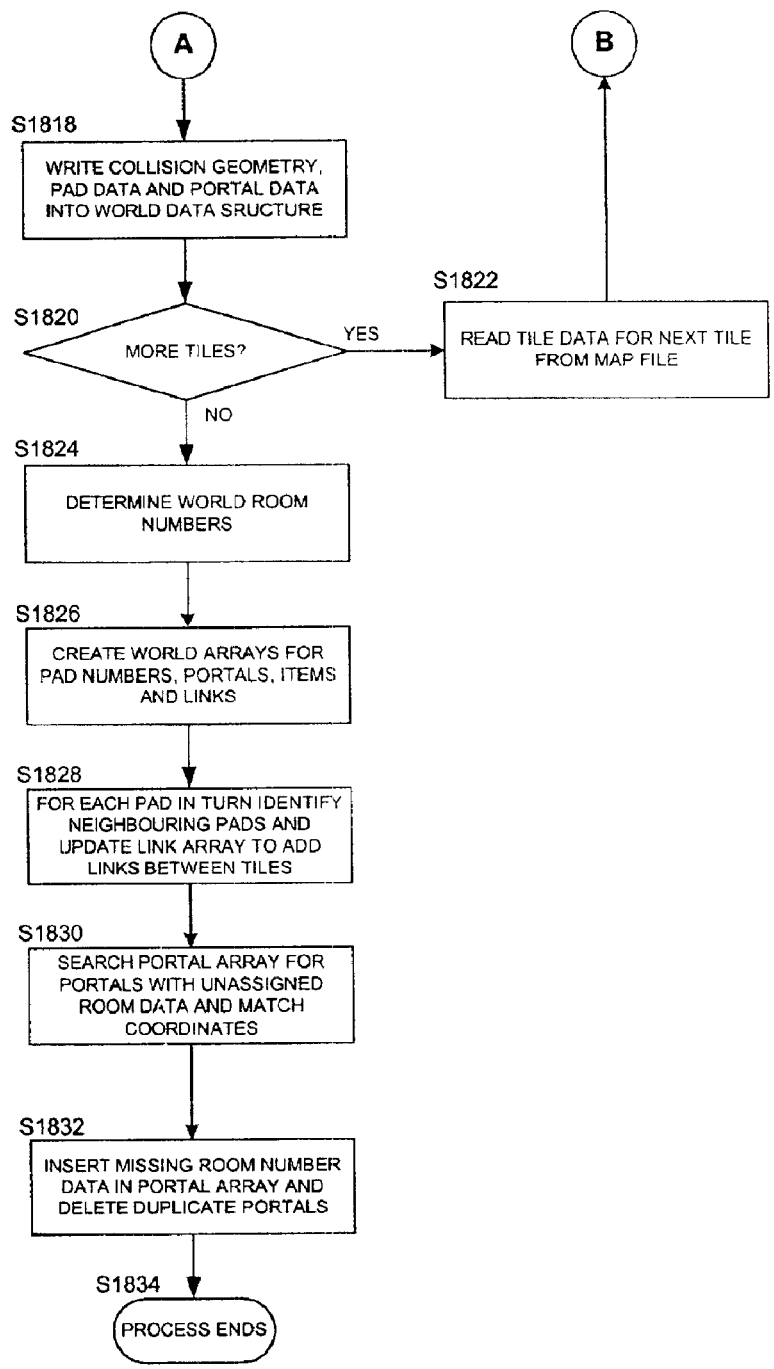

Referring now to FIG. 18, this shows a flow diagram of a method (or software) for processing tile data of two tiles of a tileset to join interfaces of the tiles to create a three-dimensional virtual environment for a game.

Initially, at step S1800, a map data file as described above is loaded from a data storage device such as memory card 222 of FIG. 2. This map data is parsed to create the 3D virtual environment for the game.

At step S1802 tileset data specifying a tileset to use to create the 3D game level virtual environment is input from the user; in alternative embodiments this data is read together with the map data from the storage device or memory card. Then, at step S1804, tile data for a first tile to be processed is read from the map data file, the tile data comprising the tile name (or number), tile position (and optionally, orientation) and tile connection data, as described above with reference to the map data file.

At step S1806 the procedure determines which of the tile interfaces are to be used to connect to other tiles, either using tile connection data stored with the map data, or based upon tile position data from the map, and then, at step S1808, the appropriate visible geometry is read from the tile data structure for the selected tileset. For interfaces of the tile which are connected to other tiles, the open version of the tile interface geometry is used (which may effectively correspond to the default tile geometry), and where interfaces are closed the appropriate plug visual geometry data for the tile is read from the tile data structure. Thus step S1808 reads visual geometry data for the tile in which used interfaces are open for connection to adjacent tiles and in which unused interfaces are closed or plugged. Following this, at step S1810, the visual geometry data for the tile is transformed to world space co-ordinates, that is to coordinates within the 3D game level virtual environment, using the tile position coordinates from the map data. In other words, for a tile located at position (1,1,1,) the visual geometry data for the tile is translated by +1 grid units in world space in each of the X, Y, and Z directions. The transform tile visual geometry is then appended to the 3D virtual environment data defining the game level (step S1812), that is to data 1304 of FIG. 13, which may comprise a single file or a plurality of separate data files according to, among other things, the requirements of the game engine. At step S1814 the tile collision geometry data, portal data, and pad data is then likewise read from the tile data for the selected tileset and, at step S1816, likewise transformed into world space co-ordinates and using the tile map position, and added to the virtual environment game level data or "world" data structure, at step S1818. Then, at step S1820, a check is made to determine whether or not there are any further tiles to process. If there are further tiles to process, at step S1822 tile data for the next tile to process is read from the map data file and the procedure loops back to step S1806. If there are no more tiles to process the procedure continues at step S1824.

Following these steps coherent visual and collision geometry data will exist in world space, defined by the world or 3D environment data structure, together with appropriately positioned navigation/item pads and portals. However the pads of separate tiles will not be linked and, since each tile generally has data defining a portal at each interface, there will, in general, be two portals defined at positions in the 3D virtual environment corresponding to interfaces between tiles.

At step S1824 the procedure then numbers the rooms or halls within the 3D virtual environment or "world" to provide a sequential set of room numbers separately identifying each room. The procedure then updates the 3D environment or "world" data so that game data such as pad data, portal data, and the like can be indexed by room number. This facilitates processing the game level world data by the game engine for game play. Then the procedure creates data arrays for the world data structure for pad numbers, portals, items, and links. This creates a unique identifier for each pad within the 3D environment or "world" which can be used for item placement and link definition. Items within the 3D environment or world are then definable by means of an item array comprising an item identifier and a "world" pad identifier. Similarly the links in the tile pad data files, which comprise lists of pairs of linked pads, are concatenated into a world link array in which pairs of world pad identifiers are used to define links between pads in the 3D environment or world space. This link array broadly corresponds to the link data described above with reference to an extract from a pad data file for a corridor tile. A portal array is also created at step S1826 comprising, for each portal, a portal identifier, a first room identifier, a second room identifier, and portal co-ordinates, the first and second room identifiers comprising room numbers of rooms between which the identified portal is located. At this stage, where a portal is not derived from a portal between two rooms or halls of a single tile, one room identifier for each identified portal remains undefined.

At this point the navigation pads in separate tiles have not yet been linked. Thus, at step S1828, a pairwise search is carried out for each interface of each tile, between pads defined as "plug" pads for each interface (i.e. those pads which are adjacent to the interface in the tile) and each other pad of a tile connected to the first tile at the interface. Referring back to FIG. 12a, for tile 1200 this would be a pairwise search between pad 1204d of tile 1200 and pads 1206a to c of tile 1202. As explained with reference to FIG. 12d, the search algorithm identifies pads in an adjoining tile which are within a predetermined distance of the or each plug pad and, optionally as an additional check, establishes that pads to be linked are approximately facing one another. Once the neighbouring pads in adjoining tiles at each interface have been identified the link array is updated with new links (for example link 1212 in FIG. 12a) between "plug" pads of adjoining tiles. In embodiments of the procedure it may be possible to restrict the pairwise search to pads in adjoining tiles which have been defined as "plug" pads, or even to link such "plug" pads without a search based upon a knowledge of which interfaces the "plug" pads are associated with and which interfaces are used for connecting to adjoining tiles.

Finally, at steps S1830 and S1832, the portal array data is rationalized and data for duplicate portals is deleted. At step S1830, for each interface between two tiles the portal array in effect defines two portals, with separate portal identifiers, one resulting from each tile. Thus for example at a junction between two corridor tiles with respective (world) room numbers of, say, 98 and 101 the portal data array will comprise two entries, for example "portal #100, room 98, room unknown" and "portal #110, room unknown, room 101". A set of co-ordinates will be associated with each of these portals and, since both portals are associated with the same interface, these portal co-ordinates will substantially coincide in world space. Thus, at step S1830 the procedure searches the portal array for sets of matching co-ordinates with associated unassigned or unknown room numbers. Such a search procedure will identify pairs of duplicate portals such as portal #100 and #110 in the foregoing example. The procedure then, at step S1832, fills in the missing room numbers (in the example, room 101 or portal #100, and room 98 or portal #110) and deletes the portal data for one of the duplicated portals. This matching and duplicate deletion process is performed to identify a pair of known room numbers for each portal and to remove duplicate portals as necessary. The portals are then, preferably, also renumbered in sequence. The process then ends at step S1834.

The result of the procedure of FIG. 18 is workable 3D environment data for a game level which not only includes contiguous visual and collision geometry, but also defines non-player character navigation data which is linked up through the environment across the tile interfaces. A set of 3D environment or world space item position identifiers for placing identified items within the game level is also defined.

The foregoing embodiments of the invention have been described with reference to the construction of a 3D virtual environment for a game level, and with particular reference to a first person shooter-type game. However the invention is not restricted to the construction of virtual environments for first person shooter-type games and may be employed for constructing virtual environments or game levels for third person shooter-type games and any other games in which a 3D virtual environment is desirable.

It will be appreciated that the above-described techniques of linking tiles, each tile describing a part of a 3D virtual environment, is generally applicable to the construction of 3D virtual environments and objects. Thus aspects of the invention may also be employed in defining 3D objects for use in computer games including, for example, player or non-player character objects such as player-controlled robots, tiles being provided for, for example, head and body parts, weapons, track and wheel attachments and the like.

Such tiles and objects may also include functional or operational data for defining, for example, allowed movements or movement types.

The invention may also be applied to other virtual reality-type systems such as virtual reality (VR) systems for modelling domestic environments, for example for sale of kitchen appliances or components, and VR systems for modelling the Internet or computer networks, for example for navigating through such systems or networks.

All rights including copyrights in the material contained in the figures and, in particular the screenshots, are vested in and the property of the assignee of the present invention. The assignee retains and reserves all rights in the figures and, in particular the screenshots, and grants permission to reproduce the material only in connection with reproduction of the granted patent and for no other purpose.

No doubt many other effective alternatives will occur to the skilled person and it will be understood that the invention is not limited to the described embodiments and encompasses modifications apparent to those skilled in the art lying within the spirit and scope of the claims appended hereto.

What is claimed is:

1. A method of constructing a three-dimensional world for a computer game using a set of predetermined three-dimensional tiles and a map specifying relative positions for the tiles, each tile comprising tile data including tile internal visual geometry data for defining visual geometry of the 3D world and invisible game control data; map data comprising tile identification data and tile position data identifying tiles from the act and their positions; world data comprising world visual geometry data and world game control data for the computer game, in a three-dimensional world space; the method comprising:

reading the map data;

transforming the internal visual geometry data into said world space, using the map data joining said transformed internal visual geometry of said identified tiles to generate said world visual geometry data defining substantially contiguous internal 3D surface enclosing said 3D world;

transforming the invisible game control data into the world space, using the map data; and combining said transformed invisible game control data of said identified tiles to generate said world game control data.

2. A method as claimed in claim 1, wherein the invisible game control data comprises data selected from a group including collision geometry data, non-player character navigational data and viewing portal data.

3. A method as claimed in claim 2 when the game control data includes navigational data, further comprising linking navigational data from different tiles after transforming the navigational data into said world space to facilitate non-player character navigation in the world space.

4. A method as claimed in claim 2 when the game control data includes portal data, further comprising matching portal data from different tiles, after transforming the portal data into said world space, to remove duplicate portals.

5. A method as claimed in claim 1, wherein each tile has at least one interface portion for joining the tile to another tile and wherein said tile visual geometry data defines matching visual geometry for the interface portions of at least a subset of the tiles such that when tile visual geometry data for tiles of the subset is transformed into said world space the resulting world visual geometry data defines substantially contiguous visual world geometry across interfaces between the tiles.

6. A method as claimed in claim 1, wherein the tile data includes plug visual geometry data whereby the tile data provides data defining at least two versions of visual geometry for each tile, a first version in which an interface to the tile is closed by a visual plug defined by the plug visual geometry data and a second version in which an interface to the tile is open for joining the tile to another tile.

7. A method as claimed in claim 1, the method further comprising:

providing a user interface for constructing said map, the user interface representing the three-dimensional world as a series of two dimensional levels on which the three-dimensional tiles may be placed; and receiving data for generating said map data from said user interface.

8. A method as claimed in claim 7, wherein said tile data includes data for one or more tiles spanning at least two of the two dimensional levels, whereby two of the two dimensional levels are linkable.

9. A method as claimed in claim 7, wherein said user interface includes an indicator for providing the user with an indication of the memory requirements of the world data for a three-dimensional world constructed using the map.

10. A method as claimed in claim 1, the method further comprising:

inputting data for selecting tile data for the said set of predetermined 3D tiles from tile data for a plurality of sets of 3D tiles, each tile within a set having tile data defining interface features for interfacing to the other tiles, the interface features of each tile substantially corresponding to interface features of at least one tile in each other set of 3D tiles.

11. A method of providing data for constructing a virtual 3D environment using predetermined 3D constructional elements, the elements having visible geometry internal to the elements for defining portions of said virtual 3D environment and internal geometry interfaces for connecting one element to another; the method comprising:

representing said 3D constructional elements to a user;

inputting instructions from the user for assembling the elements into a structure in which the elements are connected at the internal geometry interfaces, the structure representing the virtual 3D environment;

representing the structure to the user;

storing structure data representing the structure on a storage medium for constructing the virtual 3D environment; and displaying an approximate memory requirement of the virtual 3D environment represented by the structure.

12. A method as claimed in claim 11, wherein said predetermined constructional elements comprise a plurality of sets of elements, each set having corresponding interfaces, the method further comprising:

inputting set selection data for selecting a said set of elements; and storing said set selection data on the storage medium in association with said structure data;

whereby data is provided specifying the construction of one of a set of said virtual 3D environments from the selected set of constructional elements.

13. A method as claimed in claim 11, wherein said displaying displays an approximate difference between an estimated memory requirement of the 3D virtual environment and a maximum available memory space.

14. A method as claimed in claim 11, further comprising:
inputting item placement instructions from the user; and
storing item placement data corresponding to said item placement instructions on said storage medium in association with said structure data.

15. A method as claimed in claim 11, wherein said structure data includes constructional element identification data and constructional element position data for a plurality of elements, specifying positions of said predetermined constructional elements in the structure.

16. A method as claimed in claim 11, wherein said structure further includes connection data specifying connections between constructional elements in the structure.

17. A method as claimed in claim 11, wherein said representing comprises representing said structure to the user as substantially 2D elements located on a grid, said 2D elements representing said 3D constructional elements.

18. A method of providing data for constructing a virtual 3D environment using predetermined 3D constructional elements, the elements having visible geometry internal to the elements for defining portions of said virtual 3D environment and internal geometry interfaces for connecting one element to another; the method comprising:
representing said 3D constructional elements to a user;
inputting instructions from the user for assembling the elements into a structure in which the elements are connected at the internal geometry interfaces, the structure representing the virtual 3D environment;
representing the structure to the user;
storing structure data representing the structure on a storage medium for constructing the virtual 3D environment;
inputting lighting instructions from the user; and
storing lighting data corresponding to said lighting instructions on said storage medium in association with said structure data.

19. A method as claimed in claim 18, wherein said lighting instructions include lighting phase instructions for setting a phase of a lighting intensity variation; and wherein said lighting data includes lighting phase data corresponding to said lighting phase instructions.

20. A method as claimed in claim 18, wherein said structure data includes constructional element identification data and constructional element position data for a plurality of elements, specifying positions of said predetermined constructional elements in the structure.

21. A method as claimed in claim 20, wherein said structure further includes connection data specifying connections between constructional elements in the structure.

22. A method as claimed in claim 18, wherein said representing comprises representing said structure to the user as substantially 2D elements located on a grid, said 2D elements representing said 3D constructional elements.

23. A method as claimed in claim 18, wherein said predetermined constructional elements comprise a plurality of sets of elements, each set having corresponding interfaces, the method further comprising:
inputting set selection data for selecting a said set of elements; and
storing said set selection data on the storage medium in association with said structure data;
whereby data is provided specifying the construction of one of a set of said virtual 3D environments from the selected set of constructional elements.

24. A method as claimed in claim 18, wherein said displaying displays an approximate difference between an estimated memory requirement of the 3D virtual environment and a maximum available memory space.

25. A method as claimed in claim 18, further comprising:
inputting item placement instructions from the user; and
storing item placement data corresponding to said item placement instructions on said storage medium in association with said structure data.

26. A computer readable medium carrying computer readable instructions for controlling computer system to perform the method of any one of claims 1 to 10, 11–22 and 15–25.

27. A user interface for constructing a representation of a three-dimensional virtual environment using predetermined constructional elements, each element defining a 3D internal geometry for use in defining a region within the 3D virtual environment, the user interface comprising;
a selection component for the user to select a said predetermined constructional element;
a placing component for the user to place the selected element in relation to other placed elements; and
a joining component to join the internal geometry of the placed elements to provide a representation of the 3D virtual environment.

28. A user interface as claimed in claim 27, further comprising a display component to display the representation of the 3D virtual environment.

29. A user interface as claimed in claim 28, wherein the display component comprises a 2D display component to display a 2D representation of the 3D virtual environment.

30. A user interface as claimed in claim 29, wherein the 2D representation comprises a plurality of 2D grids representing sections through the 3D virtual environment, and wherein the display component includes a selection component for the user to select a said section.

31. A user interface as claimed in claim 30, wherein said sections represent substantially horizontal levels within the 3D virtual environment and wherein at least one said predetermined constructional element spans two or more levels, whereby the horizontal levels are linkable.

32. A user interface as claimed in claim 28, wherein the display component comprises a 3D display component to display a 3D representation of the 3D virtual environment.

33. A user interface as claimed in claim 27, wherein each element defines a closed internal 3D space and wherein the joining component opens interfaces between joined elements.

34. A user interface as claimed in claim 27, wherein associated with each said constructional element is a plurality of 3D tiles, each tile belonging to a respective tileset, the tiles within each tileset having a common visual stylistic appearance, the user interface further comprising a tileset selection component for the user to select a tileset for use with said constructional elements for constructing a 3D representation of said 3D virtual environment.

35. A user interface as claimed in claim 27, further comprising a memory indicator component to provide an indication of a computer memory requirement of the 3D virtual environment.

36. A user interface as claimed in claim 27, wherein the placed and joined elements comprise a map of the 3D virtual environment, and wherein the user interface further comprises a map save component to save map data representing the map on a storage device, the map data comprising element identification data and position data.

37. A computer readable medium carrying computer readable instructions for controlling a computer system to provide the user interface of any one of claims 27 to 36.

38. Data processing apparatus for providing a user interface for constructing a representation of a three-dimensional virtual environment using predetermined constructional elements, each element defining a 3D internal geometry for use in defining a region within the 3D virtual environment, the apparatus comprising:
- a data memory storing data representing said predetermined constructional elements;
- an instruction memory storing processor implementable instructions; and
- a processor operable to read and process data from the data memory in accordance with instructions stored in the instruction memory;
- wherein the stored instructions comprise instructions for controlling the processor to provide for said user interface:
  - a selection component for the user to select a said predetermined constructional element;
  - a placing component for the user to place the selected element in relation to other placed elements; and
  - a joining component to join the placed elements to provide a representation of the 3D virtual environment.

39. A data processing apparatus as claimed in claim 38, and wherein the stored instructions further comprise instructions for controlling the processor to provide for said user interface:
- a display component to display the representation of the 3D virtual environment, the display component comprising a 3D display component to display a 3D representation of the 3D virtual environment.

40. A data processing apparatus as claimed in claim 38, and wherein the stored instructions further comprise instructions for controlling the processor to provide for said user interface:
- a memory indicator component to provide an indication of a computer memory requirement of the 3D virtual environment.

41. A data structure on a carrier medium, the data structure comprising data for use in constructing a virtual 3D environment from predetermined constructional elements, each constructional element having geometry defining an internal three-dimensional space and having at least one internal geometry interface for connecting the element to another of said predetermined elements, the data structure defining an arrangement of said elements and comprising constructional element identification data, constructional element position data for each of a plurality of said elements, and lighting placement data for use in determining the placement of lighting within the virtual 3D environment.

42. A data structure as claimed in claim 41, further comprising connection data for each element, for determining whether the at least one interface connects to another element.

43. A data structure as claimed in claim 41, wherein said predetermined constructional elements comprise a plurality of sets of elements, each set having corresponding interfaces, the data structure further comprising set data specifying a said set of elements for use in constructing the virtual 3D environment.

44. A data structure as claimed in claim 41, further comprising object placement data for use in determining the placement of objects within the virtual 3D environment.

45. A data structure as claimed in claim 41, wherein said lighting data includes lighting phase data for setting a phase of a light intensity variation in the virtual 3D environment.

46. A data structure on a carrier medium, the data structure comprising data for use in constructing a virtual 3D environment from predetermined constructional elements, each constructional element having geometry defining an internal three-dimensional space and having at least one internal geometry interface for connecting the element to another of said predetermined elements, the data structure defining an arrangement of said elements and comprising constructional element identification data and constructional element position data for each of a plurality of said elements, wherein said virtual 3D environment is a virtual environment for a computer game.

47. A data structure as claimed in claim 46, further comprising connection data for each element, for determining whether the at least one interface connects to another element.

48. A data structure as claimed in claim 46, wherein said predetermined constructional elements comprise a plurality of acts of elements, each set having corresponding interfaces, the data structure further comprising set data specifying a said set of elements for use in constructing the virtual 3D environment.

49. A data structure as claimed in claim 46, further comprising object placement data for use in determining the placement of objects within the virtual 3D environment.

50. A data structure as claimed in claim 46, wherein said lighting data includes lighting phase data for setting a phase of a light intensity variation in the virtual 3D environment.

51. A data structure on a carrier medium, the data structure comprising data for a 3D constructional element for use in constructing a virtual 3D environment, the data comprising internal 3D geometry data defining a 3D surface internal to said constructional element for use in defining a portion of a contiguous internal bounding surface of said virtual 3D environment, said 3D virtual environment comprising a closed environment being bounded by said bounding surface.

52. A data structure as claimed in claim 51, wherein said constructional element has at least one interface portion for interfacing to another said constructional element for constructing said virtual 3D environment, wherein the 3D surface defined by said geometry data has an edge at said interface portion, said edge defining an opening, and wherein said 3D geometry data further includes plug geometry data defining a plug to close said opening, for use when said interface portion does not interface to another said constructional element.

53. A data structure as claimed in claim 51, wherein said 3D geometry data defines a 3D surface visible in said virtual 3D environment.

54. A data structure as claimed in claim 51, comprising data for a plurality of said 3D constructional elements forming a set of said constructional elements, each element within the set having at least one interface portion for interfacing to another element within the set for constructing said virtual 3D environment, said geometry data for an element defining the geometry of said interface portion of the element, the geometry of at least one interface portion of each constructional element in the set matching the geometry of an interface portion of each of the other constructional elements in the set.

55. A plurality of data structures, each as claimed in claim 54, comprising data for a plurality of said sets of constructional elements, each element having a connectivity determining to which other elements the element may be interfaced, the connectivity of an element being determined by said geometry data, each constructional element in a said set having a counterpart in each of the other sets, the connectivity of each said element substantially corresponding to the connectivity of the counterparts of the element.

56. A plurality of data structures as claimed in claim 55, wherein the geometry data for the interface portions of the constructional elements of one set is configured to define geometry to substantially match geometry of the interface portions of the elements of another said set.

57. A plurality of data structures as claimed in claim 55, further comprising texture data for the constructional elements for providing a visual appearance for said 3D surface of the element, each constructional element in a said set having texture data for a themed visual appearance different to the themed visual appearance of another said set of elements.

58. A plurality of data structures as claimed in claim 55, wherein the 3D geometry defined by 3D geometry data of a constructional element in one said set differs from the 3D geometry of the counterpart to the element in another said set.

59. A data structure as claimed in claim 51, wherein the virtual 3D environment comprises an environment for a computer game and wherein said bounding surface encloses a space within which the game is played.

60. A data structure as claimed in claim 59, wherein the data for the 3D constructional element further comprises portal data defining one or more portals for use by computer game code in determining which parts of the virtual 3D environment to process for potential display.

61. A data structure as claimed in claim 60, wherein each said constructional element has an interface portion for interfacing the element to other said constructional elements, and wherein a said portal is associated with said interface portion.

62. A data structure as claimed in claim 59, wherein the data for the 3D constructional element further comprises navigation data for use by computer game code in determining a route through a part of the virtual 3D environment constructed using the 3D constructional element.

63. A data structure as claimed in claim 59, wherein said 3D geometry data includes collision geometry data for use by computer game code in determining collisions with parts of said 3D virtual environment.

64. A data structure as claimed in claim 51, wherein said constructional element has at least one interface portion for interfacing to another said constructional element for constructing said virtual 3D environment, wherein the 3D surface defined by said geometry data has an edge at said interface portion, said edge defining an opening, and wherein said 3D geometry data further includes plug geometry data defining a plug to close said opening, for use when said interface portion does not interface to another said constructional element.

65. A data structure as claimed in claim 64, wherein said plug geometry data defines both a visual geometry and a collision geometry of said 3D constructional element.

* * * * *